United States Patent
Jung et al.

(10) Patent No.: US 7,599,696 B2
(45) Date of Patent: Oct. 6, 2009

(54) FREQUENCY REUSE TECHNIQUES IN MOTE-APPROPRIATE NETWORKS

(75) Inventors: Edward K. Y. Jung, Bellevue, WA (US); Clarence T. Tegreene, Bellevue, WA (US)

(73) Assignee: Searete, LLC, Bellevue, WA (US)

( * ) Notice: Subject to any disclaimer, the term of this patent is extended or adjusted under 35 U.S.C. 154(b) by 106 days.

(21) Appl. No.: 10/877,099

(22) Filed: Jun. 25, 2004

(65) Prior Publication Data

US 2005/0289275 A1 Dec. 29, 2005

(51) Int. Cl.
*H04W 40/00* (2006.01)
(52) U.S. Cl. .......................... 455/447; 455/561; 455/59
(58) Field of Classification Search .................. None
See application file for complete search history.

(56) References Cited

U.S. PATENT DOCUMENTS

| | | | |
|---|---|---|---|
| 5,159,631 A | 10/1992 | Quan et al. | |
| 5,394,882 A | 3/1995 | Mawhinney | |
| 5,432,519 A | 7/1995 | Sezai | |
| 5,581,694 A | 12/1996 | Iverson et al. | |
| 5,615,367 A | 3/1997 | Bennett et al. | |
| 5,697,066 A | 12/1997 | Acampora | |
| 5,960,214 A | 9/1999 | Sharpe, Jr. et al. | |
| 6,088,665 A | 7/2000 | Burns et al. | |
| 6,124,806 A | 9/2000 | Cunningham et al. | |
| 6,131,119 A | 10/2000 | Fukui | |
| 6,187,483 B1 | 2/2001 | Capodieci et al. | |
| 6,208,247 B1 | 3/2001 | Agre et al. | |
| 6,229,486 B1 | 5/2001 | Krile | |
| 6,296,205 B1 | 10/2001 | Hanson et al. | |
| 6,344,797 B1 | 2/2002 | Hosny | |
| 6,421,354 B1 | 7/2002 | Godlewski | |
| 6,504,829 B1 * | 1/2003 | Young et al. ................ 370/337 |
| 6,505,205 B1 | 1/2003 | Kothuri et al. | |
| 6,510,403 B1 | 1/2003 | Ghaseminejad | |
| 6,618,745 B2 | 9/2003 | Christensen et al. | |
| 6,640,087 B2 | 10/2003 | Reed et al. | |
| 6,640,145 B2 | 10/2003 | Hoffberg et al. | |
| 6,697,649 B1 | 2/2004 | Bennett et al. | |
| 6,704,742 B1 | 3/2004 | Huth et al. | |
| 6,708,239 B1 | 3/2004 | Ellerbrock et al. | |
| 6,735,630 B1 | 5/2004 | Gelvin et al. | |
| 6,778,844 B2 | 8/2004 | Hood, III | |
| 6,792,321 B2 | 9/2004 | Sepe, Jr. | |
| 6,826,162 B2 | 11/2004 | Haines et al. | |
| 6,870,503 B2 | 3/2005 | Mohamadi | |
| 6,888,453 B2 | 5/2005 | Lutz et al. | |
| 6,943,747 B2 | 9/2005 | Kwon | |
| 6,950,778 B2 | 9/2005 | Warner et al. | |
| 7,016,812 B2 | 3/2006 | Aritsuka et al. | |
| 7,034,740 B2 | 4/2006 | Witten | |
| 7,075,455 B2 | 7/2006 | Nishimura et al. | |
| 7,103,511 B2 | 9/2006 | Petite | |

(Continued)

OTHER PUBLICATIONS

Zhao, Feng; Guibas, Leonidas J.; *Wireless Sensor Networks: An Information Processing Approach.* San Francisco: Morgan Kaufmann Publishers-Elsevier Inc., bearing a copyright date of 2004.
Berkely Webs: Wireless Embedded Systems, "Building Sensor Networks with TinyOS" May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.

(Continued)

*Primary Examiner*—Erika A Gary

(57) ABSTRACT

Mote appropriate networks employing multiple frequencies, such as those utilized in frequency reuse techniques.

62 Claims, 45 Drawing Sheets

U.S. PATENT DOCUMENTS

| | | | |
|---|---|---|---|
| 7,165,109 | B2 | 1/2007 | Chiloyan et al. |
| 7,167,859 | B2 | 1/2007 | Shah et al. |
| 7,446,801 | B2 | 11/2008 | Iizuka |
| 7,475,158 | B2 | 1/2009 | Ferri et al. |
| 2001/0027495 | A1 | 10/2001 | Campagnolo |
| 2002/0027504 | A1 | 3/2002 | Davis et al. |
| 2002/0036595 | A1 | 3/2002 | Chiang et al. |
| 2002/0040639 | A1 | 4/2002 | Duddleson et al. |
| 2002/0095501 | A1 | 7/2002 | Chiloyan et al. |
| 2002/0095568 | A1 | 7/2002 | Norris et al. |
| 2002/0123864 | A1 | 9/2002 | Eryurek et al. |
| 2002/0161751 | A1 | 10/2002 | Mulgund et al. |
| 2003/0016128 | A1 | 1/2003 | Lutz et al. |
| 2003/0026268 | A1 | 2/2003 | Navas |
| 2003/0033394 | A1 | 2/2003 | Stine |
| 2003/0135495 | A1 | 7/2003 | Vagnozzi |
| 2003/0151513 | A1 | 8/2003 | Herrmann et al. |
| 2003/0172221 | A1 | 9/2003 | McNeil |
| 2003/0222818 | A1 | 12/2003 | Regnier et al. |
| 2003/0228857 | A1 | 12/2003 | Maeki |
| 2003/0236866 | A1 | 12/2003 | Light |
| 2004/0005889 | A1 | 1/2004 | Nishimura et al. |
| 2004/0008140 | A1 | 1/2004 | Sengupta et al. |
| 2004/0010492 | A1 | 1/2004 | Zhao et al. |
| 2004/0090326 | A1 | 5/2004 | Chin et al. |
| 2004/0122849 | A1 | 6/2004 | Nelson |
| 2004/0137915 | A1 | 7/2004 | Diener et al. |
| 2004/0186826 | A1 | 9/2004 | Choi et al. |
| 2004/0218602 | A1 | 11/2004 | Hrastar et al. |
| 2004/0230638 | A1 | 11/2004 | Balachandran et al. |
| 2004/0249563 | A1 | 12/2004 | Otsuki et al. |
| 2004/0262410 | A1 | 12/2004 | Hull |
| 2004/0267729 | A1 | 12/2004 | Swaminathan et al. |
| 2005/0021724 | A1 | 1/2005 | Kung et al. |
| 2005/0062653 | A1 | 3/2005 | Cetiner et al. |
| 2005/0140964 | A1 | 6/2005 | Eschenauer et al. |
| 2005/0141706 | A1 | 6/2005 | Regli et al. |
| 2005/0143133 | A1 | 6/2005 | Bridgelall |
| 2005/0275532 | A1 | 12/2005 | Ferri et al. |
| 2006/0092042 | A1 | 5/2006 | Davis et al. |
| 2006/0136627 | A1 | 6/2006 | Maity et al. |
| 2006/0212570 | A1 | 9/2006 | Aritsuka et al. |
| 2006/0224434 | A1 | 10/2006 | Rumi et al. |
| 2007/0208841 | A1 | 9/2007 | Barone et al. |
| 2007/0262863 | A1 | 11/2007 | Aritsuka et al. |

OTHER PUBLICATIONS

Berkeley Webs: Wireless Embedded Systems, "Publications", p. 1-3, located at http://webs.cs.berkeley.edu/publications.html, printed on Apr. 12, 2004.

Berkeley Webs: Wireless Embedded Systems, "Tiny OS a component-based OS for the networked sensor regime" pp. 1-2 located at http://webs.cs.berkeley.edu/tos/, printed on Jan. 27, 2004.

Berkeley Webs: Wireless Embedded Systems, "Tiny OS a component-based OS for the networked sensor regime", "Publications/Presentations", pp. 1-3 located at http://www.tinyos.net/media.html, printed on Apr. 13, 2004.

Berkeley Webs: Wireless Embedded Systems, "Tiny OS a component-based OS for the networked sensor regime" pp. 1-9 located at http://webs.cs.berkeley.edu/tos/related.html, printed on Jan. 27, 2004.

Berkeley Webs: Wireless Embedded Systems, "Tiny OS Tutorial Index"; pp. 1-2 located at http://webs.cs/berkeley.edu/tos/tinyos-1.x/doc/tutorial/index.html, printed on Apr. 15, 2004.

Berkeley Webs: Wireless Embedded Systems, "Tiny OS Tutorial Lesson 8: Data Logging Application", pp. 1-4 located at http://webs.cs.berkeley.edu/tos/tinyos-1.x/doc/tutorial/lesson8.html, printed on Apr. 15, 2004.

Buonadonna, Phillip; Hill, Jason; Culler, David; "Active Message Communication for Tiny Networked Sensors," pp. 1-11, printed on Mar. 8, 2004.

Center for the Built Environment, "XYZ On A Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.

Citris, "Brainy Buildings Conserve Energy" p. 1-3 located at http://www.citris.berkeley.edu/applications/energy/smartbuildings.html, printed on Jan. 27, 2004.

Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.

"Data Repository", University of California Berkeley, located at http://localization.millennium.berkeley.edu/data_repository.html, pp. 1 of 1, bearing a date of 2001, printed on Apr. 7, 2004.

Gay, David; Levis, Phil; Von Behren; Welsh, Matt; Brewer, Eric; and Culler, David, "The nesCLanguage: A Holistic Approach to Network Embedded Systems," pp. 1-11; Intel Research Berkeley, The Intel Corporation, Nov. 2002.

Gelsinger, Pat; Intel.com, "Expanding Moore's Law with Convergance" pp. 1-4 located at http://www.intel.com/labs/features/em101031.htm, printed on Apr. 9, 2004.

Hill, Jason; Szewczyk, Robert; Woo, Alec; Hollar, Seth; Culler, David; Pister, Kristofer, "System Architecture Directions for Networked Sensors," ASPLOS 2000, Cambridge, Nov. 2000, pp. 1-12.

INTEL.COM, "New Computing Frontiers—The Wireless Vineyard" pp. 1-4 located at http://www.intel.com/labs/features/rs01031.htm, printed on Apr. 7, 2004.

INTEL.COM, "Exploratory Research Deep Networking" pp. 1-10 located at http://www.intel.com/research/exploratory/heterogenerous.htm, printed on Mar. 25, 2004.

ISIS NEST: Institute For Software Integrated Systems; "NEST Home: Network Embedded Systems Technology", pp. 1-2, located at http://www.isis.vanderbilt.edu/projects.nest/index.html, printed on Apr. 14, 2004.

ISIS NEST: Institute For Software Integrated Systems; "Applications: Shooter Localizations", pp. 1-5, located at http://www.isis.vanderbilt.edu/projects.nest/applications.html, printed on Apr. 14, 2004.

ISIS NEST: Institute For Software Integrated Systems; "Middleware: Next Middleware Services", pp. 1 of 1, located at http://www.isis.vanderbilt.edu/projects.nest/middleware.html, printed on Apr. 14, 2004.

ISIS NEST: Institute For Software Integrated Systems; "Tools: NEST Tools", pp. 1 of 1, located at http://www.isis.vanderbilt.edu/projects.nest/tools.html, printed on Apr. 14, 2004.

ISIS NEST: Institute For Software Integrated Systems; "Documents: NEST Documents", pp. 1-2, located at http://www.isis.vanderbilt.edu/projects.nest/documents.html, printed on Apr. 14, 2004.

ISIS NEST: Institute For Software Integrated Systems; "Download: NEST Download", pp. 1-2, located at http://www.isis.vanderbilt.edu/projects.nest/download.html, printed on Apr. 14, 2004.

ISIS NEST: Institute For Software Integrated Systems; "People: The NEST Group", pp. 1 of 1, located at http://www.isis.vanderbilt.edu/projects.nest/people.html, printed on Apr. 14, 2004.

Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.

Kahn, Kevin C.; Culler, David E.; "Ad Hoc Sensor Networks A New Frontier for Computing Applications" Apr. 2002, printed on Apr. 9, 2004, pp. 1-4.

Kling, Ralph, "Intel® Research Mote" pp. 1-13, Powerpoint Presentation, located at http://webs.cs.berkeley.edu/retreat-1-03/slides/imote-nest-q103-03-dist.pdf, Intel Corporation Research, Santa Clara, CA, printed on Apr. 13, 2004.

Levis, Philip; Culler, David; "Maté: A Tiny Virtual Machine for Sensor Networks", pp. 1-11, printed on Apr. 12, 2004.

Levis, Philip; Patel, Neil; "Maté: Building Application-Specific Sensor Network Language Runtimes", Nov. 11, 2003, printed on Apr. 12, 2004, pp. 1-3.

Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.

Levis, Philip; Patel, Neil; Culler, David; Shenker, Scott; "Trickle: A Self-Regulating Algorithm for Code Propagation and Maintenance in Wireless Sensor Networks", printed on Apr. 13, 2004, pp. 1-14.

Levis, Philip, "Viral Code Propagation in Wireless Sensor Networks," EECS Department, University of California at Berkeley, printed on Mar. 8, 2004, pp. 1-7.

Liscano, Ramiro, "Service Discovery in Sensor Networks: An Overview" Powerpoint Presentation; pp. 1-51; School of Information Technology and Engineering, University of Ottawa, Ottawa, Canada, bearing a date of 2003, printed on Mar. 8, 2004.

"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.

"Localization.Millennium.Berkeley.Edu", University of California Berkeley, located at http://localization.millennium.berkeley.edu/introduction.html, pp. 1 of 1, bearing a date of 2001, printed on Apr. 7, 2004.

"Localization Standards", University of California Berkeley, located at http://localization.millennium.berkeley.edu/localization_standards.html, pp. 1 of 1, bearing a date of 2001, printed on Apr. 7, 2004.

Madden, Samuel, "Acquisitional Query Processing in TinyDB" Powerpoint Presentation, pp. 1-51; NEST Winter Retreat 2003, printed on Mar. 8, 2004.

Madden, Samuel, "Challenges in Sensor Network Query Processing" Powerpoint Presentation at the Jan. 15, 2002 NEST Retreat, printed on Mar. 8, 2004, pp. 1-56.

Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.

Madden, Samuel; Szewczyk, R.; Franklin, Michael; Culler, David "Supporting Aggregate Queries Over Ad-Hoc Wireless Sensor Networks" Powerpoint Presentation, pp. 1-47, 4th IEEE Workshop on Mobile Computing, dated Jun. 21, 2002.

Madden, Samuel; Franklin, Michael J.; Hellerstein, Joseph; M., and Hong, Wei, "The Design of an Acquisitional Query Processor for Sensor Networks," pp. 1-14, SIGMOD, Jun. 2003.

Maróti, Miklós; Völgyesi, Péter; Simon, Gyula; Karsai, Gábor; Lédeczi, Akos; "Distributed Middleware Services Composition and Synthesis Technology"; pp. 1-8, IEEE, bearing a date of 2002, printed on Apr. 14, 2004.

Pescovitz, David, "Robugs: Smart Dust Has Legs" pp. 1-2, located at http://www.coe.berkeley.edu/labnotes/0903/pister_print.html, bearing a date of Sep. 2003, printed on Apr. 9, 2004.

Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.

Ryer, Alex; *Light Measurement Handbook*, http://www.intl-light.com/handbook; pp. 1-64, copyright 1997, printed on Mar. 8, 2004.

Savvides, Andreas; "Hardware", pp. 1-3, located at http://nesl.ee.ucle.edu/projects/ahlos/hardware.htm, Networks and Embedded Systems Lab, University of California, Los Angeles; bearing a date of Jan. 18, 2003, printed on Feb. 23, 2004.

Savvides, Andreas; "Localization Forum", pp. 1 of 1, located at http://nesl.ee.ucla.edu/projects/ahlos/localization_forum.htm, Networks and Embedded Systems Lab, University of California, Los Angeles; bearing a date of Dec. 24, 2003, printed on Feb. 23, 2004.

SEARCHMOBILECOMPUTING.COM, "Ad-Hoc Network" pp. 1-3 located at http://searchmobilecomputing.techtarget.com/sDefinition/0,,sid40_gci213462.00.html, bearing a date of Apr. 11, 2003, printed on Mar. 8, 2004.

SEARCHNETWORKING.COM DEFINITIONS, "Jini" pp. 1-3 located at http://searchnetworking.techtarget.com/sDefinition/0,,sid7_gci212422.00.html, bearing a date of Apr. 10, 2003, printed on Mar. 8, 2004.

Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004, pp. 1-9.

"The Ad-Hoc Localization System (AHLoS)" Networks and Embedded Systems Lab, University of California, Los Angeles; located at http://nesl.ee.ucla.edu/projects/ahlos/Default.htm, pp. 1-4, printed on Feb. 23, 2004.

"Tiny DB A Declarative Database for Sensor Networks" pp. 1-2, located at http://telegraph.cs.berkeley.edu/tinydb/printed on Apr. 9, 2004.

Tiny SEC: Link Layer Security for Tiny Devices, Calamari: A localization system for sensor networks: pp. 1-6, located at http://www.cs.berkeley.edu/~kamin/calamari/ printed on Apr. 12, 2004.

Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.

Woo, Alec; Tong, Terence; and Culler, David, "Taming the Underlying Challenges of Reliable Multihop Routing in Sensor Networks," pp. 1-14, SenSys '03, Nov. 5-7, 2003, Los Angeles, California, USA.

PCT International Search Report; International App. No. PCT/US05/11203; Feb. 9, 2007.

Lu, Jie; Callan, Jamie; "Content-Based Retrieval In Hybrid Peer-To-Peer Networks"; CIKM'03; bearing dates of Nov. 3-8, 2003; ACM.

Culler, David; Estrin, Deborah; Srivastava, Mani; "Overview Of Sensor Networks"; Computer; Aug. 2004; pp. 41-49; vol. 37; No. 8; IEEE Computer Society.

Adler, Robert et al.; "Demo Abstract: Intel Mote 2: An Advanced Platform for Demanding Sensor Network Applications"; Intel Corporation; bearing dates of Nov. 2-4, 2005; p. 298; (plus cover sheet).

Dutta, Prabal K. et al.; "System Software Techniques for Low-Power Operation in Wireless Sensor Networks"; Computer Science Division, University of California, Berkeley; bearing a date of 2005; pp. 924-931; (plus cover sheet).

Krause, Andreas et al.; "Near-optimal Sensor Placements: Maximizing Information while Minimizing Communication Cost"; bearing dates of Apr. 19-21, 2006; pp. 2-10; (plus cover sheets).

Lu, Jie et al.; "User Modeling for Full-Text Federated Search in Peer-to-Peer Networks"; Language Technologies Institute, Carnegie Mellon University; bearing dates of Aug. 6-11, 2006; pp. 332-339; (plus cover sheet).

Nachman, Lama et al.; "The Intel® Mote Platform: A Bluetooth*-Based Sensor Network for Industrial Monitoring"; Corporate Technology Group, Intel Corporation; bearing a date of 2005; pp. 1-6; (plus cover sheet).

PCT International Search Report; International App. No. PCT/US05/11202; Sep. 27, 2006.

PCT International Search Report; International App. No. PCT/US05/10054; Dec. 1, 2006.

Razeeb, Kafil M. et al.; "A Hybrid Network of Autonomous Sensor Nodes"; NMRC, University College Cork; bearing dates of Nov. 8-10, 2004; pp. 69-70; (plus cover sheet).

Sharifzadeh, Mehdi et al.; "Supporting Spatial Aggregation in Sensor Network Databases*"; Computer Science Department, University of Southern California; bearing dates of Nov. 12-13, 2004; pp. 166-175; (plus cover sheet).

Kaminsky, et al., "Decentralized User Authentication in a Global File System", ACM, Oct. 2003, New York, NY, vol. 37, Issue 5, pp. 60-73.

PCT International Search Report; International App. No. PCT/US05/10955; pp. 1-2; Jun. 23, 2008.

PCT International Search Report; International App. No. PCT/US05/10953; pp. 1-3; Jun. 17, 2008.

PCT International Search Report; International App. No. PCT/US05/11207; pp. 1-4; Nov. 13, 2007.

U.S. Appl. No. 10/909,200, Jung et al.

U.S. Appl. No. 10/903,692, Jung et al.

U.S. Appl. No. 10/903,652, Jung et al.

U.S. Appl. No. 10/900,163, Jung et al.
U.S. Appl. No. 10/900,147, Jung et al.
U.S. Appl. No. 10/882,119, Jung et al.
Kaminsky et al.; "Decentralized User Authentication in a Global File System"; ACM; bearing a date of Dec. 2003; pp. 60-73; vol. 37, Issue 5, Bolton Landing, New York.
PCT International Search Report; International App. No. PCT/US05/10843; pp. 1-3; dated Jul. 3, 2007.
PCT International Search Report; International App. No. PCT/US05/10842; pp. 1-3; dated Nov. 7, 2007.
PCT International Search Report; International App. No. PCT/US05/11225; pp. 1-3; dated Nov. 23, 2007.
Culler et al., "Building Sensor Networks with TinyOS", 2003, http://webs.cs.berkeley.edu, pp. 1-41, May 5, 2003.
Li, et al., "Multi-Dimensional Range Queries in Sensor Networks", ACM, Nov. 7, 2003, pp. 63-75, retrieved on Oct. 11, 2007 from http://www.cens.ucla.edu/sensys03/proceedings/p63-li.pdf.
Patnode, et al., "Wisenet", Spring 2003, Senior Design Project, pp. 1-26, retrieved on Oct. 11, 2007 from http://cegt201.bradley.edu/projects/proj2003/wisenet/downloads/Wisenet_FINAL_REPORT.pdf.
Patnode, et al., "Wisenet—Tiny OS Based Wireless Network of Sensors", IEEE, Nov. 6, 2003, pp. 1-6, retrieved on Oct. 11, 2007 from http://ieeexplore.ieee.org/.
PCT Intl Search Report, Application No. PCT/US05/09703, dated Sep. 28, 2007, 4 pgs.
PCT Intl Search Report, Application No. PCT/US05/10059, dated Oct. 26, 2007, 5 pgs.
PCT Intl Search Report, Application No. PCT/US05/10249, dated Oct. 24, 2007, 4 pgs.
PCT Intl Search Report, Application No. PCT/US05/10250, dated Oct. 18, 2007, 5 pgs.
PCT Intl Search Report, Application No. PCT/US05/10251, dated Oct. 25, 2007, 5 pgs.
PCT Intl Search Report, Application No. PCT/US05/10253, dated Oct. 23, 2007, 4 pgs.
PCT Intl Search Report, Application No. PCT/US05/10254, dated Oct. 17, 2007, 5 pgs.
Culler, David E.; Mulder, Hans; "Smart Sensors To Network The World"; Scientific American; printed on Jun. 26, 2007; pp. 1-10; http://www.intel.com/research/exploratory/smartnetworks.htm.
Fall, Kevin; "A Delay-Tolerant Network Architecture For Challenged Internets"; Intel Research Berkeley; Feb. 26, 2003; pp. 1-14; ACM Press.
Lu, Jie; Callan, Jamie; "Content-Based Retrieval In Hybrid Peer-To-Peer Networks"; Information Retrieval Session 4: General Retrieval Issues; 2003; pp. 199-206; ACM Press.
PCT International Search Report; International App. No. PCT/US05/10843; Mar. 29, 2005.
PCT International Search Report; International App. no. PCT/US05/09479; 17 Jul. 2007.
PCT International Search Report; International App no. PCT/US05/09640; 09 Jul. 2007.
PCT International Search Report; International App no. PCT/US05/10053; 10 Aug. 2007.
Madden et al.; "TAG: a Tiny Aggregation Service for Ad-Hoc Sensor Networks"; bearing a date of 2002; pp. 1-14; ; located at: http://www.cs.berkeley.edu/~franklin/Papers/madden_tag.pdf.
Woo, Alec; Culler, David E.; "A Transmission Control Scheme for Media Access in Sensor Networks"; bearing a date of Jul. 2001; pp. 1-15; located at: http://www.cs.berkeley.edu/~awoo/awoo_mobicom.pdf.
PCT International Search Report; International App. No. PCT/ US 05/09641; 5 pages; Sep. 13, 2007.
U.S. Appl. No. 11/728,719, filed Mar. 26, 2007, Tegreene.
U.S. Appl. No. 11/731,734 filed Mar. 30, 2007, Tegreene.
U.S. Appl. No. 11/986,993, filed Nov. 26, 2007 Tegreene.
U.S. Appl. No. 11/998,847, filed Nov. 29, 2007 Tegreene.
U.S. Appl. No. 11/998,879, filed Nov. 29, 2007 Tegreene.
U.S. Appl. No. 11/999,094, filed Dec. 4, 2007 Tegreene.
PCT International Search Report; International App. No.: PCT/US05/10954; pp. 1-7; Feb. 26, 2008.
Madden et al.; "Tiny DB: In-Network Query Processing in TinyOS"; Version 0.4; pp. 1-46; Sep. 2003; printed on Apr. 27, 2009; located at: bup://telegraph.cs.berkeley.edu/tinvdbltirtydb.pdf.
Warneke, Brett et al.; "Ultra-Low Power Communication Logic Circuits for Distributed Sensor Networks"; EECS 241; bearing a date of Spring 1998; pp. 1-7; UC Berkeley.

* cited by examiner

FIG. 5A

Key To FIG. 5

| 5A | 5B |

504

| MULTI-MOTE CONTENT LOG ENTRY FOR MOTE ADDRESS 1A CONTENT LOGS | |
|---|---|
| time stamp = 1331 | MOTE 1A: SENSING/CONTROL LOG |
| Light Device | Light Device Information |
| Electrical/ Magnetic Device | Electrical/ Magnetic Device Information |
| Inertial Device | Inertial Device Information |
| Antenna | Antenna Information |

| MULTI-MOTE CONTENT LOG ENTRY FOR MOTE ADDRESS 3A CONTENT LOGS | |
|---|---|
| time stamp = 1630 | MOTE 3A: SENSING/CONTROL LOG |
| Pressure Device | Pressure Device Information |
| Temp. Device | Temp. Device Information |
| Volume Device | Volume Device Information |
| Antenna | Antenna Information |

FIG. 6A

| | | | |
|---|---|---|---|
| MULTI-MOTE CONTENT LOG ENTRY FOR MOTE ADDRESS 1A CONTENT LOGS | | MULTI-MOTE CONTENT LOG ENTRY FOR MOTE ADDRESS 3A CONTENT LOGS | |
| | MOTE 1A: SENSING/CONTROL LOG | | MOTE 3A: SENSING/CONTROL LOG |
| time stamp = 1331 | Light Device Information | time stamp = 1630 | Pressure Device Information |
| Light Device | Electrical/ Magnetic Device Information | Pressure Device | Temp. Device Information |
| Electrical/ Magnetic Device | Inertial Device Information | Temp. Device | Volume Device Information |
| Inertial Device | Antenna Information | Volume Device | Antenna Information |
| Antenna | | Antenna | |

504

| 6A | 6B |
|---|---|

Key To FIG. 6

FIG. 9A          Aggregation of Content Logs

| Time | MOTE ADDRESS 1A CONTENT LOGS | | | | MOTE ADDRESS 2A CONTENT LOGS | MOTE ADDRESS …A CONTENT LOGS |
|---|---|---|---|---|---|---|
| time = t0 | \<MOTE 1A: SENSING/CONTROL LOG\> Light Device / Light Device Information; Electrical/Magnetic Device / Electrical/Magnetic Device Information; Inertial Device / Inertial Device Information; Antenna / Antenna Information. \<MOTE 1A: ROUTING/SPATIAL LOG\> Mote-Network Address 2A, Comm. Link Quality of Service: Good, Absolute Coordinates: Long Lat. (e.g., GPS), Relative Coordinates (e.g., 2-d or 3-d relative to mote 1A location); Mote-Network Address 3A, Comm. Link Quality of Service: Fair, Absolute Coordinates: Long Lat. (e.g., GPS), Relative Coordinates (e.g., 2-d or 3-d relative to mote 1A location); Mote-Network Address 5A, Comm. Link Quality of Service: Poor, Absolute Coordinates: Long Lat. (e.g., GPS), Relative Coordinates (e.g., 2-d or 3-d relative to mote 1A location). | | | | Mote 2A Sensing Log  Mote 2A Routing/Spatial Log | Mote …A Sensing Log  Mote …A Routing/Spatial Log |
| time = t1 | Mote 1A Sensing Log  Mote 1A Routing/Spatial Log | | | | Mote 2A Sensing Log  Mote 2A Routing/Spatial Log | Mote …A Sensing Log  Mote …A Routing/Spatial Log |
| time = t2 | Mote 1A Sensing Log  Mote 1A Routing/Spatial Log | | | | Mote 2A Sensing Log  Mote 2A Routing/Spatial Log | Mote …A Sensing Log  Mote …A Routing/Spatial Log |
| .. | ETC. | | | | ETC. | ETC. |
| time = tcurrent | ETC. | | | | ETC. | ETC. |

710

| 9A | 9B | Key To FIG. 9

FIG. 9B

Aggregation of Content Logs

Ⓐ MOTE ADDRESS MA CONTENT LOGS

| | MOTE MA: SENSING/CONTROL LOG | |
|---|---|---|
| Pressure Device | Pressure Device Information | |
| Temp. Device | Temp. Device Information | |
| Volume Device | Volume Device Information | |
| Antenna | Antenna Information Available | |

| | MOTE MA: ROUTING/SPATIAL LOG | | |
|---|---|---|---|
| Mote-Network Address 1A | Comm. Link Quality of Service: Good | Absolute Coordinates: Long Lat. (e.g., GPS) | Relative Coordinates (e.g., 2-d or 3-d relative to mote 1A location) |
| Mote-Network Address 2A | Comm. Link Quality of Service: Fair | Absolute Coordinates: Long Lat. (e.g., GPS) | Relative Coordinates (e.g., 2-d or 3-d relative to mote 1A location) |
| Mote-Network Address 5A | Comm. Link Quality of Service: Poor | Absolute Coordinates: Long Lat. (e.g., GPS) | Relative Coordinates (e.g., 2-d or 3-d relative to mote 1A location) |
| Mote-Network Address 6A | Comm. Link Quality of Service: Fair | Absolute Coordinates: Long Lat. (e.g., GPS) | Relative Coordinates (e.g., 2-d or 3-d relative to mote 1A location) |

Ⓑ Mote MA Sensing Log
Mote MA Routing/Spatial Log

Ⓒ Mote MA Sensing Log
Mote MA Routing/Spatial Log

Ⓓ ETC.
ETC.
Ⓔ

710

| 9A | 9B |
|---|---|

Key To
FIG. 9

| Federated Mote Log for First-Administered Set of Motes and Second-Administered Set of Motes |||||||||
|---|---|---|---|---|---|---|---|---|
| AGGREGATION OF CONTENT LOGS FOR MOTE ADDRESSES 1A AND 2A OF FIRST-ADMINISTERED SET OF MOTES |||| AGGREGATION OF CONTENT LOGS FOR MOTE ADDRESSES 3A AND 4A OF SECOND-ADMINISTERED SET OF MOTES |||||

| | MOTE 1A OF FIRST-ADMINISTERED SET OF MOTES: SENSING /CONTROL LOG | | | | MOTE 3A OF SECOND-ADMINISTERED SET OF MOTES: SENSING /CONTROL LOG | | |
|---|---|---|---|---|---|---|---|
| Light Device | Light Device Information Available | Query Command Format | Output Format | Pressure Device | Pressure Device Information Available | Query Command Format | Output Format |
| Electrical/ Magnetic Device | Electrical/ Magnetic Device Information Available | Query Command Format | Output Format | Temp. Device | Temp. Device Information Available | Query Command Format | Output Format |
| Inertial Device | Inertial Device Information Available | Query Command Format | Output Format | Volume Device | Volume Device Information Available | Query Command Format | Output Format |
| Antenna | Antenna Information Available | Query Command Format | Output Format | Antenna | Antenna Information Available | Query Command Format | Output Format |

| | MOTE 2A OF FIRST-ADMINISTERED SET OF MOTES: ROUTING /SPATIAL LOG | | | | MOTE 4A OF SECOND-ADMINISTERED SET OF MOTES: ROUTING /SPATIAL LOG | | |
|---|---|---|---|---|---|---|---|
| Mote-Network Address 2A | Comm. Link Quality of Service: Good | Absolute Coordinates: Long Lat. (e.g., GPS) | Relative Coordinates (e.g., 2-d or 3-d relative to mote 1A location) | Mote-Network Address 1A | Comm. Link Quality of Service: Good | Absolute Coordinates: Long Lat. (e.g., GPS) | Relative Coordinates (e.g., 2-d or 3-d relative to mote 1A location) |
| Mote-Network Address 3A | Comm. Link Quality of Service: Fair | Absolute Coordinates: Long Lat. (e.g., GPS) | Relative Coordinates (e.g., 2-d or 3-d relative to mote 1A location) | Mote-Network Address 2A | Comm. Link Quality of Service: Fair | Absolute Coordinates: Long Lat. (e.g., GPS) | Relative Coordinates (e.g., 2-d or 3-d relative to mote 1A location) |
| Mote-Network Address 5A | Comm. Link Quality of Service: Poor | Absolute Coordinates: Long Lat. (e.g., GPS) | Relative Coordinates (e.g., 2-d or 3-d relative to mote 1A location) | Mote-Network Address 5A | Comm. Link Quality of Service: Poor | Absolute Coordinates: Long Lat. (e.g., GPS) | Relative Coordinates (e.g., 2-d or 3-d relative to mote 1A location) |
| | | | | Mote-Network Address 6A | Comm. Link Quality of Service: Fair | Absolute Coordinates: Long Lat. (e.g., GPS) | Relative Coordinates (e.g., 2-d or 3-d relative to mote 1A location) |

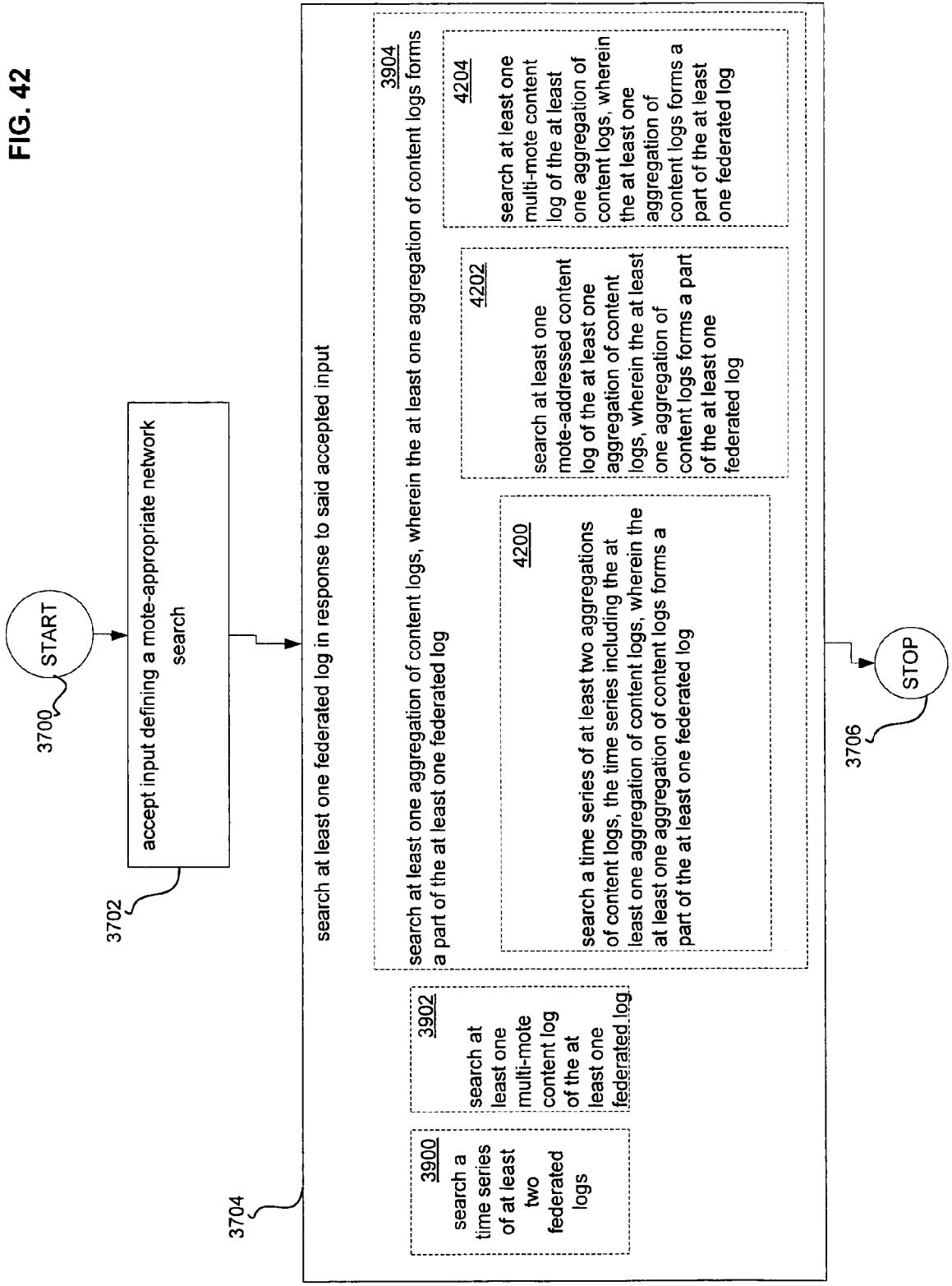

FREQUENCY REUSE TECHNIQUES IN MOTE-APPROPRIATE NETWORKS

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):

1. United States patent application entitled MOTE-ASSOCIATED LOG CREATION, naming Edward K. Y. Jung and Clarence T. Tegreene as inventors, filed 12 May 2004.
2. United States patent application entitled TRANSMISSION OF MOTE-ASSOCIATED LOG DATA, naming Edward K. Y. Jung and Clarence T. Tegreene as inventors, filed 12 May 2004.
3. United States patent application entitled AGGREGATING MOTE-ASSOCIATED LOG DATA, naming Edward K. Y. Jung and Clarence T. Tegreene as inventors, filed 12 May 2004.
4. United States patent application entitled TRANSMISSION OF AGGREGATED MOTE-ASSOCIATED LOG DATA, naming Edward K. Y. Jung and Clarence T. Tegreene as inventors, filed 12 May 2004.
5. United States patent application entitled FEDERATING MOTE-ASSOCIATED LOG DATA, naming Edward K. Y. Jung and Clarence T. Tegreene as inventors, filed 12 May 2004.
6. United States patent application entitled MOTE-ASSOCIATED INDEX CREATION, naming Edward K. Y. Jung and Clarence T. Tegreene as inventors, filed 31 Mar. 2004.
7. United States patent application entitled TRANSMISSION OF MOTE-ASSOCIATED INDEX DATA, naming Edward K. Y. Jung and Clarence T. Tegreene as inventors, filed 31 Mar. 2004.
8. United States patent application entitled AGGREGATING MOTE-ASSOCIATED INDEX DATA, naming Edward K. Y. Jung and Clarence T. Tegreene as inventors, filed 31 Mar. 2004.
9. United States patent application entitled TRANSMISSION OF AGGREGATED MOTE-ASSOCIATED INDEX DATA, naming Edward K. Y. Jung and Clarence T. Tegreene as inventors, filed 31 Mar. 2004.
10. United States patent application entitled FEDERATING MOTE-ASSOCIATED INDEX DATA, naming Edward K. Y. Jung and Clarence T. Tegreene as inventors, filed 31 Mar. 2004.
11. United States patent application entitled MOTE NETWORKS HAVING DIRECTIONAL ANTENNAS, naming Clarence T. Tegreene as inventor, filed 31 Mar. 2004.
12. United States patent application entitled MOTE NETWORKS USING DIRECTIONAL ANTENNA TECHNIQUES, naming Clarence T. Tegreene as inventor, filed 31 Mar. 2004.
13. United States patent application entitled USING MOTE-ASSOCIATED LOGS, Edward K. Y. Jung and Clarence T. Tegreene as inventors, filed 21 May 2004.
14. United States patent application entitled USING FEDERATED MOTE-ASSOCIATED LOGS, Edward K. Y. Jung and Clarence T. Tegreene as inventors, filed 25 Jun. 2004.

TECHNICAL FIELD

The present application relates, in general, to motes.

SUMMARY

In one aspect, a system includes but is not limited to: a first-administered set of motes having a first defined carrier frequency; and a second-administered set of motes having a second defined carrier frequency, said second-administered set of motes proximate to said first-administered set of motes. In addition to the foregoing, other system aspects are described in the claims, drawings, and/or text forming a part of the present application.

In one aspect, a method includes but is not limited to: acquiring at least a part of one or more content logs from a first-administered set of motes having a first defined carrier frequency; and acquiring at least a part of one or more content logs from a second-administered set of motes having a second defined carrier frequency. In addition to the foregoing, other method aspects are described in the claims, drawings, and/or text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

BRIEF DESCRIPTION OF THE FIGURES

FIG. 9 depicts an exploded view of aggregation 710 of content logs of FIG. 7.

FIG. 13 shows an exemplary exploded view of federated log 916.

FIG. 42 shows a high-level logic flowchart depicting several alternate implementations of the high-level logic flowchart of FIG. 39.

The use of the same symbols in different drawings typically indicates similar or identical items.

DETAILED DESCRIPTION

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

I. Mote-Associated Log Creation
  A. Structure(s) and/or System(s)

Figure 1:
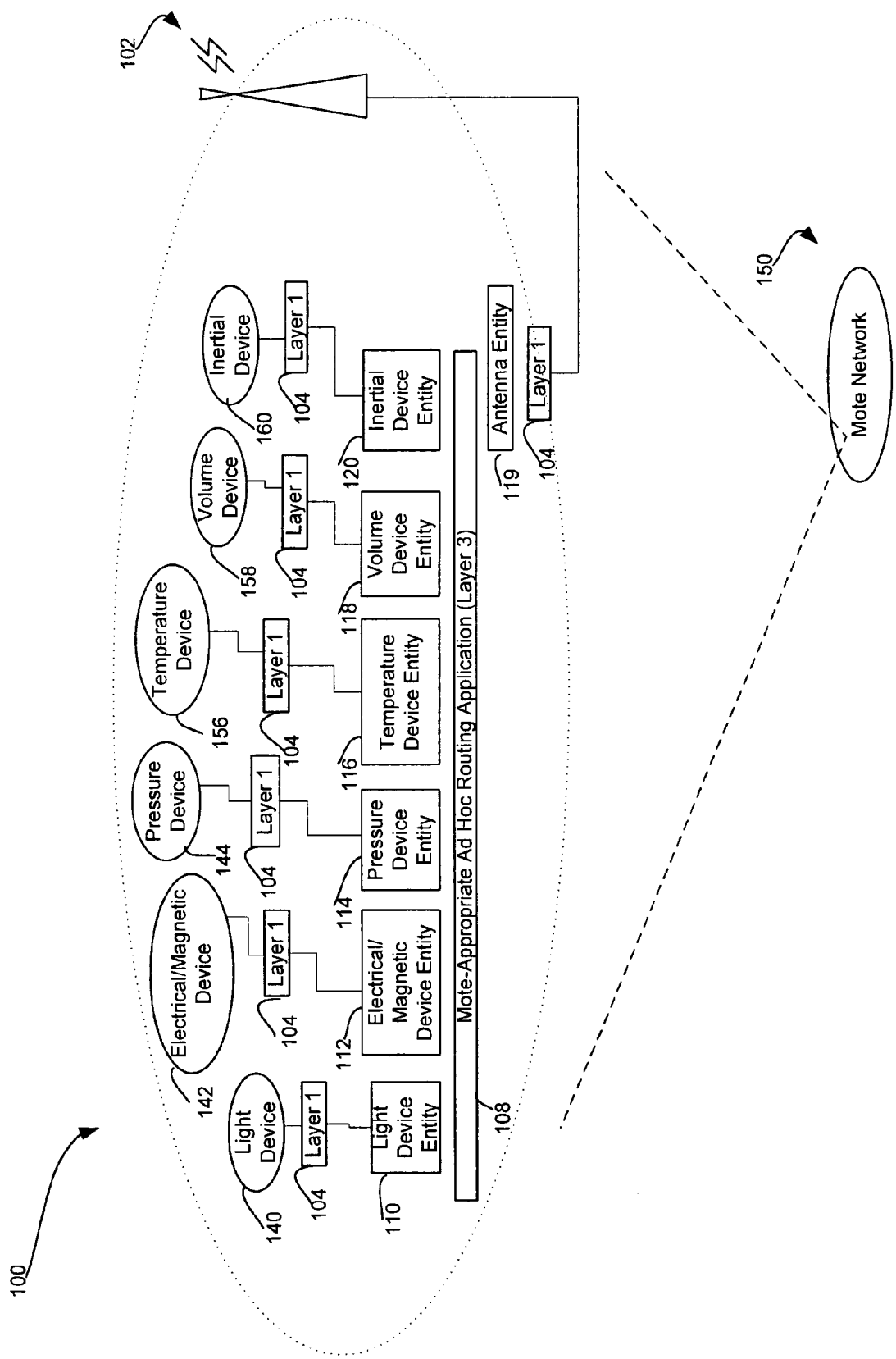
FIG. 1 shows an example of mote 100 of mote-appropriate network 150 that may serve as a context for introducing one or more processes and/or devices described herein.

With reference now to FIG. 1, shown is an example of mote 100 of mote-appropriate network 150 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 100 depicts a specific example of a more general mote. Mote 100 is illustrated as having antenna 102, physical layer 104, antenna entity 119, network layer 108 (shown for sake of example as a mote-appropriate ad hoc routing application), light device entity 110, electrical/magnetic device entity 112, pressure device entity 114, temperature device entity 116, volume device entity 118, and inertial device entity 120. Light device entity 110, electrical/magnetic device entity 112, pressure device entity 114, temperature device entity 116, volume device entity 118, antenna entity 119, and inertial device entity 120 are depicted to respectively couple through physical layers 104 with light device 140, electrical/magnetic device 142, pressure device 144, temperature device 156, volume device 158, antenna 102, and inertial device 160. Those skilled in the art will appreciate that the herein described entities and/or devices are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 140 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 142 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 144 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 156 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 158 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 160 is implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) may be present and active to allow/provide communications consistent with the teachings herein. Those having skill in the art will appreciate that these entities and/or functions layers are not expressly shown/described herein for sake of clarity.

Figure 2:
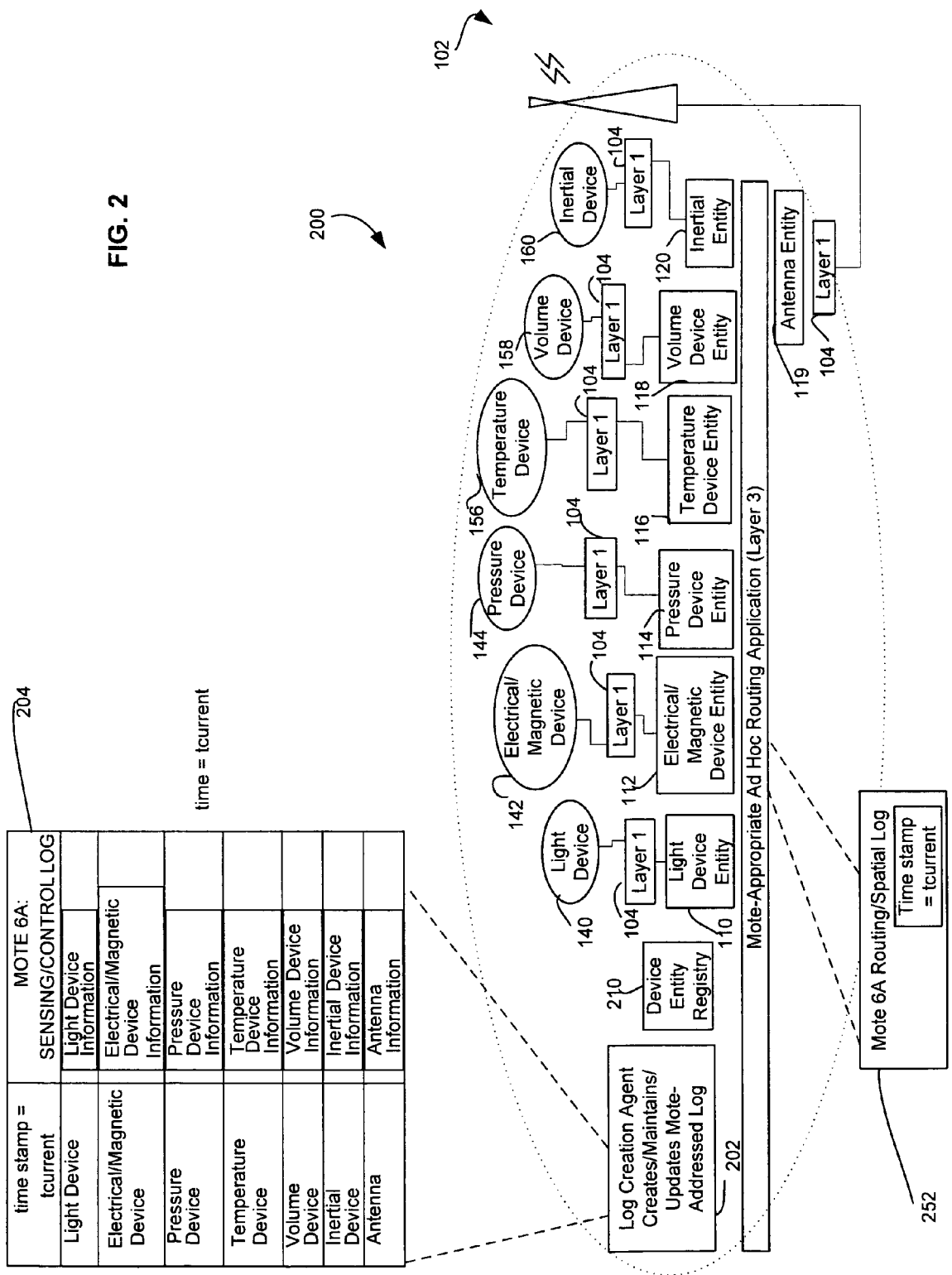
FIG. 2 depicts an exploded view of mote 200 that forms a part of a mote-appropriate network (e.g., as shown in FIGS. 3, 4, 5, 7, 8, 10, 11 and/or 12).

Referring now to FIG. 2, depicted is an exploded view of mote 200 that forms a part of a mote-appropriate network (e.g., as shown in FIGS. 3, 4, 5, 7, 8, 10, 11 and/or 12). Mote 200 is illustrated as similar to mote 100 (FIG. 1), but with the addition of log creation agent 202, mote-addressed sensing/control log 204, and mote-addressed routing/spatial log 252.

Mote-addressed sensing/control log 204 is shown in FIG. 2 as having illustrative entries of light device information, electrical/magnetic device information, pressure device information, temperature device information, volume device information, inertial device information, and antenna information. Examples of light device information include measures of brightness, saturation, intensity, color, hue, power (e.g., watts), flux (e.g., lumens), irradiance (e.g., Watts/cm$^2$), illuminance (lumens/m$^2$, lumens/ft$^2$), pixel information (e.g., numbers of pixels (e.g., one for a very small mote image capture device), relative pixel orientation)), etc. Examples of electrical/magnetic device information include measures of field strength, flux, current, voltage, etc. Examples of pressure device information include measures of gas pressure, fluid pressure, radiation pressure, mechanical pressure, etc. Examples of temperature device information include measures of temperature such as Kelvin, Centigrade, and Fahrenheit, etc. Examples of inertial device information include measures of force, measures of acceleration, deceleration, etc. Examples of antenna information include measures of signal power, antenna element position, relative phase orientations of antenna elements, delay line configurations of antenna elements, beam directions, field of regard directions, antenna types (e.g., horn, biconical, array, Yagi, log-periodic, etc.), etc.

Figure 5:
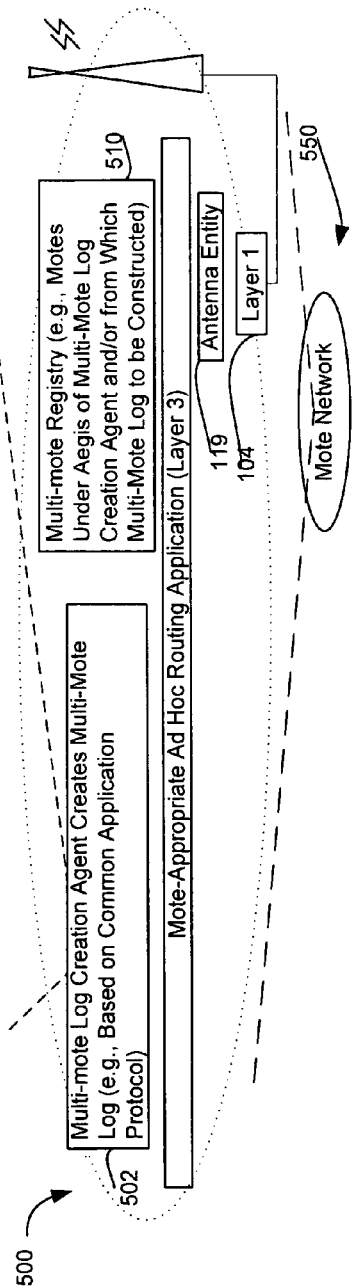
FIG. 5 depicts an exploded view of mote 500 forming a part of mote-appropriate network 550 that may serve as a context for introducing one or more processes and/or devices described herein.

FIG. 2 does not show illustrative entries for mote-addressed routing/spatial log 252. For a specific example of what one implementation of a mote-addressed routing/spatial log might contain, see the mote-addressed routing/spatial logs shown internal to multi-mote content log 504 of FIG. 5. As shown in FIG. 5, in some implementations a mote-addressed routing/spatial log will contain a listing of mote addresses directly accessible from a mote (e.g., via direct radio transmission/reception from/by antenna 102), an assessment of qualities of data communications service on the data communication links to such directly accessible motes, and/or a listing of relative and/or absolute spatial coordinates of such directly accessible motes.

Continuing to refer to FIG. 2, in one implementation, log creation agent 202 is a computer program—resident in mote 200—that executes on a processor of mote 200 and that constructs and/or stores mote-addressed sensing/control log 204, and/or mote-addressed routing/spatial log 252 in memory of mote 200. In some implementations, log creation agent 202 is pre-installed on mote 200 prior to mote 200 being added to a mote-appropriate network, while in other implementations log creation agent 202 crawls and/or is transmitted to mote 200 from another location (e.g., a log creation agent at another mote or another networked computer (not shown) clones itself and sends that clone to mote 200). In yet other implementations, log creation agent 202 is installed at a proxy (not shown) for mote 200.

The inventors point out that in some applications the systems and/or processes transfer their instructions in a piecewise fashion over time, such as is done in the mote-appropriate Mate' virtual machine of the related art. The inventors also point out that in some applications motes are low-power and/or low bandwidth devices, and thus in some implementations the system(s) and process(es) described herein allow many minutes (e.g., hours, days, or even weeks) for herein described agents and/or processes to migrate to and establish themselves at various motes. The same may also hold true for transmission of information among motes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

For sake of clarity, some implementations shown/described herein include various separate architectural components. Those skilled in the art will appreciate that the separate architectural components are so described for sake of clarity, and are not intended to be limiting. Those skilled in the art will appreciate the herein-described architectural components, such reporting entities, logs, and/or device entities, etc. are representative of substantially any architectural components that perform in a similar manner. For example, while some implementations show reporting entities obtaining information from logs created with device entity data, those skilled in the art will appreciate that such implementations are representative of reporting entities obtaining the data directly from the device entities. As another example, while some implementations show reporting entities obtaining information produced by device entities, those skilled in the art will appreciate that such implementations are representative of queries executing at the mote that extract and/or transmit similar information as that described in the relation to the reporting entities and/or device entities (e.g., some multi-mote creation agent making a query of a database entity resident at a mote, where the database entity would perform in a fashion similar to that described in relation to reporting entities, logs, and/or device entities, etc.). Thus, those skilled in the art will appreciate that the architectural components described herein are representative of virtually any grouping of architectural components that perform in a similar manner.

B. Process(es) and/or Scheme(s)

Mote 200 of FIG. 2 can serve as a context in which one or more processes and/or devices may be illustrated. In one exemplary process, once log creation agent 202 has become active at mote 200, log creation agent 202 communicates with device entity registry 210 to receive device identifiers indicative of device entities present at mote 200 (e.g., light device entity 110, electrical/magnetic device entity 112, pressure device entity 114, etc.). In some implementations, device entities of mote 200 register their presences with device entity registry 210, while in other implementations the operating system of mote 200 registers the device entities when the operating system installs the device entities and/or their associated drivers (if any). In some implementations, device entity registry 210 receives device identifiers from an external source (e.g., receiving the device identifiers from a multi-mote creation agent, an aggregation agent, or a federation agent that transmits over a wireless link). In some implementations, once log creation agent 202 becomes aware of what device entities are present, log creation agent 202 communicates with the device entities (e.g., light device entity 110, electrical/magnetic entity 112, pressure entity 114, etc.) to find out what sensing/control functions are present and/or available at their various respectively associated devices (e.g., light device 140, electrical/magnetic device 142, pressure device 144, etc.). In some implementations, log creation agent 202 also communicates with routing/spatial log 252 to find out the mote-network address of mote 200 (e.g., mote-network address 6A) as well as other spatial information (e.g., mote-network addresses and/or spatial locations of the motes that can be reached directly by wireless link from mote 200; spatial locations may be absolute and/or relative to some marker, such as mote 200 itself). In some implementations, log creation agent 202 communicates with the device entities using a common application protocol which specifies standard interfaces that allow log creation agent 202 to garner the necessary information without knowing the internal workings and/or architectures of each specific device entity. In other implementations, such a common application protocol is not used.

In various implementations, contemporaneous with and/or subsequent to log creation agent 202 communicating with the device entities, log creation unit 202 creates one or more mote-addressed content logs. In some implementations the one or more mote-addressed content logs are associated with the mote-network address of the mote at which log creation unit 202 resides. The inventors point out that examples of the term "log," and/or phrases containing the term "log," exist in the text (e.g., independent claims, dependent claims, detailed description, and/or summary) and/or drawings forming the present application and that such term and/or phrases may have scopes different from like terms and/or phrases used in other contexts. In some implementations the one or more mote-addressed content logs are time stamped with the time the log was created. Mote 200 is depicted for sake of illustration as having a mote-address of 6A. Accordingly, a specific example of more general mote-addressed content logs is shown in FIG. 2 as mote 6A-addressed sensing/control log 204. Mote 6A-addressed sensing/control log 204 is depicted as listing the sensing and/or control information in association with device-identifiers associated with devices present and/or available at mote 200. Mote 6A-addressed sensing/control log 204 is also depicted for sake of illustration as having been created at the current time, and thus is shown stamped with the denotation "tcurrent." In addition, shown as yet another specific example of more general mote-addressed content logs is mote 6A-addressed routing/spatial log 252, which typically contains a listing of mote-network addresses of those motes directly accessible from mote 200 and such directly accessible motes' spatial orientations relative to mote 200 and/or some other common spatial reference location (e.g., GPS). Mote 6A-addressed routing/spatial log 252 is also depicted as having a time stamp of "tcurrent," In some implementations, log creation unit 202 creates one or more extensible mote-addressed content logs (e.g., creating the one or more extensible logs in response to a type of content being logged). In addition, those having skill in the art will appreciate that while direct mote addressing is shown and described herein for sake of clarity (e.g., mote-appropriate network addresses), the mote addressing described herein may also entail indirect addressing, dependent upon context. Examples of indirect addressing include approaches where a mote-address encodes an address of an agent that in turn produces the address of the mote (analogous to the Domain Name System in the Internet), or where the mote-address directly or indirectly encodes a route to a mote (analogous to explicit or implicit routable addresses.). Those having skill in the art will appreciate that adapting the teachings herein to indirect addressing may be done with a reasonable amount of experimentation, and that such adaptation is not expressly set forth herein for sake of clarity.

As noted herein, a content log may have a device identifier which in various implementations may include an implicit and/or explicit indicator used to reference the specific device at that mote. Those having skill in the art will appreciate that ways in which such may be achieved include the use of a structured name. Those having skill in the art will appreciate that in some implementations mote-local devices may also have global addresses, which may be substituted or allowed to "stand in" for mote addresses.

II. Transmission of Mote-Associated Log Data

A. Structure(s) and/or System(s)

Figure 3:
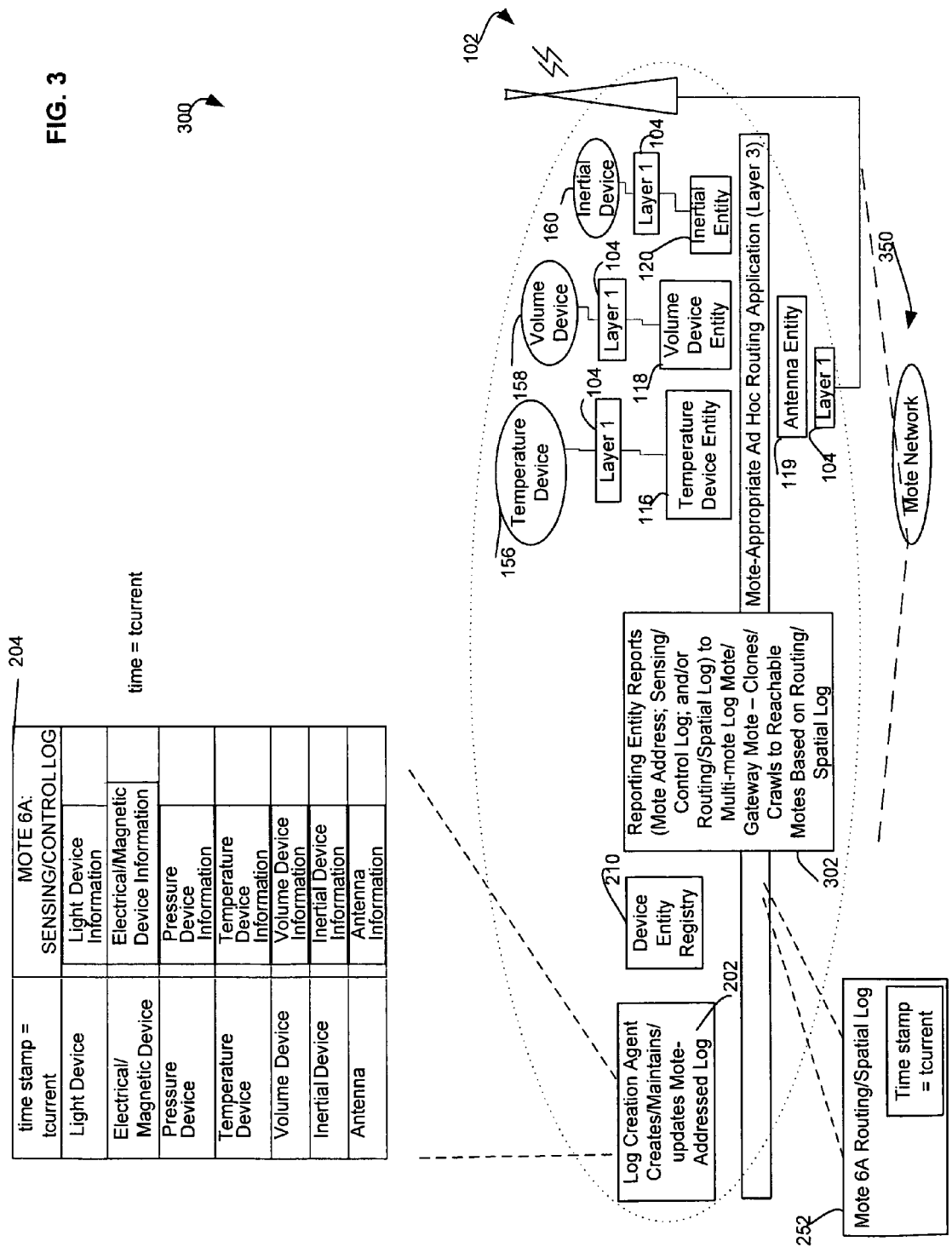
FIG. 3 depicts an exploded view of mote 300 forming a part of mote-appropriate network 350 that may serve as a context for introducing one or more processes and/or devices described herein.

With reference now to FIG. 3, depicted is an exploded view of mote 300 forming a part of mote-appropriate network 350 that may serve as a context for introducing one or more processes and/or devices described herein. Mote 300 is illustrated as similar to mote 200 (FIG. 2), but with the addition of reporting entity 302. In some implementations, reporting entity 302 is a computer program—resident in mote 300—that executes on a processor of mote 300 and that transmits all or a part of mote-addressed sensing/control log 204, and/or mote-addressed routing/spatial log 252 to another entity (e.g., through antenna 102 to a multi-mote log creation agent such as shown/described in relation to FIG. 5 or through a mote-network to a designated gateway such as shown/described in relation to FIGS. 7, 8, 11, and/or 12). In some implementations, reporting entity 302 is pre-installed on mote 300 prior to mote 300 being added to a mote-appropriate network, while in other implementations reporting entity 302 crawls and/or is transmitted to mote 300 from another location (e.g., a reporting entity at another mote or another networked computer (not shown) clones itself and sends that clone to mote 300). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various motes. The same may also hold true for transmission of information among motes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 300 of FIG. 3 can serve as a context in which one or more processes and/or devices may be illustrated. In one exemplary process, reporting entity 302 transmits at least a part of a content log to another entity either resident within or outside of mote network 350 (e.g., through antenna 102 to a multi-mote log creation agent such as shown/described in relation to FIG. 5 or through a mote-network to a designated gateway-proximate mote as shown/described in relation to FIGS. 5, 6, 7, 8, 9, 11 and/or 12). In some implementations, reporting entity 302 transmits in response to a received schedule (e.g., received from multi-mote log creation agent 502 of FIG. 5 and/or federated log creation agent 914 of FIGS. 11 and/or 12). In some implementations, reporting entity 302 transmits in response to a derived schedule. In some implementations, the schedule is derived in response to one or more optimized queries. In some implementations, the schedule is derived in response to one or more stored queries (e.g., previously received or generated queries).

Figure 10:
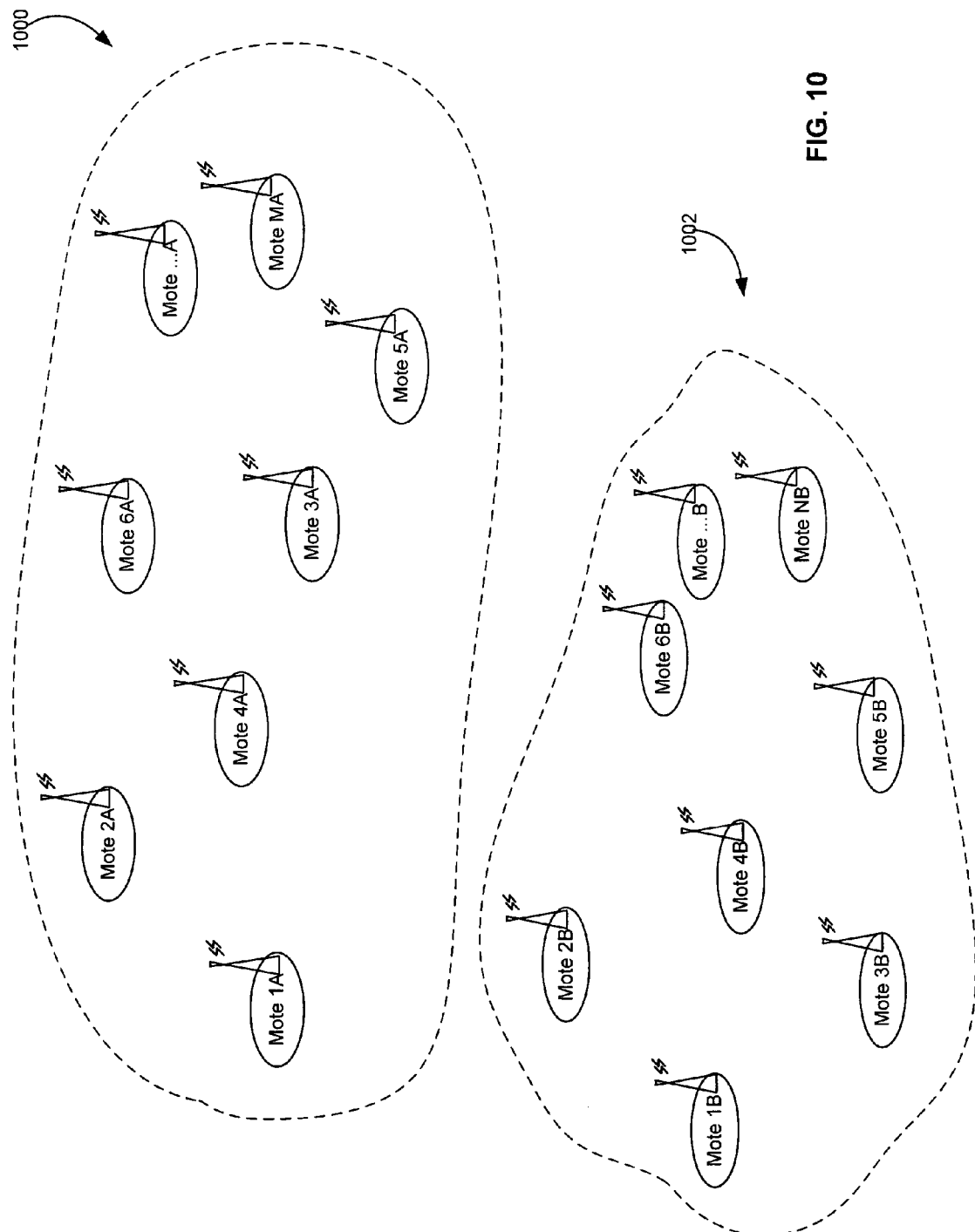
FIG. 10 shows a high-level diagram of first-administered set 1000 of motes addressed 1A through MA, and second-administered set 1002 of motes addressed 1B through NB (M and N are integers greater than 1; A and B are letters used herein to help distinguish differently administered networks as in FIGS. 10, 11 and 12) that may form an environment for process(es) and/or device(s) described herein.

In some implementations, reporting entity 302 transmits in response to a received query (e.g., received from multi-mote log creation agent of FIG. 5 and/or federated log creation agent of FIG. 9 or 10). In various implementations, reporting entity 302 transmits using either or both public key and private key encryption techniques. In various other implementations, reporting entity 302 decodes previously encrypted data, using either or both public key and private key encryption techniques, prior to the transmitting.

Figure 4:
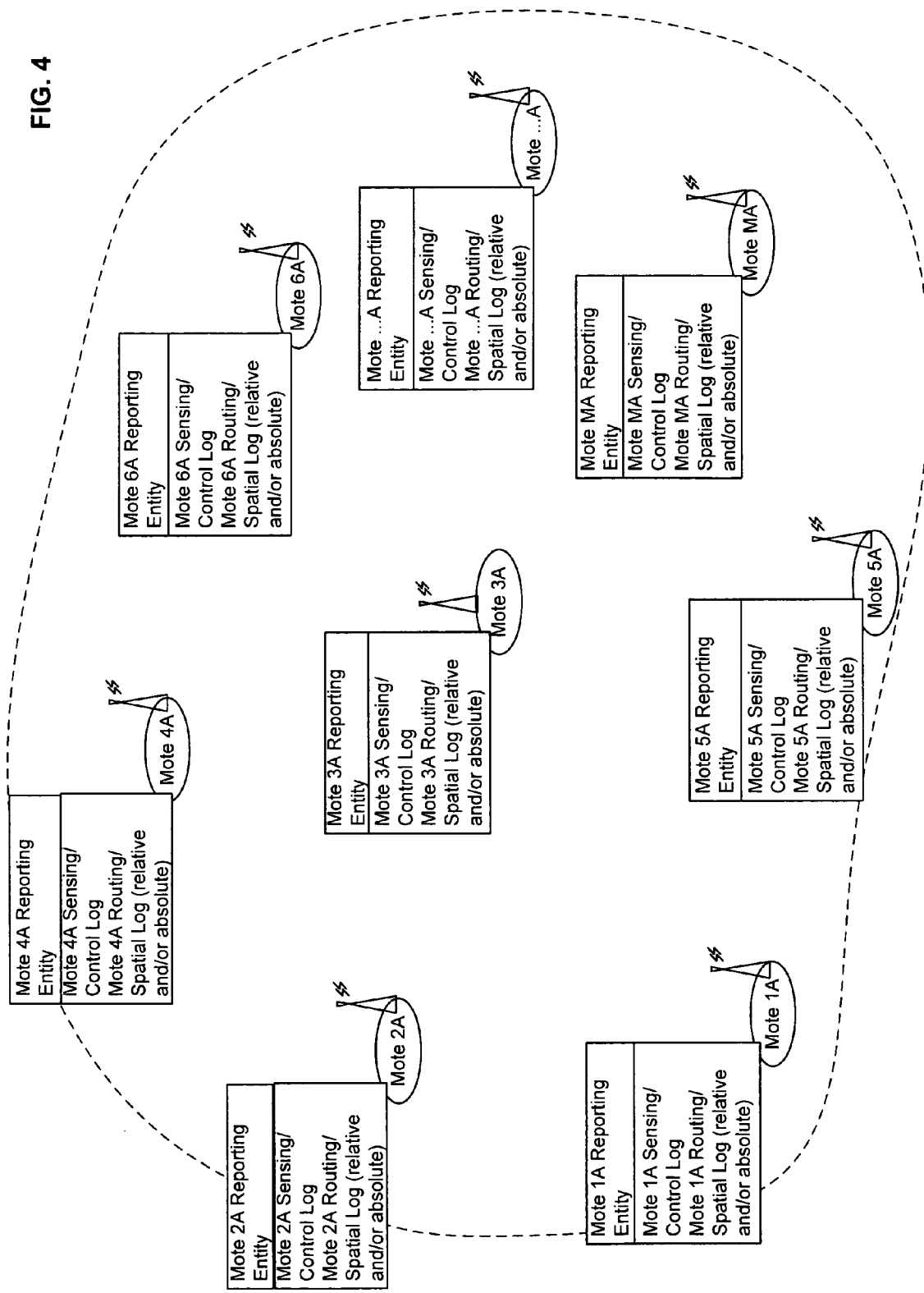
FIG. 4 shows a high-level diagram of a network having a first set 400 of motes addressed 1A through MA (M is an integer greater than 1; A is the letter A and in some instances is used herein to help distinguish differently administered networks such as shown/described in relation to FIGS. 10, 11, and/or 12), which may form a context for illustrating one or more processes and/or devices described herein.

Referring now to FIG. 4, shown is a high-level diagram of a network having a first set 400 of motes addressed 1A through MA (M is an integer greater than 1; A is the letter A and in some instances is used herein to help distinguish differently administered networks such as shown/described in relation to FIGS. 10, 11, and/or 12), which may form a context for illustrating one or more processes and/or devices described herein. Each mote is shown as having a mote-addressed content log that includes a sensing/control log and/or a routing/spatial log respectively associated with the sensing/control information at each such mote and/or the spatial locations (relative and/or absolute) of motes that can be reached by direct transmission from each such mote. In some implementations, the motes' various logs are created and/or function in fashions similar to logs shown/described elsewhere herein (e.g., in relation to FIG. 3). In addition, shown is that the motes of FIG. 4 include reporting entities that are created and/or function in ways analogous to the creation and/or functioning of reporting entities as shown and described elsewhere herein (e.g., in relation to FIG. 3). In addition, although not explicitly shown, one or more of the motes of FIG. 4 may include log creation agents that are created and/or function in ways analogous to the creation and/or functioning of log creation agents as shown and described elsewhere herein (e.g., in relation to FIG. 2). In some implementations, the reporting entities at each mote transmit all or a part of their mote-addressed content logs (e.g., mote-addressed sensing/control logs, and/or mote-addressed routing/spatial logs) to one or more entities (e.g., multi-mote log creation agent 502 such as shown/described in relation to FIG. 5 and/or multi-mote log creation agent 716 such as shown/described in relation to FIGS. 7, 9 and 10). In some implementations, such transmissions are done in response to a schedule, and in other implementations such transmissions are done in response to queries from the one or more entities. Such transmissions may be in response to received schedules, in response to schedules derived at least in part from optimized queries, in response to schedules derived at least in part from received queries, and/or in response to received queries such as described here and/or elsewhere herein.

III. Aggregating Mote-Associated Log Data

A. Structure(s) and/or System(s)

With reference now to FIG. 5, depicted is an exploded view of mote 500 forming a part of mote-appropriate network 550 that may serve as a context for introducing one or more processes and/or devices described herein. Mote 500 is illustrated as similar to mote 300 (FIG. 3), but with the addition of multi-mote log creation agent 502, multi-mote content log 504, and multi-mote registry 510 (e.g., a registry of motes under the aegis of multi-mote log creation agent 502 and/or from which multi-mote content log 504 is to be constructed). Multi-mote content log 504 typically contains at least a part of content logs from at least two differently-addressed motes. As an example of the foregoing, multi-mote content log 504 is shown containing sensing/control mote-addressed logs and mote-addressed routing/spatial logs for two differently addressed motes: a mote having mote-network address of 1A and a mote having a mote-network address of 3A. In some implementations, the sensing/control logs and/or routing/spatial logs function more or less analogously to mote-addressed sensing/content log 204, and/or mote-addressed routing/spatial log 252 of mote 200 (e.g., as shown/described in relation to FIG. 2). In some implementations, multi-mote log creation agent 502 is a computer program—resident in mote 500—that executes on a processor of mote 500 and that constructs and stores multi-mote content log 504 in memory of mote 500. In some implementations, multi-mote log creation agent 502 is pre-installed on mote 500 prior to mote 500 being added to a mote-appropriate network, while in other implementations multi-mote log creation agent 502 crawls and/or is transmitted to mote 500 from another location (e.g., a multi-mote log creation agent at another mote or another networked computer (not shown) clones itself and sends that clone to mote 500). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various motes. The same may also hold true for transmission of information among motes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

B. Process(es) and/or Scheme(s)

Mote 500 of FIG. 5 can serve as a context in which one or more processes and/or devices may be illustrated. In one exemplary process, once multi-mote log creation agent 502 has become active at mote 500, multi-mote log creation agent 502 obtains a listing of motes from which multi-mote content log 504 is to be constructed (e.g., a listing of motes making up a part of mote network 550). In some implementations, multi-mote log creation agent 502 obtains the listing of motes from which multi-mote content log 504 is to be constructed by communicating with multi-mote registry 510 to learn what mote-network addresses multi-mote log creation agent 502 is to consult to create multi-mote content log 504. In some implementations, various log creation agents at various respective motes (e.g., the log creation agents at the motes of FIG. 4) register their mote addresses with multi-mote registry 510, while in other implementations an administrator (e.g., either at or remote from mote 500) registers the mote-addresses in multi-mote registry 510. In some implementations, a system administrator places various motes under the aegis of particular multi-mote log creation agents based on a single criterion or combined criteria such as spatial locations, bandwidths, qualities of service of data communication links, and/or contents of data captured at various particular motes. In other implementations, multi-mote log creation agent 502 is pre-loaded with knowledge of the listing of motes from which multi-mote content log 504 is to be constructed. In yet other implementations, the listing of motes from which multi-mote content log 504 is to be constructed is obtained from various motes that inform multi-mote log creation agent 502 that such various motes are to be included in the listing. Those having skill in the art will appreciate that other mechanisms for obtaining the listing, consistent with the teachings herein, may be substituted.

In some implementations, once multi-mote log creation agent 502 becomes aware of the mote-addresses for which it (multi-mote log creation agent 502) is responsible, multi-mote log creation agent 502 communicates with the various respective reporting entities at the various motes for which multi-mote log creation agent 502 is responsible and receives all or part of various respective mote-addressed content logs (e.g., at least a part of one or more sensing/control logs and/or one or more routing/spatial logs such as shown and described elsewhere herein). Thereafter, multi-mote log creation agent 502 uses the various reported mote-addressed content logs to construct and/or save multi-mote content log 504 by aggregating at least a part of mote-addressed content logs from two separately addressed and/or actually separate motes. For example, multi-mote content log 504 is shown as an aggregate of sensing/control and routing/spatial logs for motes having mote-network addresses of 1A and 3A, although typically multi-mote content logs will log more than just two motes.

In some implementations, multi-mote log creation agent 502 receives all or part of various respective mote-addressed content logs from various respective reporting entities at various motes which transmit in response to a schedule (e.g., once every 18 minutes). In some implementations, the schedule may be received, pre-stored, and/or derived (e.g., such as shown/described in relation to other transmissions described elsewhere herein). In addition, while the present application describes multi-mote log creation agent 502 receiving all or part of various respective mote-addressed content logs from the various respective reporting entities at the various motes (e.g., mote 1A and/or mote 3A), those having skill in the art will appreciate that in other implementations multi-mote log creation agent 502 receives all or part of such logs from one or more motes representing the first set of motes.

In various implementations discussed herein, multi-mote log creation agent 502 receives mote-addressed content logs transmitted by reporting entities of various motes from which multi-mote log creation agent 502 creates multi-mote content log 504. In other implementations, multi-mote log creation agent 502 receives one or more previously-created multi-mote content logs transmitted by multi-mote reporting entities at various motes from which multi-mote log creation agent 502 creates multi-mote content log 504. That is, in some implementations, multi-mote log creation agent 502 creates multi-mote content log 504, at least in part, from a previously generated aggregate of mote-addressed content logs (e.g., from a previously generated multi-mote content log). In some implementations, such received multi-mote content logs have been created by other multi-mote log creation agents resident at other motes throughout a mote network (e.g., a mote network such as shown in FIG. 4). Subsequent to receiving such previously created multi-mote content logs, multi-mote log creation agent 502 then aggregates the multi-mote content logs to form another multi-mote content log. In yet other implementations, multi-mote log creation agent 502 aggregates both mote-addressed content logs and multi-mote content logs respectively received from various reporting entities to create a multi-mote content log. The inventors point out that in some applications motes are low-power and/or low bandwidth devices, and thus in some implementations the systems and processes described herein allow many minutes (e.g., hours, days, or even weeks) for herein described agents and processes to migrate to and establish themselves at various motes (e.g., by transferring their instructions in a piecewise fashion over time). The same may also hold true for transmission of information among motes.

IV. Transmission of Aggregated Mote-Associated Log Data
A. Structure(s), and/or System(s)

Figure 6:
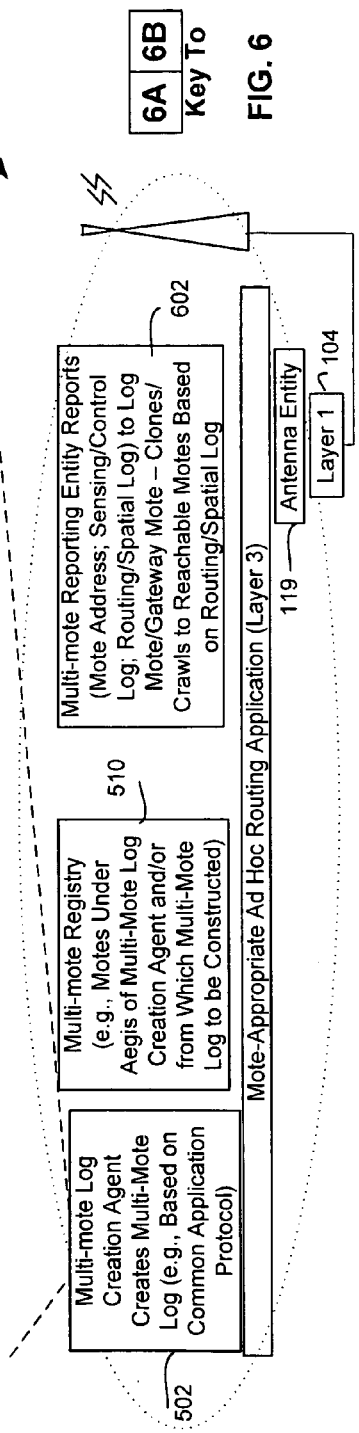
FIG. 6 depicts an exploded view of mote 600 forming a part of mote-appropriate network 550 (FIG. 5) that may serve as a context for introducing one or more processes and/or devices described herein.

With reference now to FIG. 6, depicted is an exploded view of mote 600 forming a part of mote-appropriate network 550 (FIG. 5) that may serve as a context for introducing one or more processes and/or devices described herein. Mote 600 is illustrated as similar to mote 500 (FIG. 5), but with the addition of multi-mote reporting entity 602. In some implementations, multi-mote reporting entity 602 is a computer program—resident in mote 600—that executes on a processor of mote 600. In some implementations, multi-mote reporting entity 602 is a computer program that is pre-installed on mote 600 prior to mote 600 being added to a mote-appropriate network, while in other implementations multi-mote reporting entity 602 is a computer program that crawls and/or is transmitted to mote 600 from another location (e.g., a reporting entity at another mote or another networked computer (not shown) clones itself and sends that clone to mote 600). The inventors point out that in some applications the crawling and/or transmissions described herein are performed in a piecewise fashion over time, such as is done in the mote-appropriate Mate' virtual machine of the related art. The inventors also point out that in some applications motes are low-power and/or low bandwidth devices, and thus in some implementations the crawling and/or transmissions described herein allow many minutes (e.g., hours, days, or even weeks) for herein described agents and/or processes to migrate to and establish themselves at various motes. The same may also hold true for transmission of information among motes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

Figure 7:
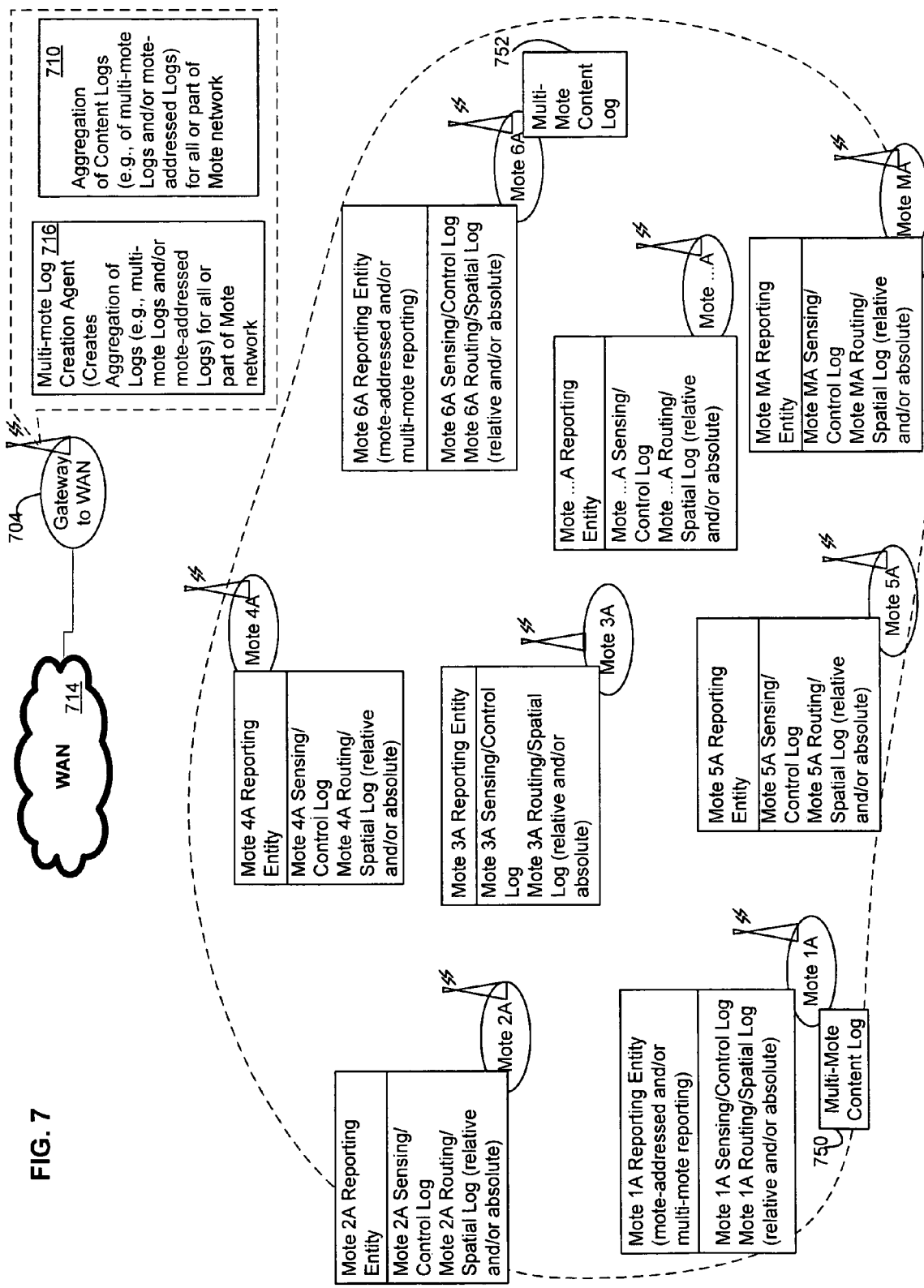
FIG. 7 shows a high-level diagram of an exploded view of a mote appropriate network that depicts a first set of motes addressed 1A through MA (M is an integer greater than 1; A is the letter A and in some instances is used herein to help distinguish differently administered networks as in FIGS. 11 and/or 12), which may form an environment for process(es) and/or device(s) described herein.

Referring now to FIG. 7, shown is a high-level diagram of an exploded view of a mote appropriate network that depicts a first set of motes addressed 1A through MA (M is an integer greater than 1; A is the letter A and in some instances is used herein to help distinguish differently administered networks as in FIGS. 11 and/or 12), which may form an environment for process(es) and/or device(s) described herein. Each mote is shown as having a mote-addressed content log that includes a sensing/control log and/or a routing/spatial log respectively associated with the sensing/control functions of devices at each such mote and/or the spatial locations (relative and/or absolute) of motes that can be reached by direct transmission from each such mote. In some implementations, the motes' various logs are created and/or function in fashions similar to mote-addressed logs shown and described herein (e.g., in relation to FIGS. 2, 3, and/or FIG. 4). In some implementations, the motes' various logs are created and/or function in fashions similar to multi-mote content logs shown and described herein (e.g., in relation to FIGS. 5 and/or 6). For example, mote 1A (i.e., mote having mote-network address 1A) and mote 6A (i.e., mote having mote-network address 6A) are shown having multi-mote content logs 750 and 752 respectively. The multi-mote content logs are created and/or function in ways analogous to those shown and/or described elsewhere herein.

Mote 4A is shown in FIG. 7 as proximate to gateway 704 onto WAN 714 (e.g., the Internet). Multi-mote log creation agent 716 is depicted as executing on the more powerful computational systems of gateway 704 (e.g., a mini and/or mainframe computer system) to create aggregation 710 of content logs. Those having skill in the art will appreciate that aggregation 710 of content logs may be composed of multi-mote content logs and/or individual mote-addressed content logs. Those having skill in the art will appreciate that aggregations of multi-mote content logs in themselves may be considered aggregates of one or more individual mote-addressed content logs and thus types of multi-mote content logs. Those having skill in the art will appreciate that multi-mote content logs in themselves may be considered aggregates of one or more individual mote-addressed content logs and thus types of aggregations of content indexes.

Figure 8:
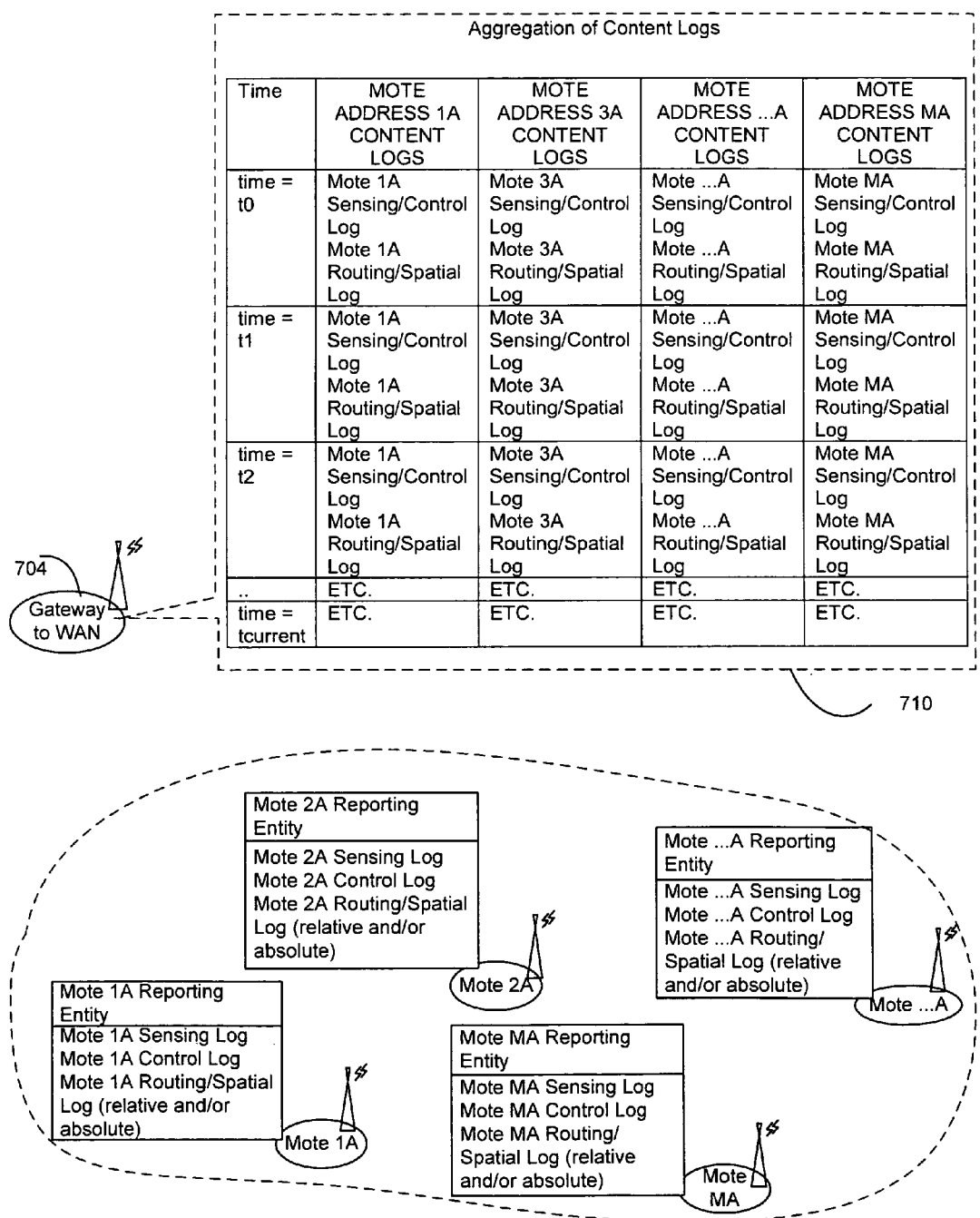
FIG. 8 shows an exploded view of aggregation 710 of content logs of FIG. 7. Aggregation 710 of content logs is shown as having mote addressed content logs for motes 1A through MA for times t=t0 (an initial time) through and up to time=tcurrent (a current time).

With reference now to FIG. 8, shown is an exploded view of aggregation 710 of content logs of FIG. 7. Aggregation 710 of content logs is shown as having mote addressed content logs for motes 1A through MA for times t=t0 (an initial time) through and up to time=tcurrent (a current time). In general, the time entries correspond with and/or are derived from time stamps of one or more mote-addressed logs such as those described elsewhere herein.

With reference now to FIG. 9, depicted is an exploded view of aggregation 710 of content logs of FIG. 7. Aggregation 710 of content logs is shown as having mote addressed content logs for motes 1A through MA for times t=t0 (an initial time) through and up to time=tcurrent (a current time). In general, the time entries of the table correspond and/or are derived from time stamps of mote-addressed logs as described elsewhere herein. Example entries for time=t0 are shown for motes having mote-network addresses of 1A and MA. Those skilled in the art will appreciate that entries at other times could be similar to or different from those shown.

Referring now again to FIG. 7, the motes are shown having reporting entities that function analogously to other reporting entities described herein (e.g., multi-mote reporting entity 602 and/or reporting entity 302). In some implementations, such reporting entities are computer programs that execute on processors of the motes wherein such reporting entities are resident and that transmit all or a part of logs at their motes (e.g., mote-addressed content logs and/or multi-mote content logs) to other entities (e.g., multi-mote log creation agents at designated mote addresses and/or designated gateway-proximate motes). In some implementations, the reporting entities are pre-installed on the motes prior to such motes' insertion to a mote-appropriate network, while in other implementations such reporting entities crawl and/or are transmitted to their respective motes from other locations (e.g., a reporting entity at another mote or another networked computer (not shown) clones itself and sends that clone to another mote). In addition, in some implementations one or more of the reporting entities is given access to the content logs of the motes and thereafter use such access to report on the content of the motes. The multi-mote content logs and/or mote-addressed content logs may be as shown and/or described both here and elsewhere herein, and such elsewhere described material is typically not repeated here for sake of clarity In some implementations, various reporting entities at various motes transmit in response to a schedule (e.g., once every 24 hours). In one specific example implementation, a reporting entity transmits in response to a received schedule (e.g., received from multi-mote log creation agent 716 and/or from federated log creation agent 914 of FIGS. 11 and/or 12). In another specific example implementation, a reporting entity transmits in response to a derived schedule. In another specific implementation, the schedule is derived in response to one or more optimized queries. In yet other implementations, the schedule is derived in response to one or more stored queries (e.g., previously received and/or generated queries).

In other implementations, the reporting entities transmit in response to received queries (e.g., received from multi-mote log creation agents or federated log creation agents). In various implementations, the reporting entities transmit using either or both public key and private key encryption techniques. In various other implementations, the reporting entities decode previously encrypted data, using either or both public key and private key encryption techniques, prior to the transmitting.

B. Process(es) and/or Scheme(s)

With reference now again to FIGS. 6-7 and/or FIGS. 9-13 the depicted views may serve as a context for introducing one or more processes and/or devices described herein. Some exemplary processes include the operation of transmitting at least a part of an aggregate of one or more mote-addressed content logs of a first set of motes. In one instance, multi-mote reporting entity 602 transmits at least a part of multi-mote content log 504 to another entity (e.g., another multi-mote log creation agent at a designated mote address, or a designated gateway-proximate mote or a federated log creation agent such as shown and/or described in relation to FIGS. 7, 8, 9, 11, and/or 12). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of transmitting at least a part of one or more multi-mote content logs of the first set of motes. In one instance, multi-mote reporting entity 602 transmits at least a part of at least one of a mote-addressed sensing/control log of multi-mote content log 504 to another entity (e.g., another multi-mote log creation agent at a designated mote address or a designated gateway-proximate mote or a federated log creation agent such as shown and/or described in relation to FIGS. 11 and/or 12). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of transmitting at least a part of a mote-addressed routing/spatial log. In one instance, multi-mote reporting entity 602 transmits at least a part of a mote-addressed routing/spatial log of multi-mote content log 504 to another entity (e.g., another multi-mote log creation agent at a designated mote address, or a designated gateway-proximate mote, or a federated log creation agent such as shown and/or described in relation to FIGS. 7, 8, 9, 11 and/or 12). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of effecting the transmitting with a reporting entity. In one instance, multi-mote reporting entity 602 is a logical process at mote 600 that transmits a part of an aggregate of one or more mote-addressed content logs (e.g., multi-mote logs and/or aggregations of other logs such as mote-addressed and multi-mote logs). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of obtaining access to the one or more mote-addressed content logs of the first set of motes. In one instance, multi-mote reporting entity 602 is granted the access by an entity such as a system administrator. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of effecting the transmitting in response to a schedule. In one instance, multi-mote reporting entity 602 transmits at least a part of multi-mote content log 504 in response to a schedule (e.g., once every 24 hours). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of receiving the schedule. In one instance, multi-mote reporting entity 602 transmits at least a part of multi-mote content log 504 in response to a received schedule (e.g., received from multi-mote log creation agent 718 and/or a federated log creation agent 914 of FIGS. 11 and/or 12). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of deriving the schedule. In one instance, multi-mote reporting entity 602 transmits at least a part of multi-mote content log 504 in response to a derived schedule (e.g., derived in response to an optimized query and/or one or more stored queries). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of effecting the transmitting in response to a query. In one instance, multi-mote reporting entity 602 transmits at least a part of multi-mote content log 504 in response to a received query (e.g., received from a multi-mote log creation agent or a federated log creation agent). Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of encrypting utilizing at least one of a private or a public key. In one instance, multi-mote reporting entity 602 transmits at least a part of multi-mote content log 504 using either or both public key and private key encryption techniques. Those skilled in the art will appreciate that the foregoing specific exemplary processes are representative of more general processes taught elsewhere herein, such as in the claims filed herewith and/or elsewhere in the present application.

In some specific exemplary processes, the operation of transmitting at least a part of an aggregate of one or more mote-addressed content logs of a first set of motes includes but is not limited to the operation of decoding at least a part of one or more mote-addressed content logs utilizing at least one of a public key or a private key. In one instance, multi-mote reporting entity 602 decodes previously encrypted data, using either or both public key and private key encryption techniques, prior to the transmitting of at least a part of multi-mote content log 504. Those skilled in the art will appreciate that the foregoing specific exemplary processes are representative of more general processes taught elsewhere herein, such as in the claims filed herewith and/or elsewhere in the present application.

V. Federating Mote-Associated Log Data

A. Structure(s) and/or System(s)

Referring now to FIG. 10, shown is a high-level diagram of first-administered set 1000 of motes addressed 1A through MA, and second-administered set 1002 of motes addressed 1B through NB (M and N are integers greater than 1; A and B are letters used herein to help distinguish differently administered networks as in FIGS. 10, 11, and 12) that may form an environment for process(es) and/or device(s) described herein. In some implementations, first-administered set 1000 of motes constitutes all or part of a network under a first administrator and second-administered set 1002 of motes constitutes all or part of a network under a second administrator, where the first and/or second administrators tend not to have any significant knowledge of the internal operations of networks they don't administer. Examples in which this may be the case are where first-administered set 1000 and second-administered set 1002 are owned by different business entities, and where first-administered set 1000 and second-administered set 1002 have been constructed for two separate purposes (e.g., one set to monitor crops and the other set to monitor building systems, and thus the systems were not designed to interact with each other). In some implementations, first-administered set 1000 of motes constitutes all or part of a network under a first administrator and second-administered set 1002 of motes constitutes all or part of a network under a second administrator, where either or both of the first administrator and the second administrator has some knowledge of the networks they don't administer, but the networks are administered separately for any of a variety of reasons such as security, current employment, permissions, job function distinction, organizational affiliation, workload management, physical location, network disconnection, bandwidth or connectivity differences, etc. In some implementations, first-administered set 1000 of motes constitutes all or part of a network under a first transient administration and second-administered set 1002 of motes constitutes all or part of a network under a second transient administration, where either or both the first and second transient administrations are those such as might exist when a network partitions or a signal is lost.

The inventors have noticed that in some instances it could be advantageous for one or more systems to use resources from first-administered set 1000 of motes and second-administered set 1002 of motes. The inventors have devised one or more processes and/or devices that allow systems to use resources in such a fashion.

Figure 11:
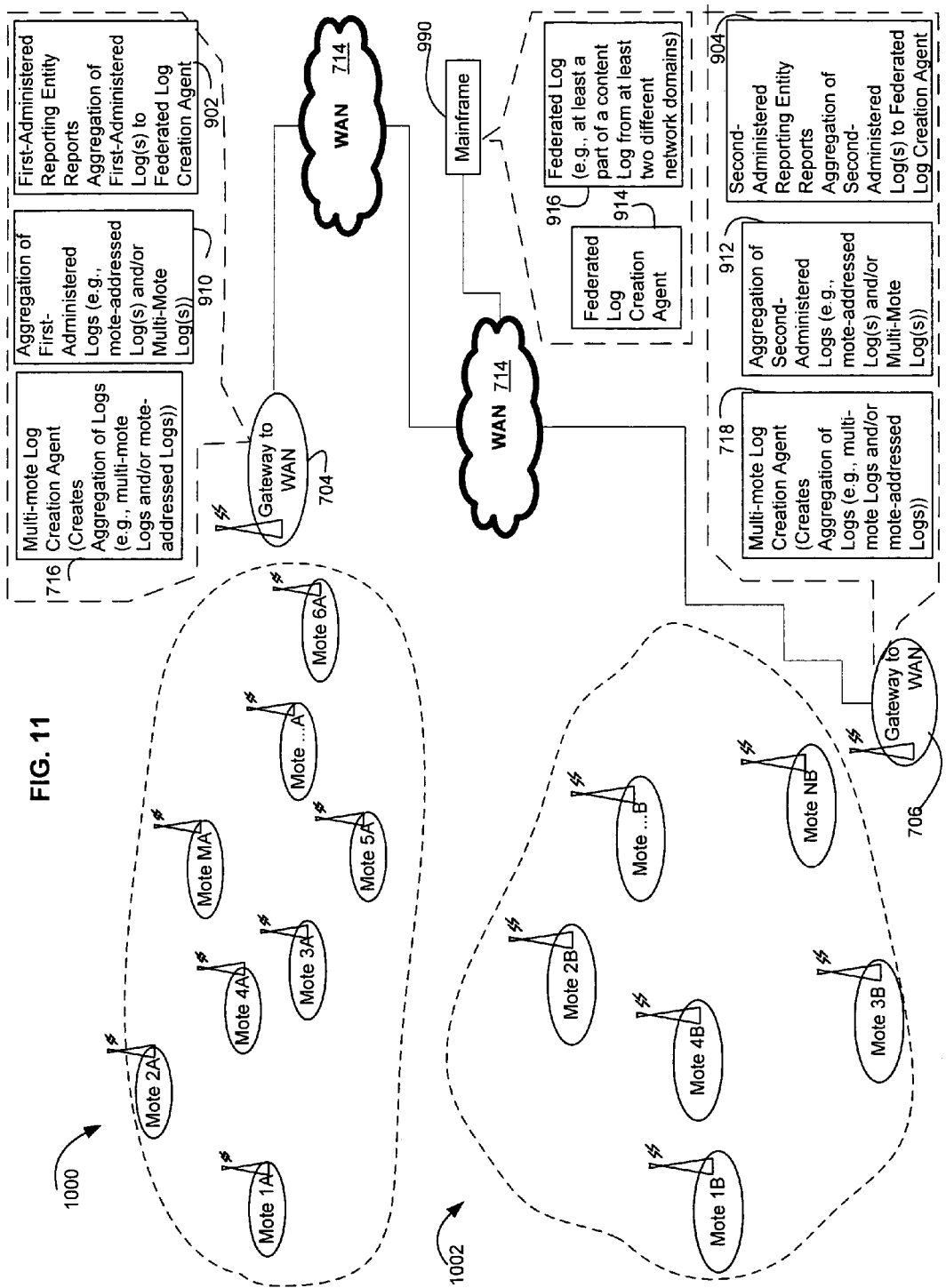
FIG. 11 shows a high-level diagram of first-administered set 1000 of motes and second-administered set 1002 of motes modified in accordance with teachings of subject matter described herein.

With reference now to FIG. 11, shown is a high-level diagram of first-administered set 1000 of motes and second-administered set 1002 of motes modified in accordance with teachings of subject matter described herein. Shown respectively proximate to first-administered set 1000 of motes and second-administered set 1002 of motes are gateways 704, 706 onto WAN 714. Gateways 704, 706 are respectively shown as having resident within them multi-mote log creation agents 716, 718 and aggregations 910, 912 of first-administered set 1000 of motes and second-administered set 1002 of motes. The gateways, multi-mote log creation agents, and aggregations are created and/or function substantially analogously to the gateways, log creation agents, and aggregations of logs described elsewhere herein (e.g., in relation to Figures), and are not explicitly described here for sake of clarity. For example, aggregation 910 of first-administered logs and aggregation 912 of second-administered logs can be composed of either or both mote-addressed and/or multi-mote content logs and in themselves can be considered instances of multi-mote content logs. Furthermore, although not expressly shown in FIG. 11 for sake of clarity, it is to be understood that in general most motes will have one or more log creation agents (e.g., multi-mote or other type), logs (e.g., multi-mote or other type), and/or reporting entities (e.g., multi-mote or other type) resident within or proximate to them (see, e.g., FIG. 12). In some implementations, the functioning and/or creation of such logs, agents, and/or entities is under the control of federated log creation agent 914. In some implementations, federated log creation agent 914, on an as-needed basis, disperses and/or activates various log creation agents and/or their associated reporting entities (e.g., as shown and described in relation to FIGS. 2, 3, and/or 4), and/or various multi-mote log creation agents and/or their associated reporting entities (e.g., as shown and described in relation to FIGS. 5, 6, and/or 7) throughout first-administered set 1000 of motes and second-administered set 1002 of motes. In some implementations, such dispersals and/or activations are done on an as-needed basis, while in other implementations such dispersals and activations are pre-programmed. In yet other implementations, the agents, logs, and/or entities are pre-programmed.

Further shown in FIG. 11 are federated log creation agent 914 and federated log 916 resident within mainframe computer system 990, which in some implementations are dispersed, created, and/or activated in fashions similar to other log creation agents and logs described herein. In some implementations, federated log creation agent 914 generates federated log 916 by obtaining at least a part of one or more logs (e.g., multi-mote and/or mote-addressed logs) from both first-administered set 1000 of motes and second-administered set 1002 of motes. In some implementations, federated log 916 typically includes at least a part of a content log from two differently-administered mote networks, such as first-administered set 1000 of motes and second-administered set 1002 of motes In some implementations, federated log 916 has one or more entries denoting one or more respective administrative domains of one or more content log entries (e.g., see federated log 916 of FIG. 12). In other implementations, federated log 916 has access information to one or more content logs for an administered content log (e.g., in some implementations, this is actually in lieu of a content log). In other implementations, federated log 916 has information pertaining to a currency of at least one entry of an administered content log. In other implementations, federated log 916 has information pertaining to an expiration of at least one entry of an administered content log. In other implementations, federated log 916 has metadata pertaining to an administrative domain, wherein the metadata includes at least one of an ownership indicator, an access right indicator, a log refresh indicator, or a predefined policy indicator. In other implementations, federated log 916 has an administrative domain-specific query string generated for or supplied by an administrative domain to produce an updated content log for that domain.

Continuing to refer to FIG. 11, aggregation 910 of first-administered logs and aggregation 912 of second-administered logs (e.g., instances of multi-mote content logs) are shown as respectively interfacing with first-administered reporting entity 902 and second-administered reporting entity 904. First-administered reporting entity 902 and/or second-administered reporting entity 904 typically are dispersed, created, and/or activated in fashions analogous to the dispersal, creation, and/or activation of other reporting entities as described elsewhere herein (e.g., in relation to FIGS. 3 and/or 6), and hence such dispersals, creations, and/or activations are not explicitly described here for sake of clarity.

In some implementations, first-administered reporting entity 902 and/or second-administered reporting entity 904 transmit all/part of their respective multi-mote content logs to federated log creation agent 914, from which federated log creation agent 914 creates federated log 916. First-administered reporting entity 902 and/or second-administered reporting entity 904 transmit in manners analogous to reporting entities discussed elsewhere herein. For example, transmitting in response to schedules received, schedules derived, and/or queries received from federated log creation agent 914, and/or transmitting using either or both public key and private key encryption techniques and/or decoding previously encrypted data, using either or both public key and private key encryption techniques, prior to the transmitting.

In the discussion of FIG. 11, federated log creation agent 914 was described as obtaining portions of aggregations of first-administered and second-administered network logs from which federated log 916 was constructed. In other implementations, federated log creation agent 914 obtains portions of first-administered and second-administered network logs from various reporting entities dispersed throughout the first-administered and second-administered mote networks 1000, 1002 (e.g., multi-mote or other type reporting entities such as those described in relation to FIGS. 3, 6, and/or elsewhere herein). Such reporting entities and logs are implicit in FIG. 9 (e.g., since the multi-mote creation agents 716, 718 would typically interact with such reporting entities to obtain logs under the purview of such entities), but are explicitly shown and described in relation to FIG. 12. In other implementations, the various reporting entities dispersed throughout the networks report directly to federated log creation agent 914. One example of such implementations is shown and described in relation to FIG. 12.

Figure 12:
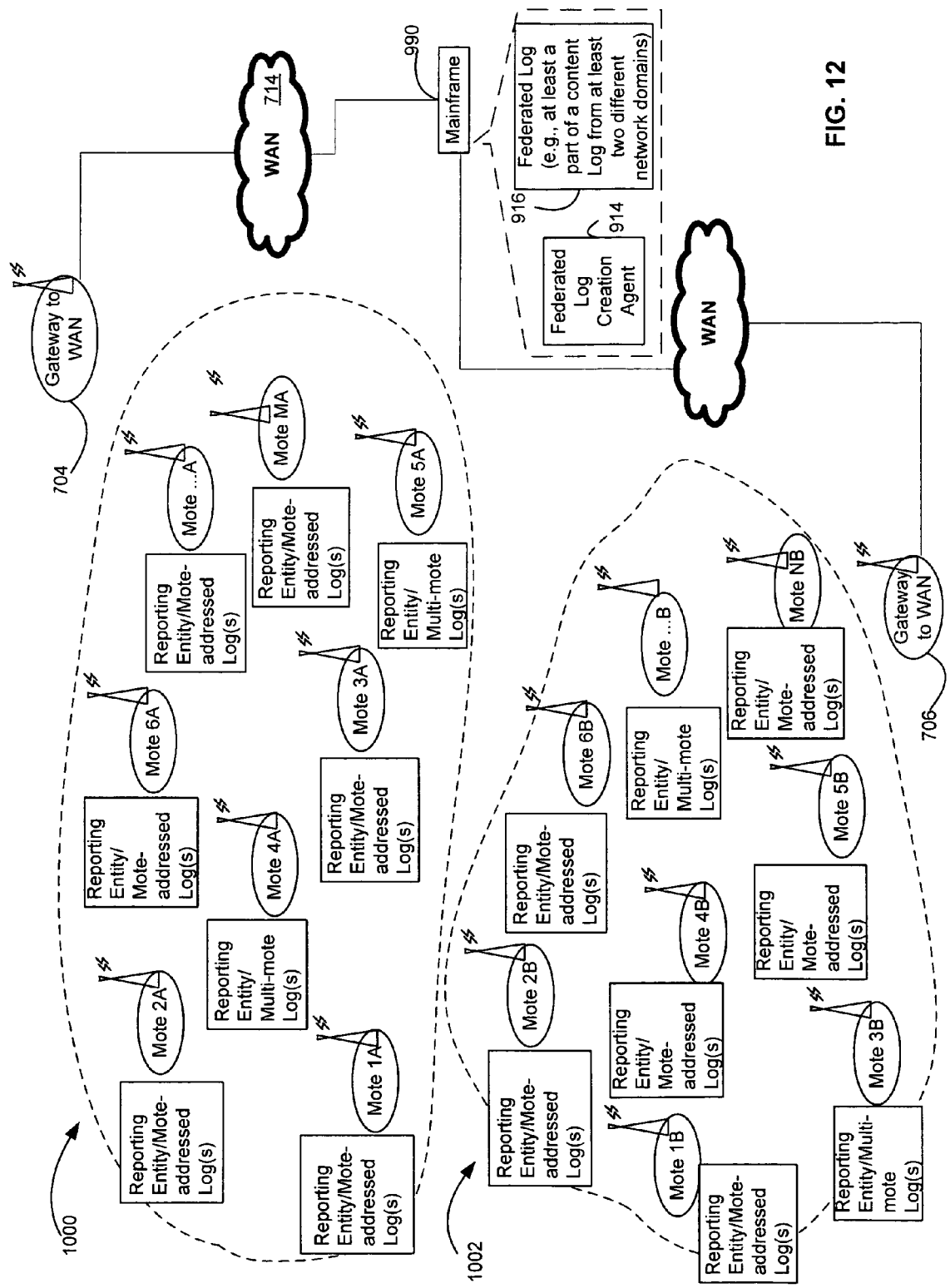
FIG. 12 shows the high-level diagram of FIG. 11, modified to show first-administered set 1000 of motes and second-administered set 1002 of motes wherein each mote is illustrated as having log(s) (e.g., mote-addressed and/or multi-mote) and associated reporting entity(ies).

Referring now to FIG. 12, shown is the high-level diagram of FIG. 11, modified to show first-administered set 1000 of motes and second-administered set 1002 of motes wherein each mote is illustrated as having log(s) (e.g., mote-addressed and/or multi-mote) and associated reporting entity(ies). The reporting entities may be of substantially any type described herein (e.g., multi-mote or other type) and the logs may also be of substantially any type described herein (e.g., multi-mote or mote-addressed content log).

In some implementations, various reporting entities dispersed throughout first-administered set 1000 of motes and second-administered set 1002 of motes transmit all/part of their respective logs (multi-mote or otherwise) to federated log creation agent 914, from which federated log creation agent creates federated log 916. The various reporting entities transmit in manners analogous to reporting entities discussed elsewhere herein. For example, transmitting in response to schedules received, schedules derived, and/or queries received from federated log creation agent 914, and/or transmitting using either or both public key and private key encryption techniques and/or decoding previously encrypted data, using either or both public key and private key encryption techniques, prior to the transmitting.

With reference now to FIG. 13, shown is an exemplary exploded view of federated log 916. Federated log 916 is shown to contain aggregations of content logs drawn from first-administered set 1000 of motes and second-administered set 1002 of motes. Shown is that federated log 916 contains aggregated sensing/control and routing/spatial logs for motes addressed 1A and 2A under the administration of a first network administrator. Depicted is that federated log 916 contains aggregated sensing/control and routing/spatial logs for motes addressed 3A and 4A under the administration of a second network administrator. Although aggregations for only two administered networks are shown, those having skill in the art will appreciate that in some implementations the number of administered networks logged could be several. In addition, although each individual administrator-specific aggregation is shown containing entries for only two motes, those having skill in the art will appreciate that in most implementations the number of motes in the aggregations will run to the hundreds, thousands, and/or higher.

B. Process(es) and/or Scheme(s)

With reference now again to FIGS. 2, 3, . . . , and/or FIG. 13, the depicted views may serve as a context for introducing one or more processes and/or devices described herein. Some exemplary processes include the operations of obtaining at least a part of a first-administered content log from a first set of motes; obtaining at least a part of a second-administered content log from a second set of motes; and creating a federated log from at least a part of the first-administered content log and the at least a part of the second-administered content log. Other more general exemplary processes of the foregoing specific exemplary processes are taught at least in the claims and/or elsewhere in the present application.

In some specific exemplary processes, the operation of obtaining at least a part of a first-administered content log from a first set of motes includes but is not limited to the operation of receiving at least a part of one or more multi-mote content logs of the first set of motes. For example, federated log creation agent 914 receiving at least a part of the multi-mote content log 752 of mote 6A (e.g., such as shown and described in relation to FIGS. 7, 8, . . . , and/or 13).

In some specific exemplary processes, the operation of receiving at least a part of one or more multi-mote content logs of the first set of motes includes but is not limited to the operation of receiving at least a part of at least one of a mote-addressed sensing/control log from at least one aggregation of one or more first-administered logs. For example, federated log creation agent 914 receiving at least a part of aggregation of first-administered log(s) 910 as transmitted by first-administered reporting entity 902 for first-administered set 1000 of motes (e.g., as shown and/or described in relation to FIGS. 7, 8, . . . , and/or 13).

In some specific exemplary processes, the operation of receiving at least a part of one or more multi-mote content logs of the first set of motes includes but is not limited to the operation of receiving at least a part of a mote-addressed routing/spatial log from at least one aggregation of one or more first-administered logs. For example, federated log creation agent 914 receiving at least a part of aggregation of first-administered log(s) 910 as transmitted by first-administered reporting entity 902 for first-administered set 1000 of motes (e.g., as shown and/or described in relation to FIGS. 7, 8, . . . , and/or 13).

In some specific exemplary processes, the operation of receiving at least a part of one or more multi-mote content logs of the first set of motes includes but is not limited to the operation of receiving at least a part of at least one of a mote-addressed sensing/control log from a multi-mote reporting entity at a mote of the first set of motes. For example, federated log creation agent 914 receiving at least a part of one or more multi-mote content logs of first-administered set 1000 of motes from one or more multi-mote content logs' associated multi-mote reporting entities (e.g., such as shown and/or described in relation to the multi-mote content logs and/or associated reporting entities of first-administered set 800 of motes of FIGS. 7, 8, . . . , and/or 13).

In some specific exemplary processes, the operation of receiving at least a part of one or more multi-mote content logs of the first set of motes includes but is not limited to the operation of receiving at least a part of a mote-addressed routing/spatial log from a multi-mote reporting entity at a mote of the first set of motes. For example, federated log creation agent 914 receiving at least a part of a mote-addressed routing/spatial log from a multi-mote reporting entity at a mote of the first-administered set 1000 of motes (e.g., such as shown and/or described in relation to the multi-mote content log of mote 6A of FIGS. 7, 8, . . . , and/or 13).

In some specific exemplary processes, the operation of obtaining at least a part of a first-administered content log from a first set of motes includes but is not limited to the operation of receiving at least a part of at least one of a mote-addressed sensing/control log from a reporting entity at a mote of the first set of motes. For example, federated log creation agent 914 receiving at least a part of a mote-addressed sensing log/control log from one or more associated reporting entities at the motes of first-administered set 800 of motes (e.g., such as shown and/or described in relation the mote-addressed content logs of motes 3A and/or 5A of FIGS. 7, 8, . . . , and/or 13).

In some specific exemplary processes, the operation of obtaining at least a part of a first-administered content log from a first set of motes includes but is not limited to the operation of receiving at least a part of a mote-addressed routing/spatial log from a reporting entity at a mote of the first set of motes. For example, federated log creation agent 914 receiving at least a part of a mote-addressed routing/spatial log from one or more associated reporting entities at the motes of first-administered set 1000 of motes (e.g., such as shown and/or described in relation to the mote-addressed content logs of motes 3A and/or 5A of 7, 8, . . . , and/or 13).

In some specific exemplary processes, the operation of obtaining at least a part of a second-administered content log from a second set of motes includes but is not limited to the operation of receiving at least a part of one or more multi-mote content logs of the second set of motes. For example, federated log creation agent 914 receiving at least a part of the multi-mote content log associated with a mote of second-administered set 1002 of motes (e.g., such as shown and/or described in relation to FIGS. 10, 11, 12 and/or 13).

In some specific exemplary processes, the operation of receiving at least a part of one or more multi-mote content logs of the second set of motes includes but is not limited to the operation of receiving at least a part of at least one of a mote-addressed sensing log/control log from at least one aggregation of one or more second-administered logs. For example, federated log creation agent 914 receiving at least a part of aggregation of second-administered log(s) 912 as transmitted by second-administered reporting entity 904 for second-administered set 1002 of motes (e.g., as shown and/or described in relation to FIGS. 10, 11, 12, and/or 13).

In some specific exemplary processes, the operation of receiving at least a part of one or more multi-mote content logs of the second set of motes includes but is not limited to the operation of receiving at least a part of a mote-addressed routing/spatial log from at least one aggregation of one or more second-administered logs. For example, federated log creation agent 914 receiving at least a part of aggregation of second-administered log(s) 912 transmitted by second-administered reporting entity 904 for second-administered set 1002 of motes (e.g., as shown and described in relation to FIGS. 10, 11, 12, and/or 13).

In some specific exemplary processes, the operation of receiving at least a part of one or more multi-mote content logs of the second set of motes includes but is not limited to the operation of receiving at least a part of at least one of a mote-addressed sensing/control log from a multi-mote reporting entity at a mote of the second set of motes. For example, federated log creation agent 914 receiving at least a part of one or more multi-mote content logs of second-administered set 1002 of motes from one or more multi-mote content logs' associated multi-mote reporting entities (e.g., such as shown and described in relation to the multi-mote content logs and/or reporting entities of second-administered set 1002 of motes of FIGS. 10, 11, 12 and/or 13).

In some specific exemplary processes, the operation of receiving at least a part of one or more multi-mote content logs of the second set of motes includes but is not limited to the operation of receiving at least a part of a mote-addressed routing/spatial log from a multi-mote reporting entity at a mote of the second set of motes. For example, federated log creation agent 914 receiving at least a part of a mote-addressed routing/spatial log from a multi-mote reporting entity at a mote of the second-administered set 1002 of motes from an associated multi-mote reporting entity (e.g., such as shown and described in relation to the multi-mote content logs and/or reporting entities of second-administered set 1002 of motes of FIGS. 10, 11, 12, and/or 13).

In some specific exemplary processes, the operation of obtaining at least a part of a second-administered content log from a second set of motes includes but is not limited to the operation of receiving at least a part of at least one of a mote-addressed sensing/control log from a reporting entity at a mote of the second set of motes. For example, federated log creation agent 914 receiving at least a part of a mote-addressed sensing/control log from one or more associated reporting entities at the motes of second-administered set 1002 of motes (e.g., such as shown and described in relation the mote-addressed content logs and associated reporting entities of second-administered set 1002 of motes of FIGS. 10, 11, 12 and/or 13).

In some specific exemplary processes, the operation of obtaining at least a part of a second-administered content log from a second set of motes includes but is not limited to the operation of receiving at least a part of a mote-addressed routing/spatial log from a reporting entity at a mote of the second set of motes. For example, federated log creation agent 914 receiving at least a part of a mote-addressed routing/spatial log from one or more associated reporting entities at the motes of second-administered set 1002 of motes (e.g., such as shown and described in relation the mote-addressed content logs of second-administered set 1002 of motes of FIGS. 10, 11, 12, and/or 13).

In some specific exemplary processes, the operation of creating a federated log from at least a part of the first-administered content log and at least a part of the second-administered content log includes the operation of federated log creation agent 914 generating federated log 916 in response to one or more logs (e.g., multi-mote and/or mote-addressed logs) obtained from both first-administered set 1000 of motes and the second-administered set 1002 of motes. In some implementations, federated log creation agent 914 creates federated log 916 to include at least a part of a content log from two differently-administered mote networks, such as first-administered set 1000 of motes and second-administered set 1002 of motes (see., e.g., federated log 916 of FIG. 13). In some implementations, federated log creation agent 914 creates federated log 916 to include one or more entries denoting one or more respective administrative domains of one or more content log entries (e.g., see federated log 916 of FIG. 13). In other implementations, federated log creation agent 914 creates federated log 916 to include access information to one or more content logs for an administered content log (e.g., in some implementations, this is actually in lieu of a content log). In other implementations, federated log creation agent 914 creates federated log 916 to include information pertaining to a currency of at least one entry of an administered content log. In other implementations, federated log creation agent 914 creates federated log 916 to include information pertaining to an expiration of at least one entry of an administered content log. In other implementations, federated log creation agent 914 creates federated log 916 to include metadata pertaining to an administrative domain, wherein the metadata includes at least one of an ownership indicator, an access right indicator, a log refresh indicator, or a predefined policy indicator. In other implementations, federated log creation agent 914 creates federated log 916 to include an administrative domain-specific query string generated for or supplied by an administrative domain to produce an updated content log for that domain.

In some specific exemplary processes, the operation of creating a federated log from at least a part of the first-administered content log and at least a part of the second-administered content log includes but is not limited to the operations of creating the federated log from at least a part of one or more multi-mote content logs of the first set of motes; creating the federated log from at least a part of at least one of a mote-addressed sensing/control log or a mote-addressed routing log/spatial log of the first set of motes; creating the federated log from at least a part of one or more multi-mote content logs of the second set of motes; and/or creating the federated log from at least a part of at least one of a mote-addressed sensing/control log or a mote-addressed routing log/spatial log of the second set of motes. For example, federated log creation agent 914 creating at least a part of federated log 916 in response to portions of multi-mote content logs (e.g., multi-mote logs and/or aggregations of logs) received from reporting entities associated with first-administered set 1000 of motes and/or second-administered set 1002 of motes (e.g., such as shown and described in relation to FIGS. 10, 11, 12, and/or 13).

With reference now again to FIGS. 2, 3, . . . , and/or 13, the depicted views may yet again serve as a context for introducing one or more processes and/or devices described herein. Some specific exemplary processes include the operations of creating one or more first-administered content logs for a first set of motes; obtaining at least a part of the one or more first-administered content logs of the first set of motes; creating one or more second-administered content logs for a second set of motes; obtaining at least a part of the second-administered content logs of the second set of motes; and creating a federated log from at least a part of the one or more first-administered content logs and at least a part of the one or more second-administered content logs.

In some specific exemplary processes, the operations of creating one or more first-administered content logs for a first set of motes and creating one or more second-administered content logs for a second set of motes function substantially analogously as the processes described in creating mote-addressed content logs, mote-addressed logs, and aggregations of logs as set forth elsewhere herein (e.g., such as shown and/or described under text/drawings of Roman Numeral headings I ("MOTE-ASSOCIATED LOG CREATION"), III ("AGGREGATING MOTE-ASSOCIATED LOG DATA"), and V ("FEDERATING MOTE-ASSOCIATED LOG DATA"), above, as well as in the as-filed claims). Accordingly, the specific exemplary processes of the operations of creating one or more first-administered content logs for a first set of motes and creating one or more second-administered content logs for a second set of motes are not explicitly redescribed here for sake of clarity, in that such specific exemplary processes will be apparent to one of skill in the art in light of the disclosure herein (e.g., as shown and described under text/drawings of Roman Numeral headings I, III, and V, above, as well as in the as-filed claims).

In some specific exemplary processes, the operations of obtaining at least a part of the one or more first-administered content logs of the first set of motes; obtaining at least a part of the second-administered content logs of the second set of motes; and creating a federated log from at least a part of the one or more first-administered content logs and at least a part of the one or more second-administered content logs function substantially analogously as to like processes described elsewhere herein (e.g., as shown and described under text/drawings of Roman Numeral heading V ("FEDERATING MOTE-ASSOCIATED LOG DATA"), above, as well as in the as-filed claims). Accordingly, the specific exemplary processes of the operations of obtaining at least a part of the one or more first-administered content logs of the first set of motes; obtaining at least a part of the second-administered content logs of the second set of motes; and creating a federated log from at least a part of the one or more first-administered content logs and at least a part of the one or more second-administered content logs are not explicitly redescribed here for sake of clarity, in that such specific exemplary processes will be apparent to one of skill in the art in light of the disclosure herein (e.g., as shown and described under text/drawings of Roman Numeral heading V, above, as well as in the as-filed claims).

VI. Using Mote-Associated Logs

Figure 14:
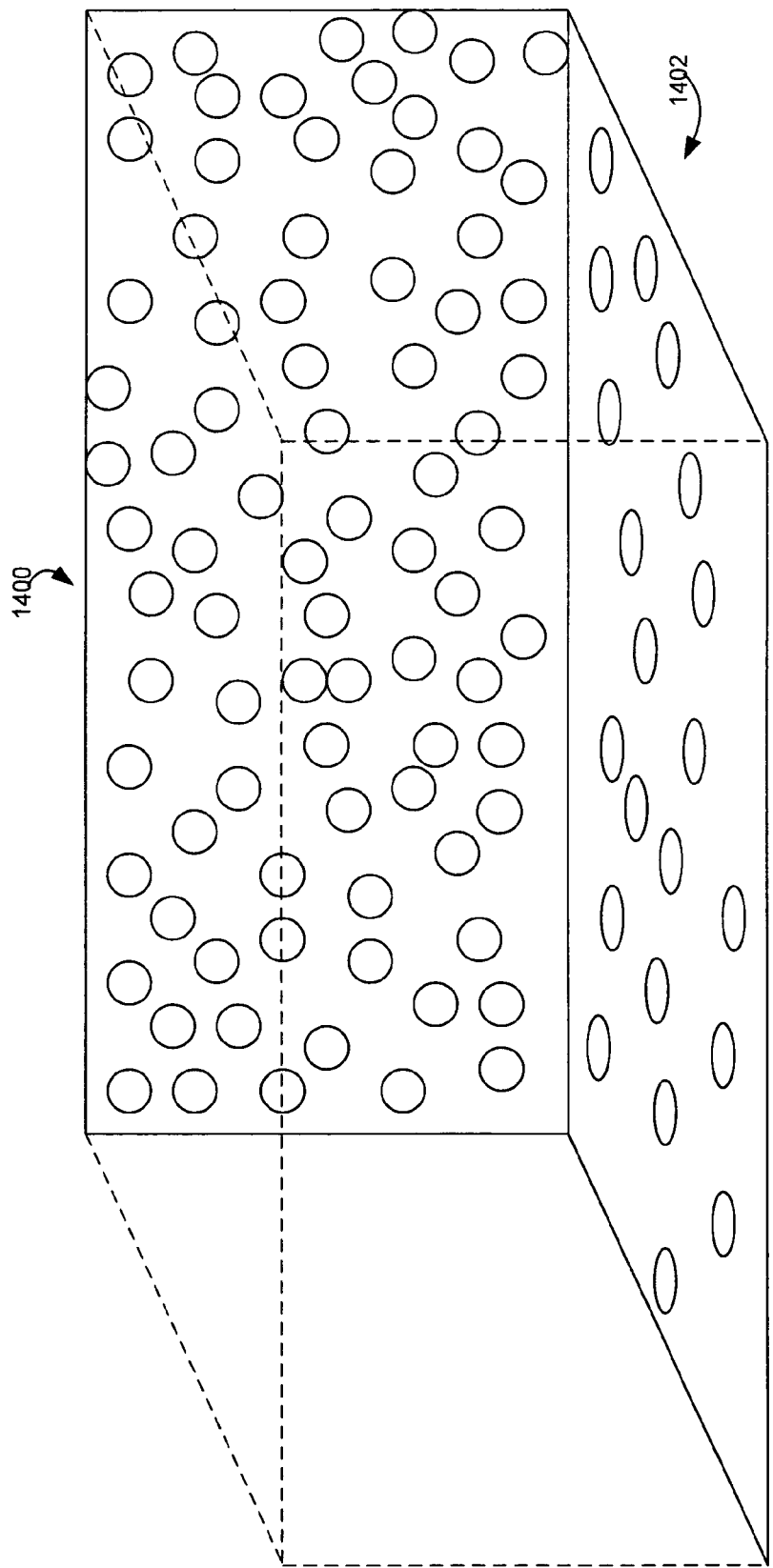
FIG. 14 depicts a perspective cut-away view of a hallway that may form an environment of processes and/or devices described herein.

Referring now to FIG. 14, depicted is a perspective cut-away view of a hallway that may form an environment of processes and/or devices described herein. Wall 1400 and floor 1402 are illustrated having motes (depicted as circles and/or ovals). Typically, the motes may be as described elsewhere herein (e.g., mote 200, 300, 500, and/or 600). In some instances, the motes are applied to wall 1400 and/or floor 1402 with an adhesive. In other instances, the motes are formed into 1400 and/or floor 1402 during fabrication. In other instances, a covering for the wall (e.g., wallpaper and/or paint) contains motes that are applied to 1400 and/or floor 1402.

Figure 15:
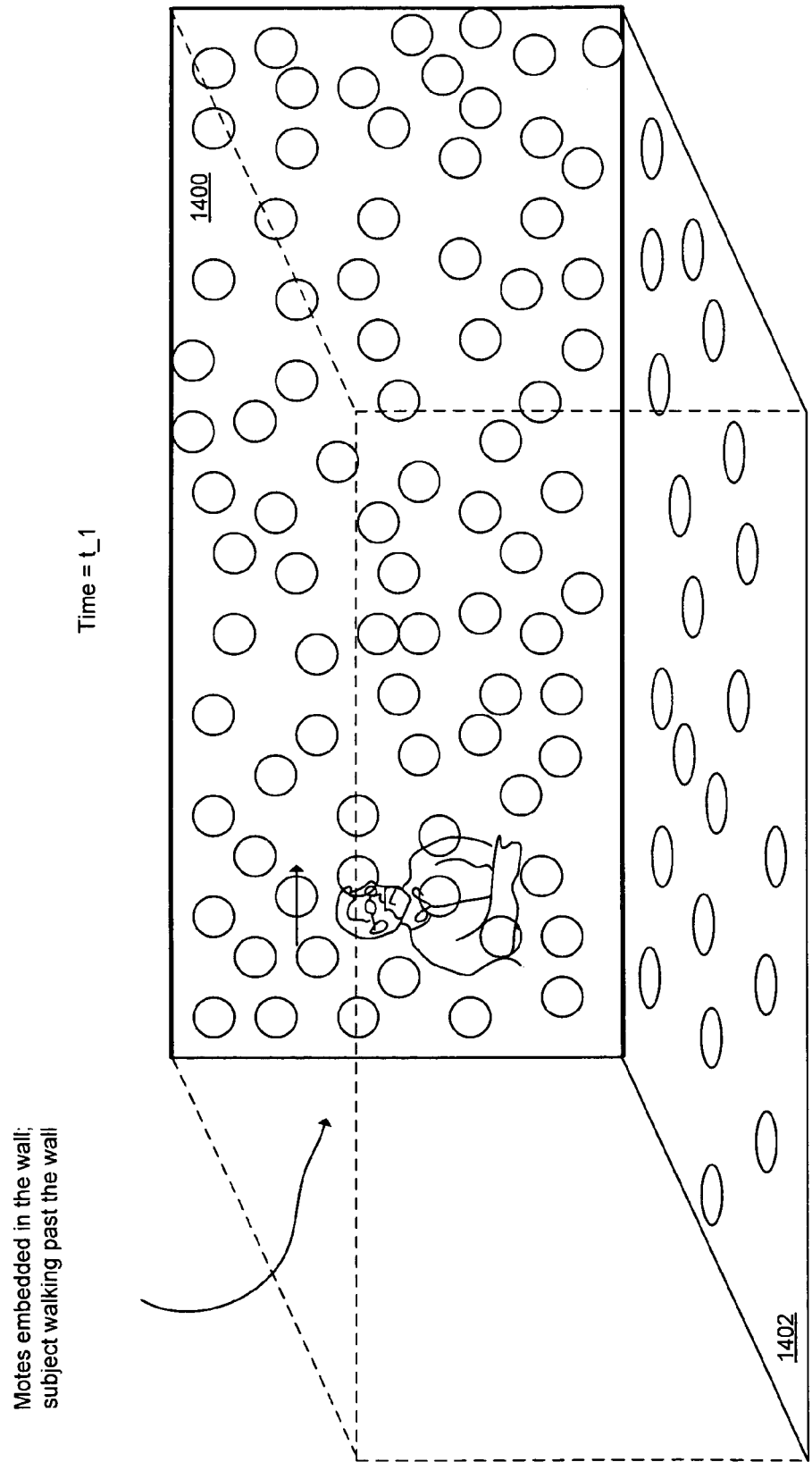
FIGS. 15, 16, and 17 shows three time-sequenced views of a person transiting wall 1400 and floor 1402 of the hallway of FIG. 14.
Figure 16:
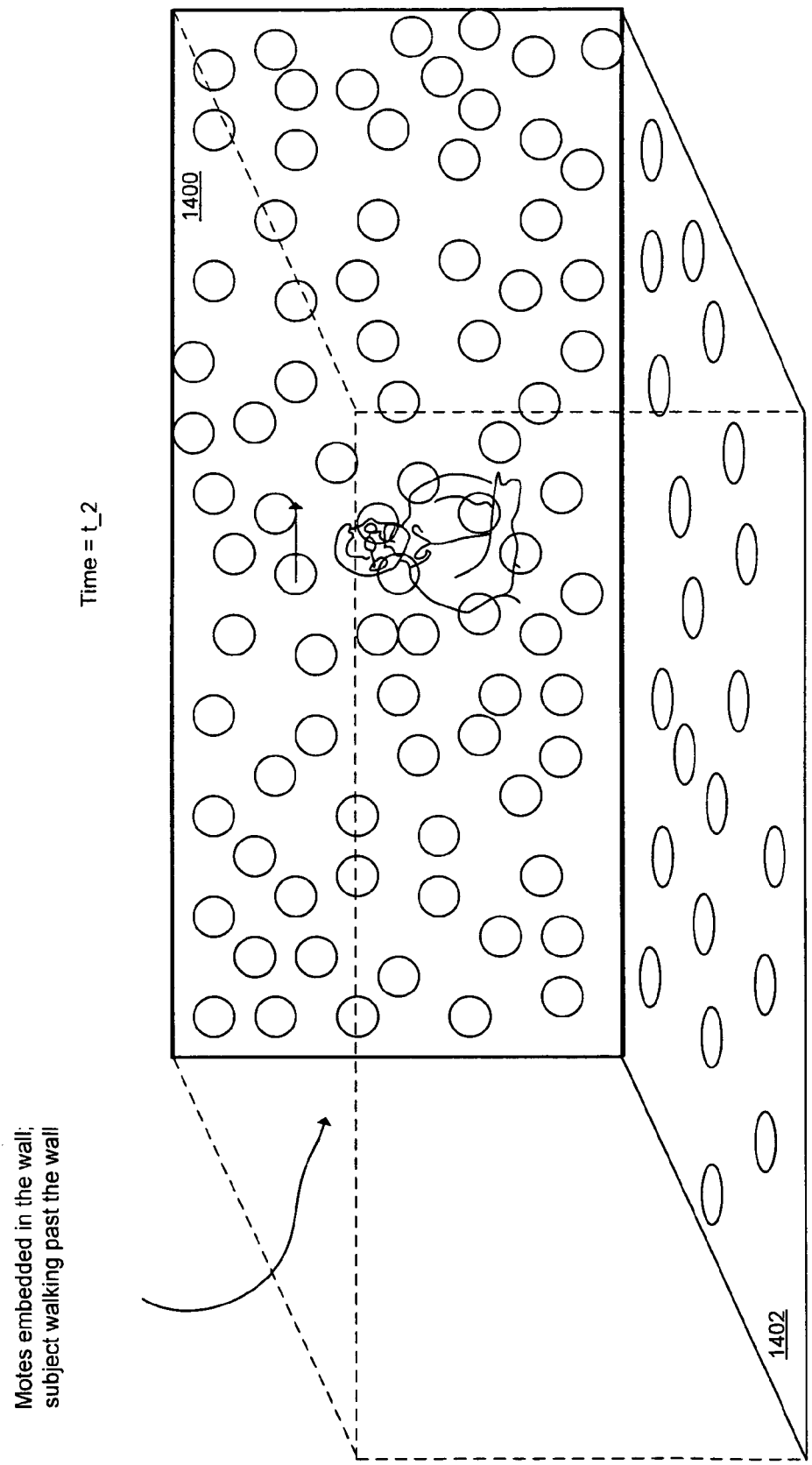
Figure 17:
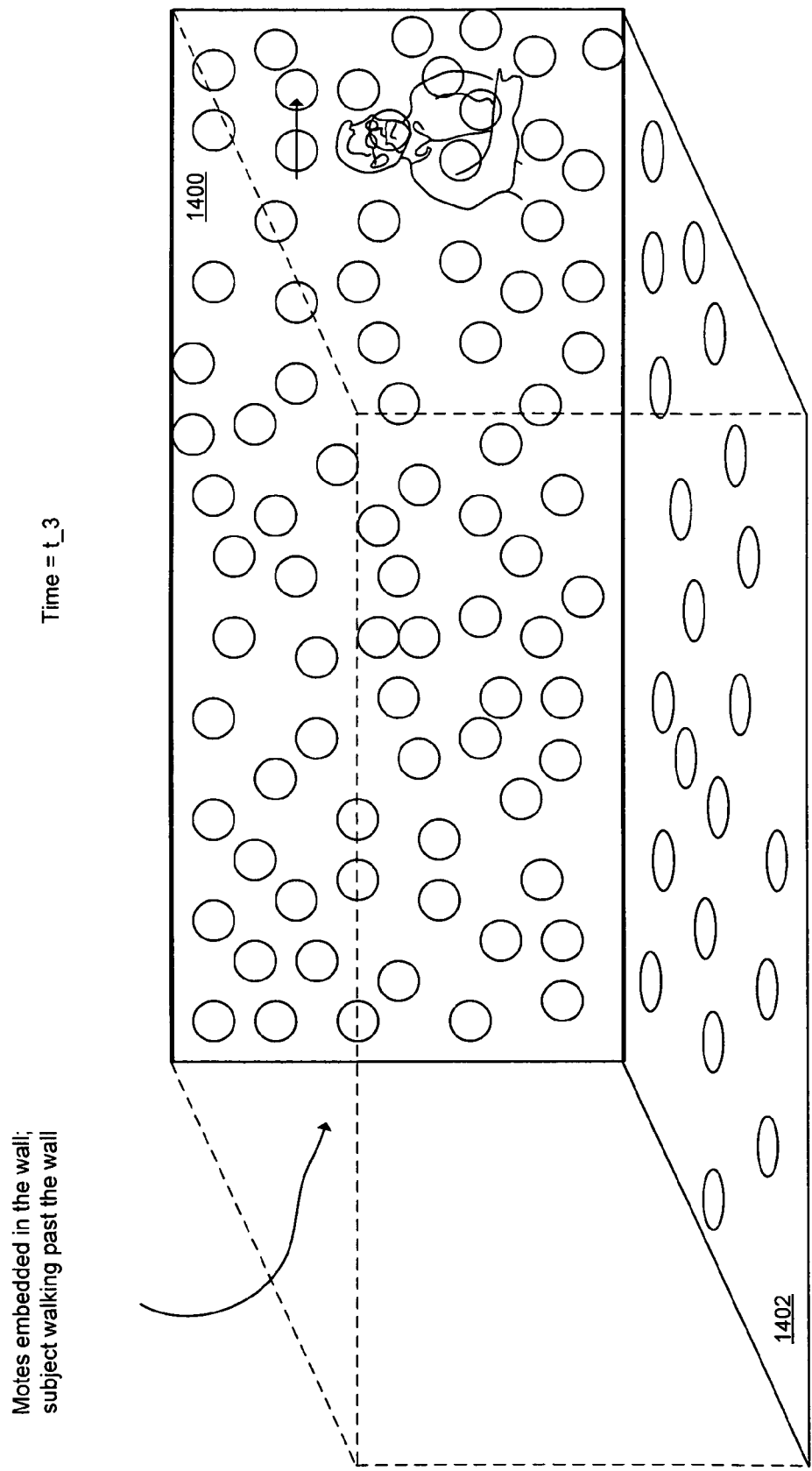

With reference now to FIGS. 15, 16, and 17, shown are three time-sequenced views of a person transiting wall 1400 and floor 1402 of the hallway of FIG. 14. FIG. 15 shows the position of the person at time=t_1. FIG. 16 shows the position of the person at time=t_2. FIG. 17 shows the position of the person at time=t_3.

Figure 18:
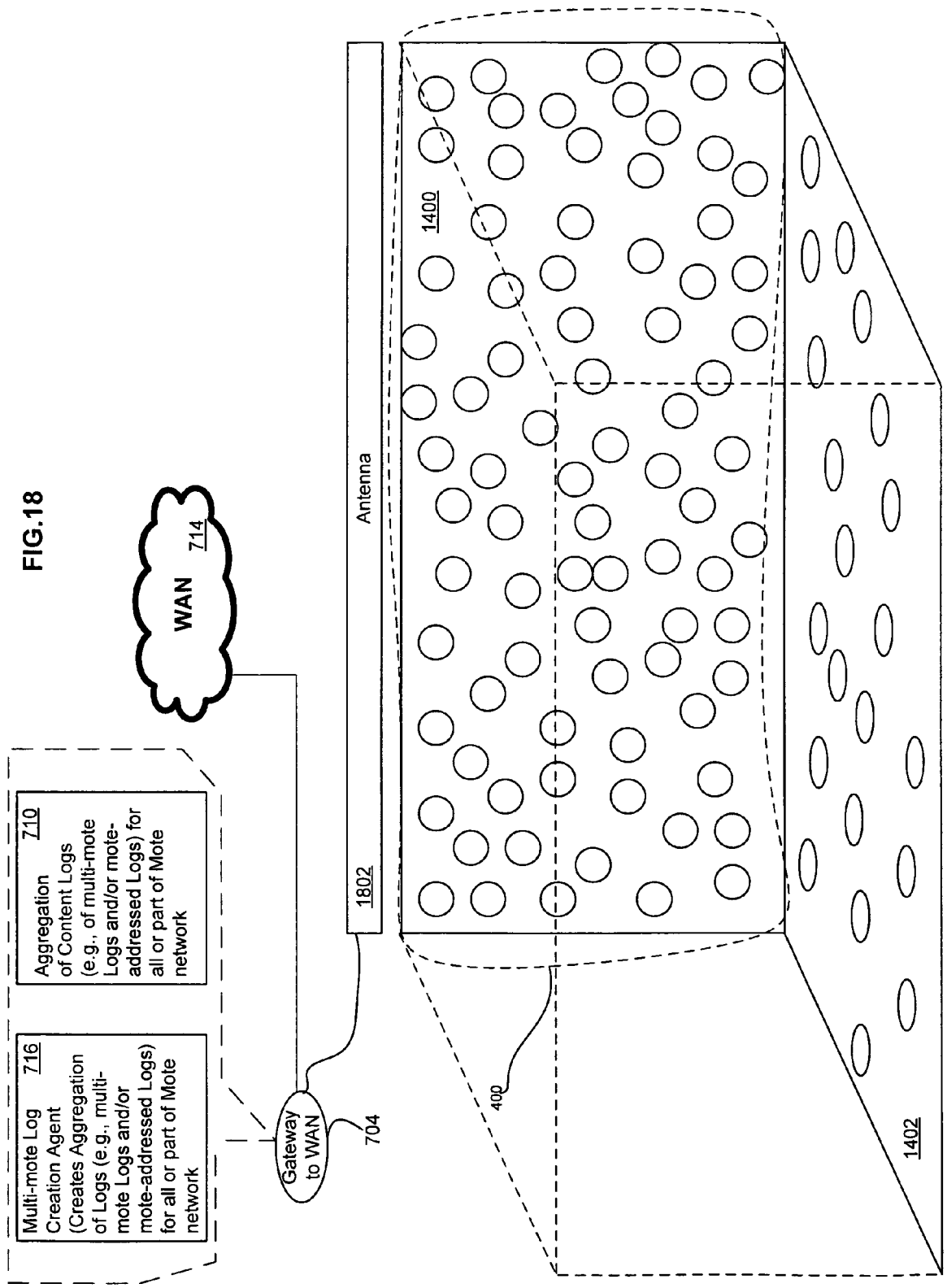
FIG. 18 depicts a perspective view of the hallway of FIG. 14, modified in accord with aspects of the subject matter described herein.

Referring now to FIG. 18, depicted is a perspective view of the hallway of FIG. 14, modified in accord with aspects of the subject matter described herein. Illustrated is that the motes of wall 1400 may be treated as a first set 400 of motes that function and/or are structured in fashions analogous to first set 400 of motes shown/described elsewhere herein (e.g., in relation to FIGS. 4-9) and/or as shown/described here. Accordingly, antenna 1802 is shown proximate to wall 1400 and feeding gateway 704 onto WAN 714. Multi-mote log creation agent 716 is depicted as executing on the more powerful computational systems of gateway 704 (e.g., a mini and/or mainframe computer system) to create aggregation 710 of content logs. Gateway 704, multi-mote creation agent 716, and aggregation 710 of content logs function and/or are structured analogously as described elsewhere herein, and are not expressly re-described here for sake of clarity.

Figure 19:
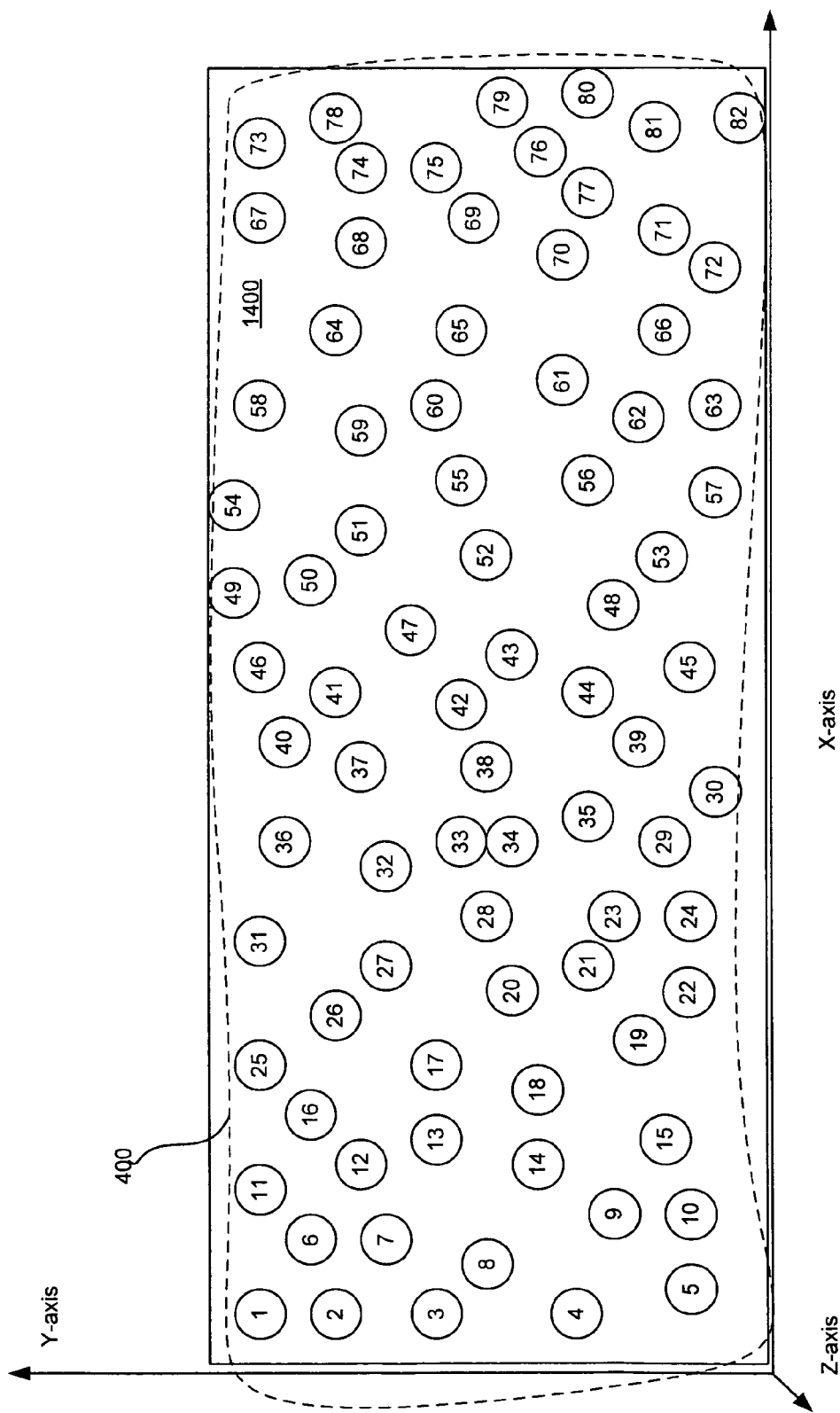
FIG. 19 illustrates that first set 400 of the physical motes of wall 1400 may be treated as mapped into a conceptual x-y coordinate system.

With reference now to FIG. 19, illustrated is that first set 400 of the physical motes of wall 1400 may be treated as mapped into a conceptual x-y coordinate system. The mapping into the conceptual x-y coordinate system may be used to illustrate how a multi-mote content log or aggregation of content logs can be used to advantage. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachings herein.

Figure 20:
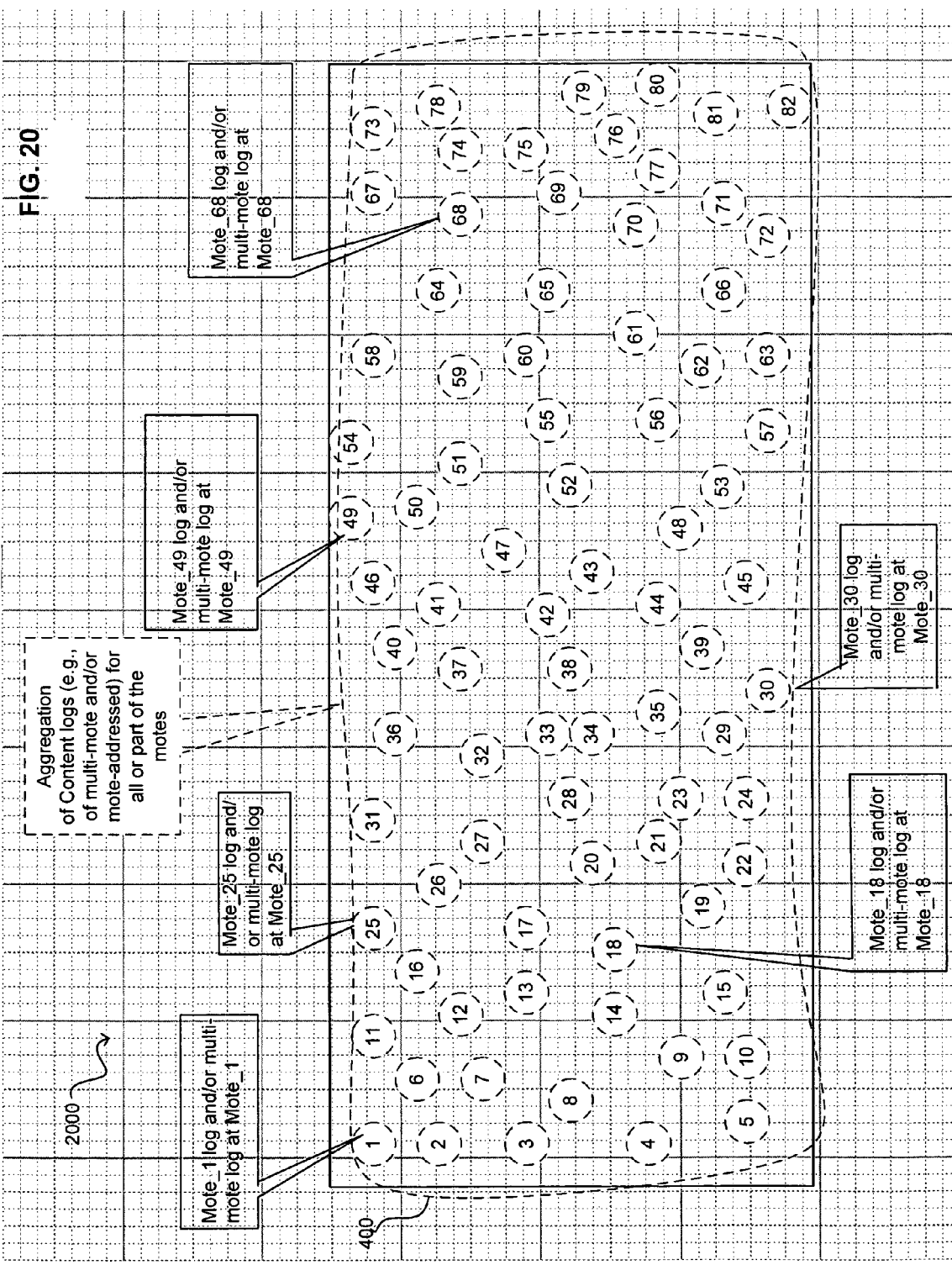
FIG. 20 shows a partially schematic diagram that pictographically illustrates the coordinating of the conceptual mapping of the motes of wall 1400 with the logs of first set 400 of the motes of wall 1400.

Referring now to FIG. 20, shown is a partially schematic diagram that pictographically illustrates the coordinating of the conceptual mapping of the motes of wall 1400 with the logs of first set 400 of the motes of wall 1400. Specifically, depicted in FIG. 20 is that the mapping of the physical motes as shown in FIG. 19 can be abstracted into mote content logs. (This abstraction is illustrated in FIG. 20 by the dashed lines indicating the motes.) The mote content logs can be used to "stand in" for or "represent" the first set 400 of motes, and can be managed and/or searched using high speed computer systems. Further shown is that first set 400 of the motes of wall 1400 may be treated as mapped into a conceptual x-y coordinate system represented by illustrated gridlines 2000. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachings herein.

Those skilled in the art will appreciate that there are many techniques suitable for managing/searching mote content logs of first set 400 of motes. Examples of such techniques are database techniques such as those associated with Structured Query Language (SQL) systems.

Figure 21:
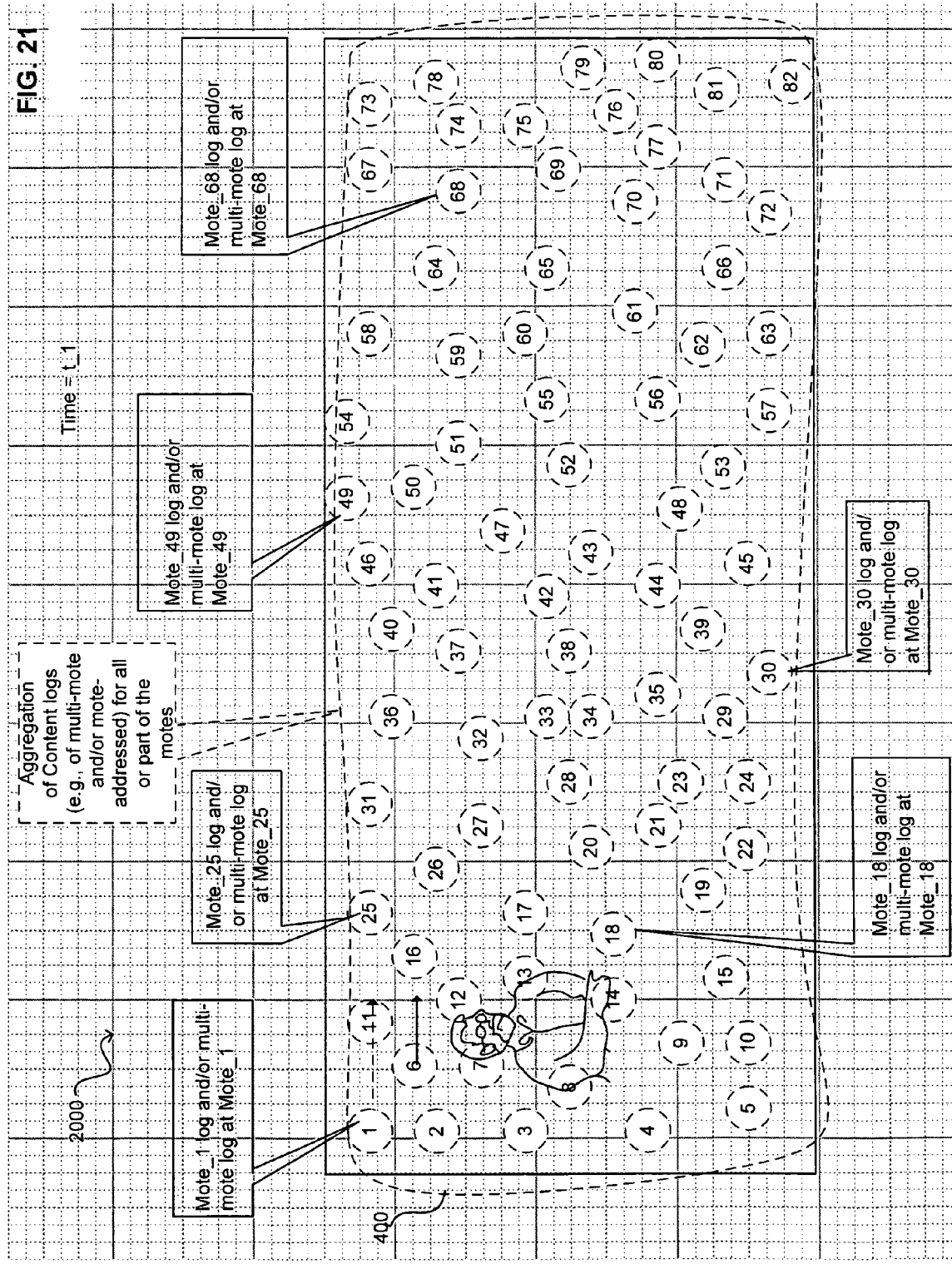
FIGS. 21, 22, and 23 show time-stamped versions of aggregation 710 associated with the state of first set 400 of motes.
Figure 22:
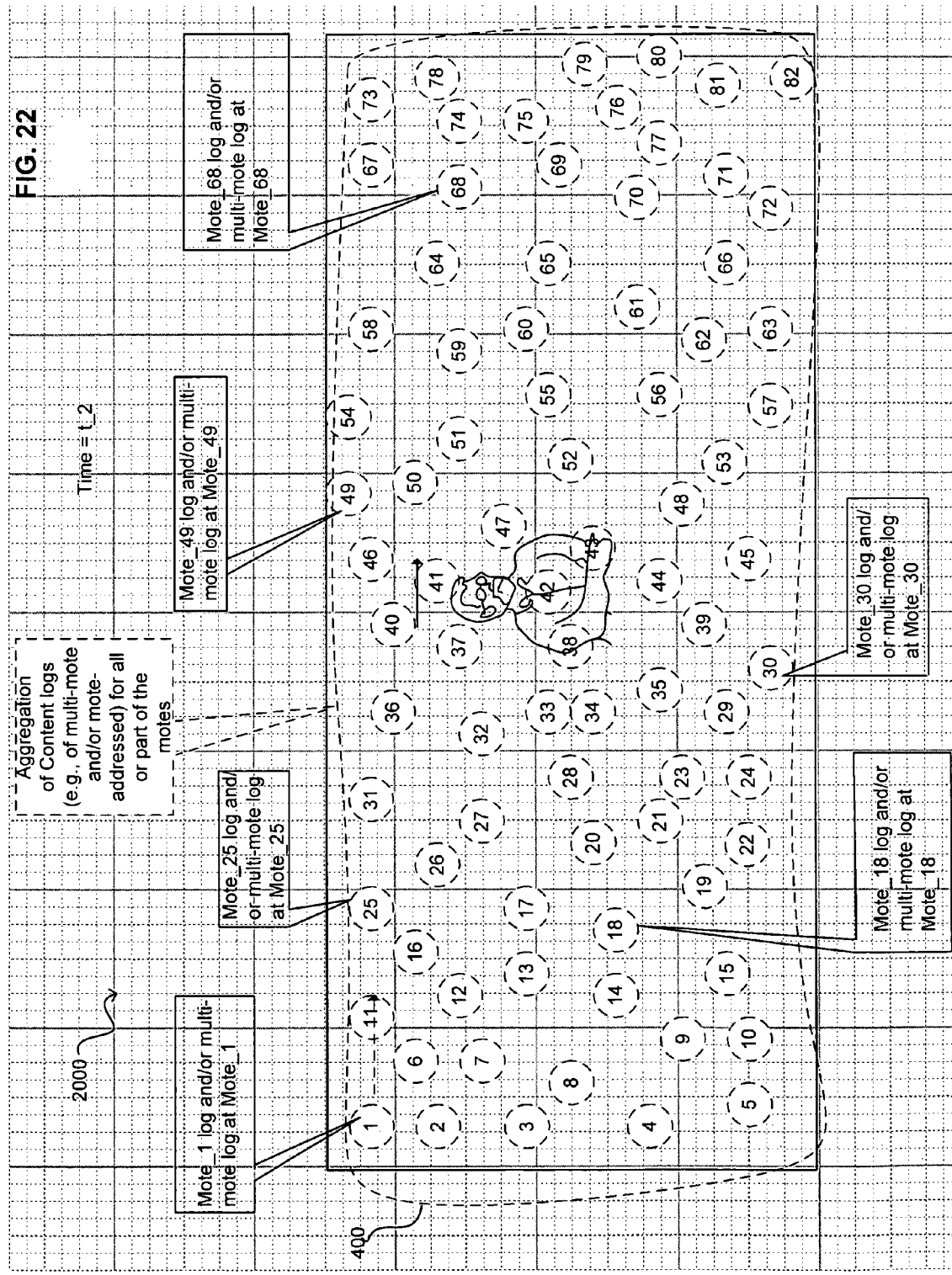
Figure 23:
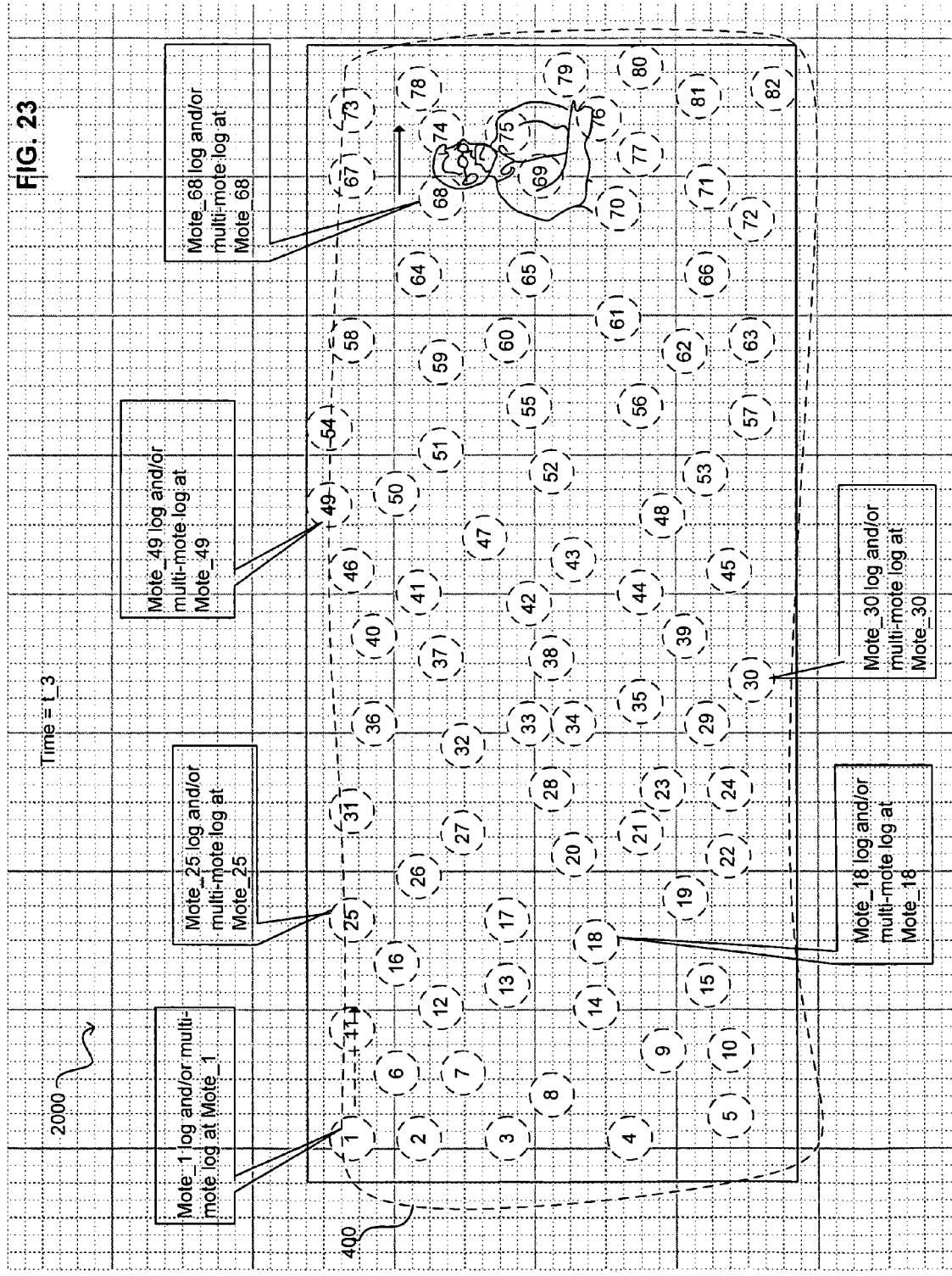

With reference now to FIGS. 21, 22, and 23 shown are time-stamped versions of aggregation 710 associated with the state of first set 400 of motes. FIG. 21 depicts aggregation 701 at time=t_1 and how the person transiting hall 1400 "appears" in aggregation 710 at time=t_1. FIG. 22 illustrates aggregation 701 at time=t_2 and how the person transiting hall 1400 "appears" in aggregation 710 at time=t_2. FIG. 23 shows aggregation 710 at time=t_3 and how the person transiting hall 1400 "appears" in aggregation 710 at time=t_3. Those having skill in the art will appreciate that in practice aggregation 710 will generally be in the form of nested data structures and that the pictographic representations of how the person would "appear" in FIGS. 21, 22, and 23 are used herein for sake of clarity.

As described elsewhere herein (e.g., in relation to FIGS. 1 and 2), motes can include any number of devices whose information can be captured in aggregates of content logs (e.g., aggregation 710 of content logs). Accordingly, aggregation 710 allows flexible and powerful searching techniques, a few of which will now be described.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either substeps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 24:
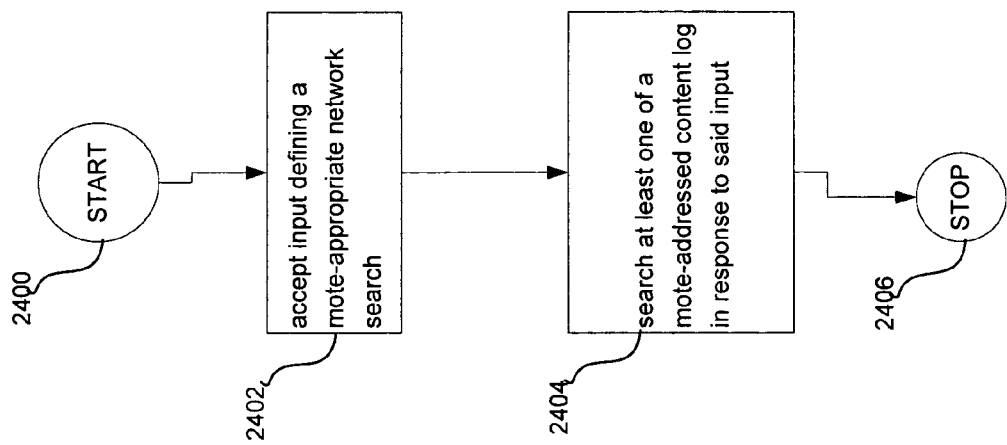
FIG. 24 depicts a high-level logic flowchart of a process.

Referring now to FIG. 24, depicted is a high-level logic flowchart of a process. Method step 2400 shows the start of the process. Method step 2402 depicts accepting input defining a mote-appropriate network search. Method step 2404 searching at least one mote-addressed content log in response to said input. Method step 2406 shows the end of the process.

Figure 25:
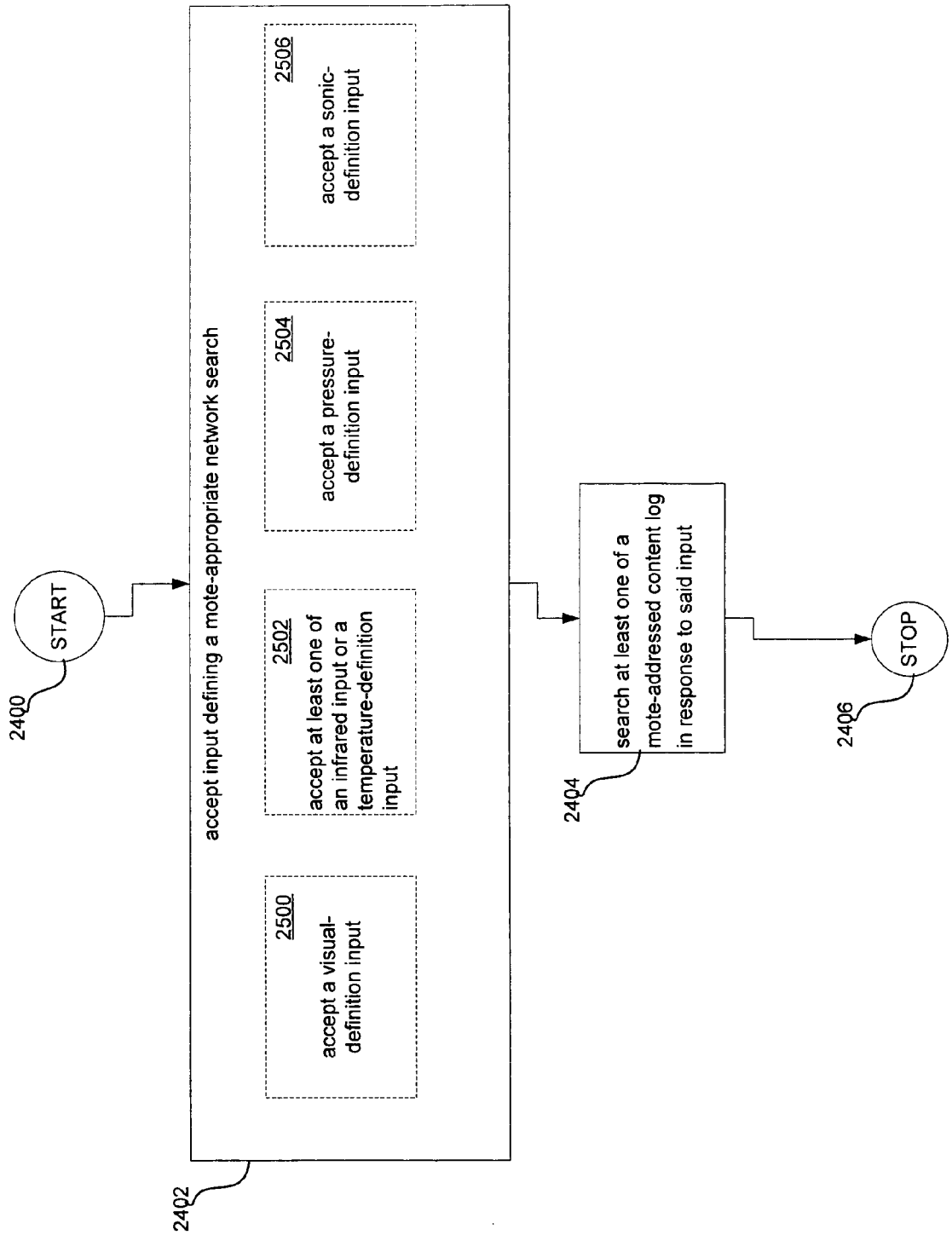
FIG. 25 illustrates a high-level logic flowchart depicting several alternate implementations of the high-level logic flowchart of FIG. 24.

With reference now to FIG. 25, illustrated is a high-level logic flowchart depicting several alternate implementations of the high-level logic flowchart of FIG. 24. Depicted is that in one alternate implementation, method step 2402 includes method step 2500. Method step 2500 shows accepting a visual-definition input. In various exemplary implementations, electrical circuitry accepts the visual-definition input. In some specific implementations such as those used in security, electrical circuitry (e.g., electrical circuitry configured to provide a graphical user interface (GUI)) accepts a command to search for a particular image (e.g., a digital photograph of a person's face). In some implementations such as those used in nursing homes, electrical circuitry (e.g., electrical circuitry configured to provide a graphical user interface (GUI)) accepts a request to search for a particular shape (e.g., a line drawing of a prone person, such as might appear if a person were to fall onto the motes of floor 1402 of FIG. 14). In other implementations, the visual-definition input may be more abstract, such as, for example, a request may be in the form of spatial frequency content, spectral components, or other aspects of a searched for object, event or set of objects.

Continuing to refer to FIG. 25, illustrated is a high-level logic flowchart depicting several alternate implementations of the high-level logic flowchart of FIG. 24. Depicted is that in one alternate implementation, method step 2402 includes method step 2502. Method step 2502 shows accepting at least one of an infrared-definition input or a temperature-definition input. In various exemplary implementations, electrical circuitry accepts the at least one of an infrared-definition input or a temperature-definition input. In some specific implementations such as those used in fire detection, electrical circuitry (e.g., electrical circuitry configured to provide a graphical user interface (GUI)) accepts a command to search for a particular infra-red signature or temperature (e.g., an infrared signature or temperature in closet of a building indicate of a potential spontaneous combustion). In some implementations such as those used in agriculture, electrical circuitry (e.g., a touch screen of a computer system showing motes superimposed over particular plants or plant groupings) accepts a request to monitor various plants or groups of plants for either or both a particular infrared signature or temperature profile (e.g., a defined range of temperatures for optimal growing, such as might be controlled in a greenhouse environment).

With reference now again to FIG. 25, illustrated is a high-level logic flowchart depicting several alternate implementations of the high-level logic flowchart of FIG. 24. Depicted is that in one alternate implementation, method step 2402 includes method step 2504. Method step 2504 shows accepting a pressure-definition input. In various exemplary implementations, electrical circuitry accepts the pressure-definition input. In some specific implementations such as those used in medicine, electrical circuitry (e.g., electrical circuitry configured to provide a graphical user interface (GUI)) accepts a command to sound an alert if a specified pressure at any one or more motes is exceeded (e.g., a pressure sensed by one or more motes interior to a cast indicates a potential for ischemic necrosis or neural impairment). In some implementations such as those used in fluid systems management, electrical circuitry (e.g., an input panel exterior to a piping system) accepts a request that the system give an alert when motes interior to the piping system indicates that the pressure(s) either exceed or fall below one or more defined pressures (e.g., a lowest acceptable pressure in hydraulic lifting system in industrial equipment).

With reference now again to FIG. 25, illustrated is a high-level logic flowchart depicting several alternate implementations of the high-level logic flowchart of FIG. 24. Depicted is that in one alternate implementation, method step 2402 includes method step 2506. Method step 2506 shows accepting a sonic-definition input. In various exemplary implementations, electrical circuitry accepts the sonic-definition input. In some specific implementations such as those used in administration, electrical circuitry (e.g., electrical circuitry configured to convert microphone input to a digital audio file and/or configured to accept digital audio directly) accepts a request that a system determine whether a particular voice has been heard in a room during some defined interval of time (e.g., have you heard "this voice" during the last 24 hours where "this voice" could either be a sample captured in real time or a stored sample of voice). In some implementations such as those used in data processing, electrical circuitry (e.g., electrical circuitry configured to accept digital audio directly) accepts a request that the system perform an action when a certain sound pattern over time is detected (e.g., if the sonic-definition input where a time series of audio that indicated that a hard disk failure was imminent, request would be that the system order a new hard disk and perform a disk swap at some time before the predicted imminent failure).

Figure 26:
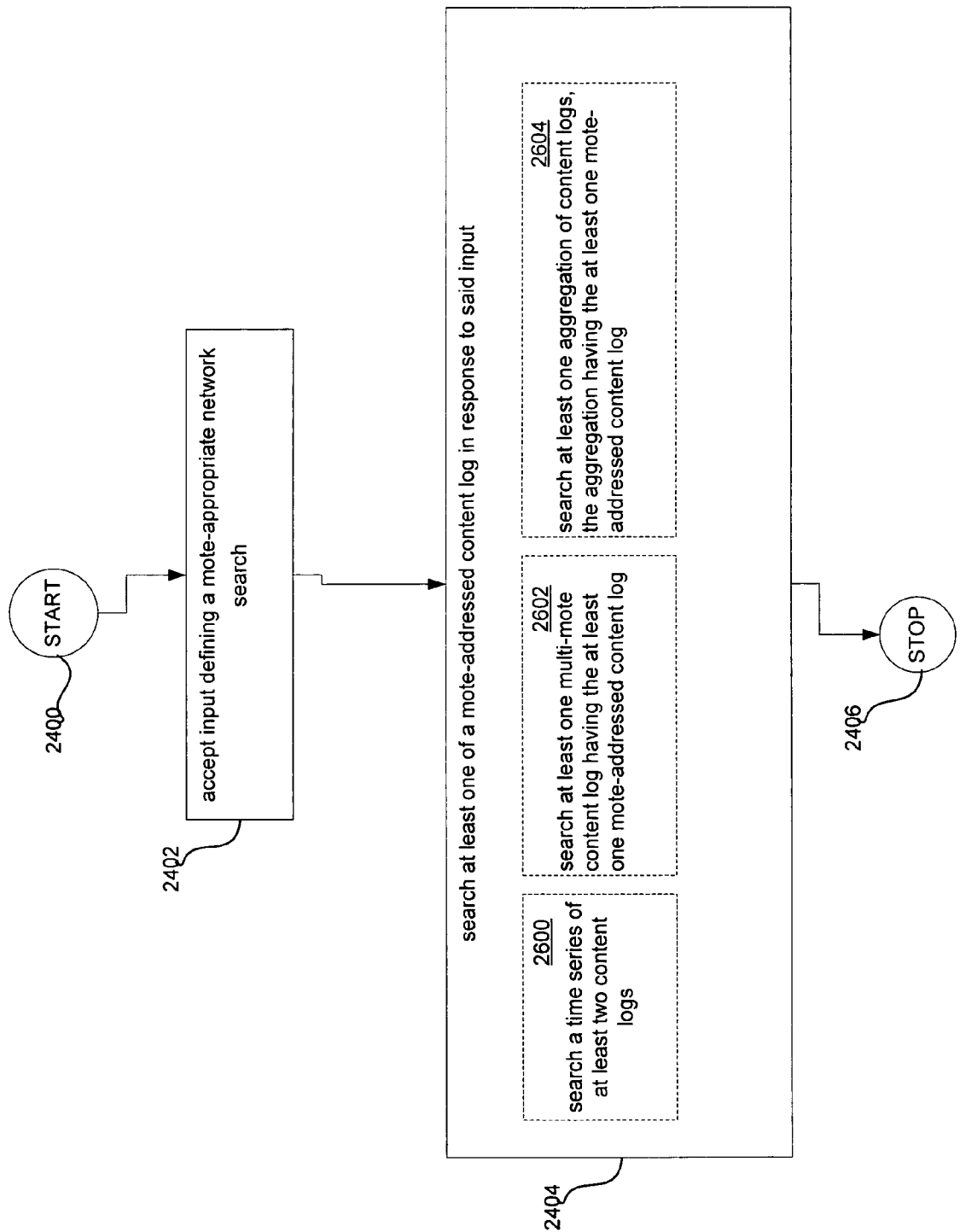
FIG. 26 illustrates a high-level logic flowchart depicting several alternate implementations of the high-level logic flowchart of FIG. 24.

Referring now to FIG. 26, illustrated is a high-level logic flowchart depicting several alternate implementations of the high-level logic flowchart of FIG. 24. Depicted is that in one alternate implementation, method step 2404 includes method step 2600. Method step 2600 shows searching a time series of at least two content logs. In various exemplary implementations, electrical circuitry successively searches a time series of content logs for various defined types of information. In some specific implementations such as those used in security, electrical circuitry (e.g., electrical circuitry forming a processor configured by program to perform various tasks) searches for a particular image in motion (e.g., searching one or more content logs of aggregation 710 at time=t_1 (FIG. 21), at time=t_2 (FIG. 22), and at time=t_3 (FIG. 23) in order to track a person's progress through the hallway such as shown and/or described in relation to FIGS. 15, 16, and 17). In some implementations such as those used in criminal investigations, electrical circuitry accepts a request to search for a particular pattern of sound over time (e.g., the pattern of sound a gunshot would make in aggregation 710 at time=t_1 (FIG. 21), at time=t_2 (FIG. 22), and at time=t_3 (FIG. 23) if a gun were to be fired in the hallway of FIG. 14). Those skilled in the art will appreciate that many other searches may be performed, dependent upon the accepted input defining the mote appropriate search of method step 2402.

Continuing to refer to FIG. 26, depicted is that in one alternate implementation method step 2404 includes method step 2602. Method step 2602 shows searching at least one multi-mote content log having the at least one mote-addressed content log. In various exemplary implementations, electrical circuitry searches the at least one multi-mote content log having the at least one mote-addressed content log. In some specific implementations such as those used in security, electrical circuitry searches one or more multi-mote content logs, over time, in response to a defined search (e.g., electrical circuitry searching one or more multi-mote content logs for motes distributed proximate to a patient's heart for sounds indicative of arrhythmia, in response to a search requesting that the logs be so searched). In some implementations such as those used in aviation maintenance, electrical circuitry searches one or more multi-mote content logs, over time, in response to a defined search (e.g., electrical circuitry searching one or more multi-mote content logs for motes in a defined area of aviation equipment, such as a jet engine, for sounds indicative of motor failure, in response to a search requesting that the logs be so searched). Those skilled in the art will appreciate that many other searches may be performed, dependent upon the accepted input defining the mote appropriate search of method step 2402.

Figure 27:
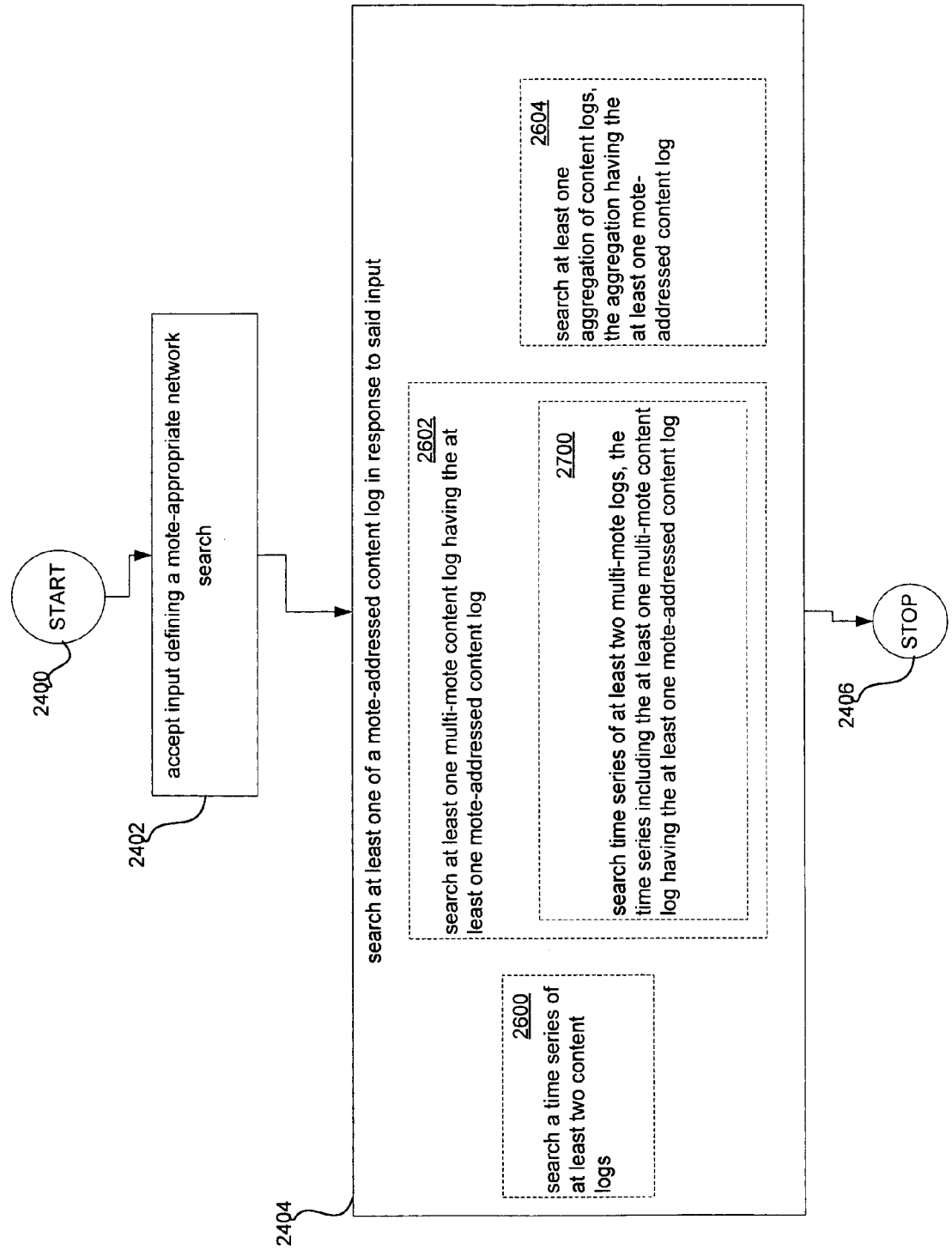
FIG. 27 shows a high-level logic flowchart depicting several alternate implementations of the high-level logic flowchart of FIG. 26.

With reference now to FIG. 27, shown is a high-level logic flowchart depicting several alternate implementations of the high-level logic flowchart of FIG. 26. Depicted is that in one alternate implementation, method step 2602 includes method step 2700. Method step 2700 shows searching a time series of at least two multi-mote logs, the time series including the at least one multi-mote content log having the at least one mote-addressed content log. In various exemplary implementations, electrical circuitry successively searches a time series of content logs for various defined types of information. In some specific implementations such as those used in security, electrical circuitry (e.g., electrical circuitry forming a processor configured by program to perform various tasks) searches for a particular image in motion (e.g., searching one or more content logs of aggregation 710 at time=t_1 (FIG. 21), at time=t_2 (FIG. 22), and at time=t_3 (FIG. 23) in order to track a person's progress through the hallway such as shown and/or described in relation to FIGS. 15, 16, and 17). In some implementations such as those used in criminal investigations, electrical circuitry accepts a request to search for a particular pattern or characteristic of sound over time (e.g., the pattern of sound or acoustic signature a gunshot would make in aggregation 710 at time=t_1 (FIG. 21), at time=t_2 (FIG. 22), and at time=t_3 (FIG. 23) if a gun were to be fired in the hallway of FIG. 14). Those skilled in the art will appreciate that many other searches may be performed, dependent upon the accepted input defining the mote appropriate search of method step 2402.

Referring now again to FIG. 26, depicted is that in one alternate implementation method step 2404 includes method step 2604. Method step 2604 shows searching at least one aggregation of content logs, the aggregation having the at least one mote-addressed content log. In various exemplary implementations, electrical circuitry searches the at least one aggregation of content logs, the aggregation having the at least one mote-addressed content log. In some specific implementations such as those used in security, electrical circuitry (e.g., electrical circuitry forming a processor configured by program to perform various tasks) searches for a particular image in motion (e.g., searching aggregation 710 of content logs at time=t_1 (FIG. 21) in order to determine if a person was in front of wall 1400 at some time=t_1 as shown and/or described in relation to FIG. 15). In some implementations such as those used in criminal investigations, electrical circuitry accepts a request to search for a particular sound at a particular time (e.g., a certain sound present in aggregation 710 at time=t_1 (FIG. 21)). Those skilled in the art will appreciate that many other searches may be performed, dependent upon the accepted input defining the mote appropriate search of method step 2402.

Figure 28:
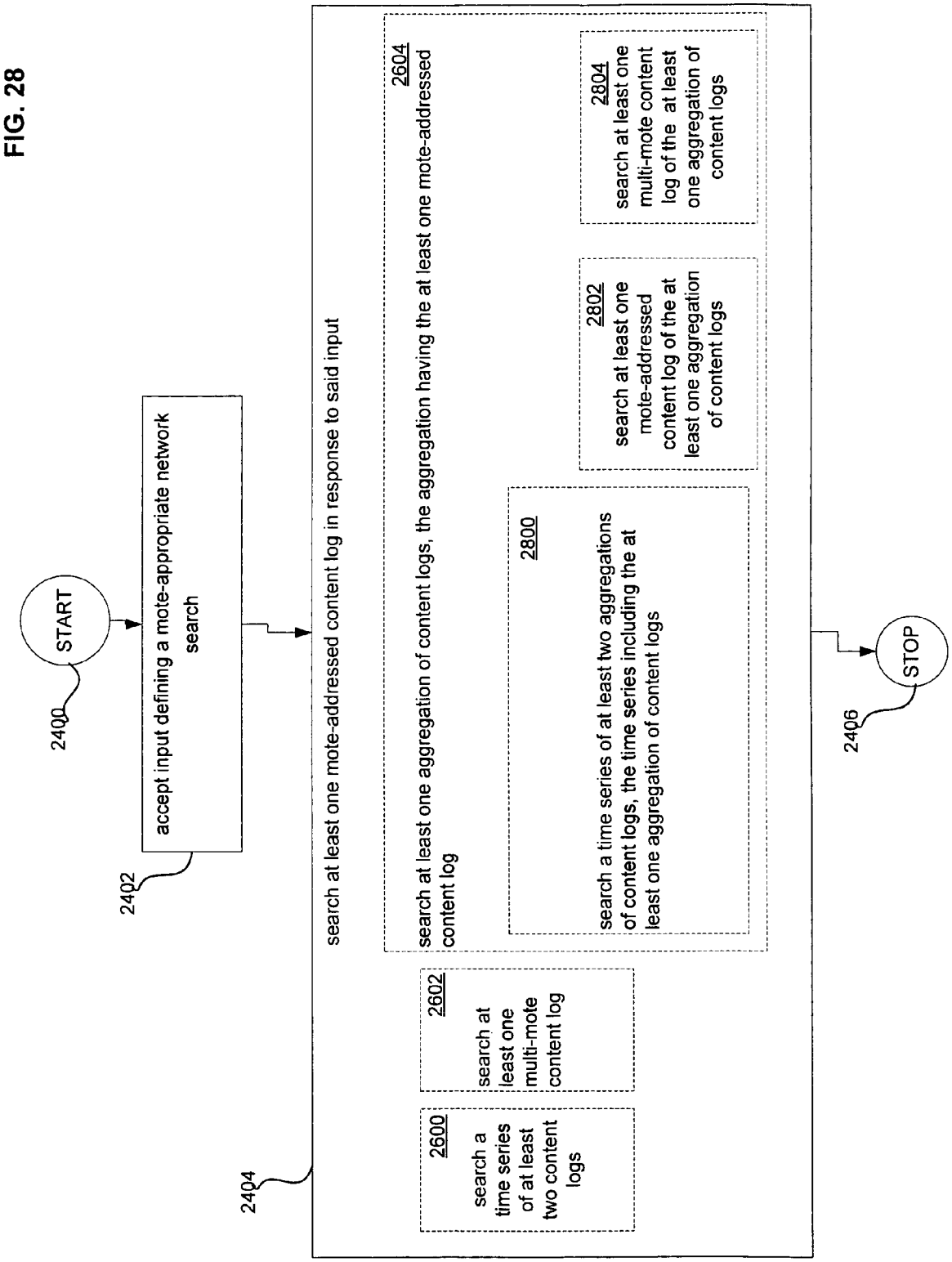
FIG. 28 shows a high-level logic flowchart depicting several alternate implementations of the high-level logic flowchart of FIG. 27.

With reference now to FIG. 28, shown is a high-level logic flowchart depicting several alternate implementations of the high-level logic flowchart of FIG. 27. Depicted is that in one alternate implementation, method step 2604 includes method step 2800. Method step 2800 illustrates searching a time series of at least two aggregations of content logs, the time series including the at least one aggregation of content logs. In various exemplary implementations, electrical circuitry searches the time series of the at least one aggregation of content logs. In some specific implementations such as those used in security, electrical circuitry (e.g., electrical circuitry forming a processor configured by program to perform various tasks) searches for a particular image in motion (e.g., searching one or more content logs of aggregation 710 at time=t_1 (FIG. 21), at time=t_2 (FIG. 22), and at time=t_3 (FIG. 23) in order to track a person's progress through the hallway such as shown and/or described in relation to FIGS. 15, 16, and 17). In some implementations such as those used in criminal investigations, electrical circuitry accepts a request to search for a particular pattern of sound over time (e.g., the pattern of sound a gunshot would make in aggregation 710 at time=t_1 (FIG. 21), at time=t_2 (FIG. 22), and at time=t_3 (FIG. 23) if a gun were to be fired in the hallway of FIG. 14). Those skilled in the art will appreciate that many other searches may be performed, dependent upon the accepted input defining the mote appropriate search of method step 2402.

Continuing to refer to FIG. 28, depicted is that in one alternate implementation, method step 2604 includes method step 2802. Method step 2802 illustrates searching at least one mote-addressed content log of the at least one aggregation of content logs. In various exemplary implementations, electrical circuitry is used to effect the searching at least one mote-addressed content log of the at least one aggregation of content logs. Those skilled in the art will appreciate that many other searches may be performed, dependent upon the accepted input defining the mote appropriate search of method step 2402.

Continuing to refer to FIG. 28, depicted is that in one alternate implementation, method step 2604 includes method step 2804. Method step 2804 illustrates searching at least one multi-mote content log of the at least one aggregation of content logs. In various exemplary implementations, electrical circuitry is used to effect the searching at least one multi-mote content log of the at least one aggregation of content logs. Those skilled in the art will appreciate that many other searches may be performed, dependent upon the accepted input defining the mote appropriate search of method step 2402.

Those skilled in the art will appreciate that in some implementations, the searching described in relation to various processes herein (e.g., such as those shown/described in relation to FIGS. 24-28) is performed on mote-addressed content logs, multi-mote content logs, and/or aggregations of content logs loaded to computer systems external to a mote-appropriate network. For example, as shown/described in relation to gateway 704, which can include, for example, one or more of a notebook computer system, minicomputer system, server computer system, and/or a mainframe computer system. Those skilled in the art will also appreciate that in other implementations the searching described in relation to various processes herein (e.g., such as those shown/described in relation to FIGS. 24-28) is performed in whole or in part on motes of a mote-appropriate network. Those skilled in the art will also recognize that the approaches described herein are not limited to accepting an input of a single kind and that the searching may be refined using a combination of inputs, such as a visual definition input combined with a sonic definition input. When combined, the searching logic may correlate the processes temporally or the searches may be combined independently of relative time references. Those skilled in the art will also appreciate that in other implementations the searching described in relation to various processes herein (e.g., such as those shown/described in relation to FIGS. 24-28) is performed in other computer systems consistent with the teachings herein.

VII. Using Federated Mote-Associated Logs

Figure 29:
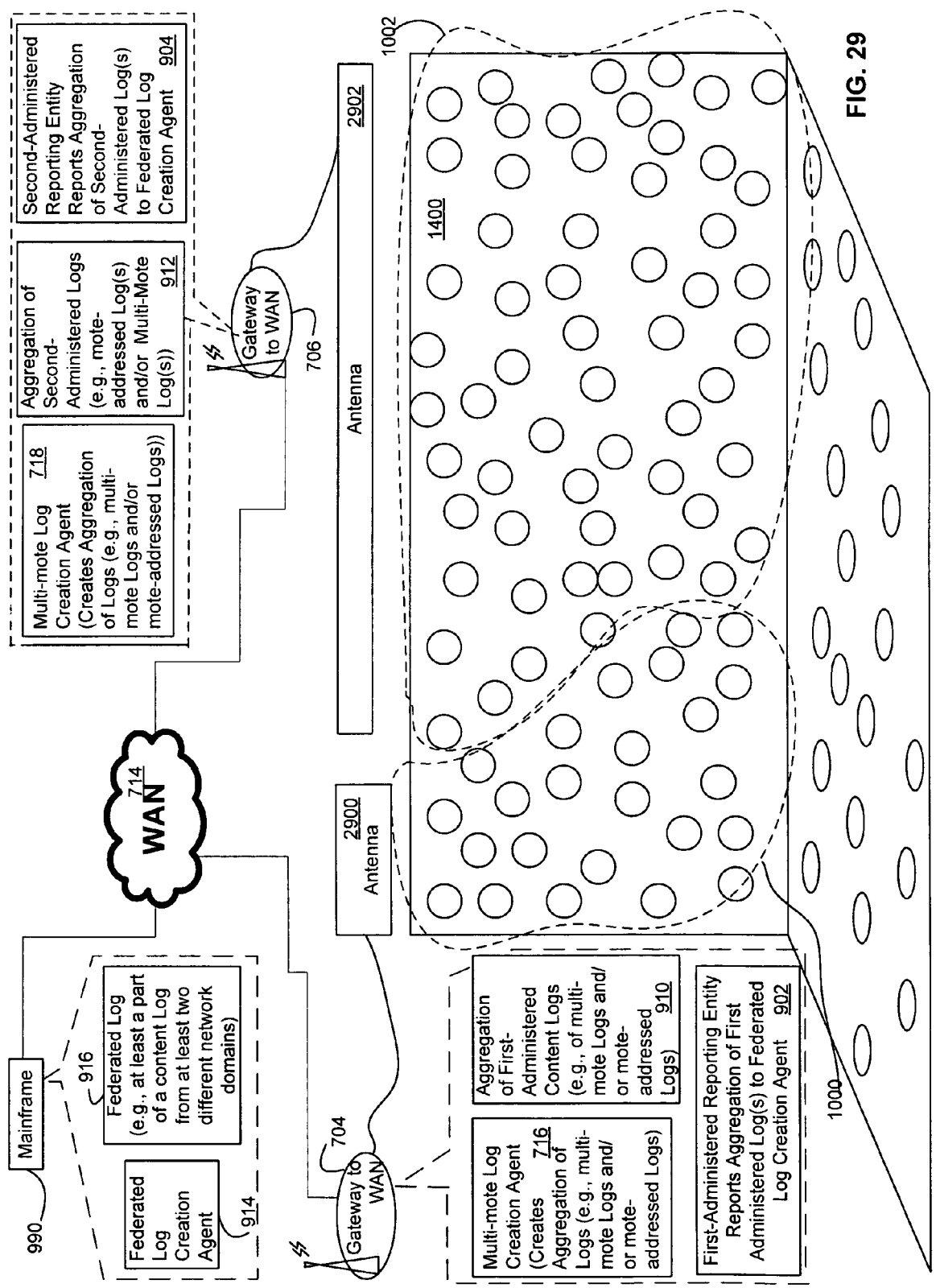
FIG. 29 illustrates the perspective cut-away view of the hallway of FIG. 14 modified in accord with aspects of the subject matter described herein.

With reference now to FIG. 29, illustrated is the perspective cut-away view of the hallway of FIG. 14 modified in accord with aspects of the subject matter described herein. Illustrated is that the motes of wall 1400 may be partitioned into first-administered set 1000 of motes and second-administered set 1002 of motes analogous to the first-administered set 1000 of motes and second-administered set 1002 of motes shown/described elsewhere herein (e.g., in relation to FIGS. 10-13). Antenna 2900 is shown proximate to first-administered set 1000 of motes and shown feeding gateway 704 onto WAN 714. Multi-mote log creation agent 716 is depicted as executing on the more powerful computational system(s) of gateway 704 (e.g., a mini and/or a mainframe computer system) to create aggregation 910 of first-administered content logs. First-administered reporting entity 902 is illustrated as executing on gateway 704. Gateway 704, multi-mote log creation agent 716, aggregation 910 of first-administered content logs, and first-administered reporting entity 902 function and/or are structured in fashions analogous to those described here and/or elsewhere herein.

Antenna 2902 is shown proximate to second-administered set 1002 of motes and feeding gateway 706 onto WAN 714. Multi-mote log creation agent 718 is depicted as executing on the more powerful computational system(s) of gateway 706 (e.g., a mini and/or a mainframe computer system) to create aggregation 912 of second-administered content logs. Second-administered reporting entity 904 is illustrated as executing on gateway 706. Gateway 706, multi-mote log creation agent 718, aggregation 912 of second-administered content logs, and second-administered reporting entity 904 function and/or are structured in fashions analogous to those described here and/or elsewhere herein.

In some implementations, frequency re-use techniques are utilized across first-administered set 1000 of motes and second-administered set 1002 of motes. For instance, first-administered set 1000 of motes operating on or around a first carrier frequency and second-administered set 1002 of motes operating on or around a second carrier frequency. Accordingly, in some implementations antenna 2900 is tuned to a carrier frequency of first-administered set 1000 of motes and antenna 2902 is tuned to a carrier frequency of second-administered set 1002 of motes. In other implementations, frequency re-use techniques are not used across first-administered set 1000 of motes and second-administered 1002 set of motes (e.g., the differently administered networks use different addressing spaces and/or proximities to provide for the separate network administrations).

Further shown in FIG. 29 are federated log creation agent 914 and federated content log 916 resident within mainframe computer system 990. Federated log creation agent 914, federated content log 916, and mainframe computer system 990 function and/or are structured in fashions analogous to those described here and/or elsewhere herein.

Figure 30:
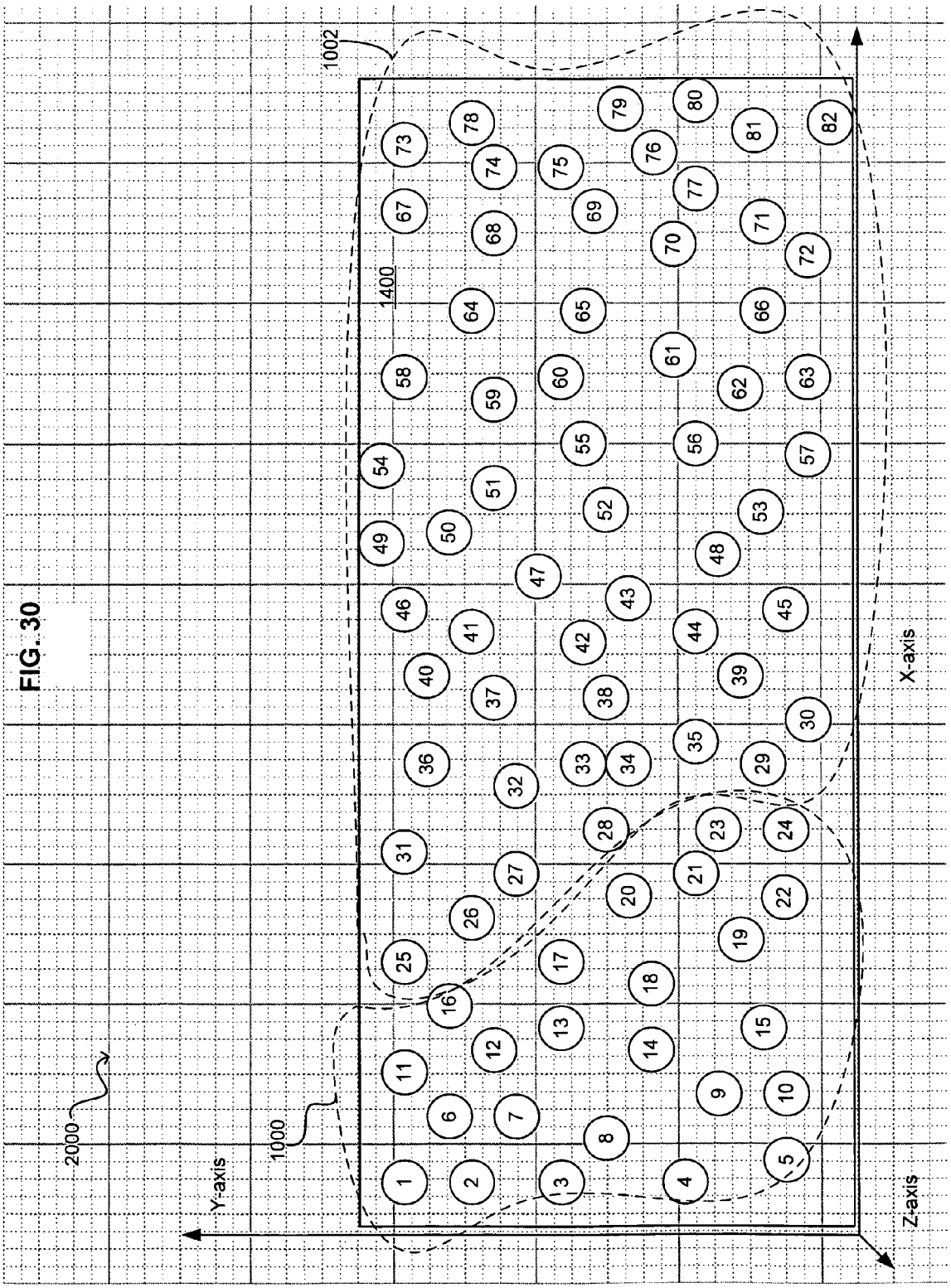
FIG. 30 shows that first-administered set 1000 and second-administered set 1002 of the physical motes of wall 1400 may be treated as mapped into a conceptual x-y coordinate system.

Referring now to FIG. 30, shown is that first-administered set 1000 and second-administered set 1002 of the physical motes of wall 1400 may be treated as mapped into a conceptual x-y coordinate system. The mapping into the conceptual x-y coordinate system may be used to illustrate how a multi-mote content log or aggregation of content logs (e.g., such as those forming at least a part of federated content log 916) can be used to advantage. Those having skill in the art will appreciate that in some instances, the mapping will typically be into a three-space coordinate system (e.g., x-y-z), but that a two-space (e.g., x-y) example is described herein for sake of clarity. In addition, although rectilinear coordinate systems are described herein, those having skill in the art will appreciate that other coordinate systems (e.g., spherical, cylindrical, circular, etc.) may be substituted consistent with the teachings herein.

Figure 31:
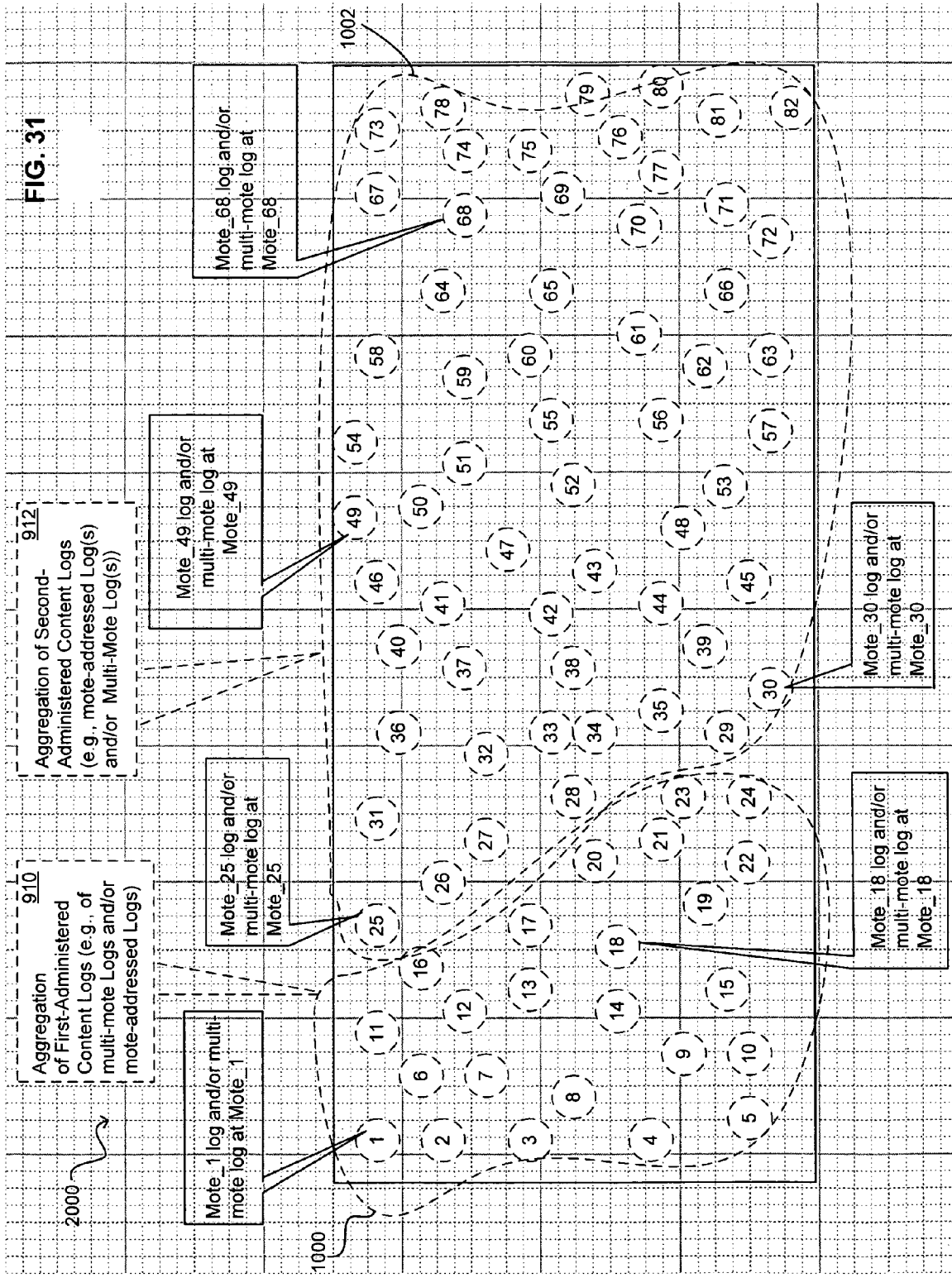
FIG. 31 shows a partially schematic diagram that pictographically illustrates the coordinating of the conceptual mapping of the motes of wall 1400 with the logs of first-administered set 1000 and second-administered 1002 set of the physical motes of wall 1400.

With reference now to FIG. 31, shown is a partially schematic diagram that pictographically illustrates the coordinating of the conceptual mapping of the motes of wall 1400 with the logs of first-administered set 1000 and second-administered 1002 set of the physical motes of wall 1400. (This abstraction is illustrated in FIG. 31 by the dashed lines indicating the motes.) Specifically, depicted in FIG. 31 is that the mapping of the physical motes shown in FIG. 30 can be abstracted into aggregation 910 of first-administered content logs and aggregation 912 of second-administered content logs. So abstracted, the mote content logs can be used to "stand in" for or "represent" first-administered set 1000 and/or second-administered set 1002 of the physical motes of wall 1400, and can be independently and/or jointly managed and/or searched using high speed computer systems.

Those skilled in the art will appreciate that there are many techniques suitable for managing/searching mote content logs of first-administered set 1000 and/or second-administered 1002 set of the physical motes of wall 1400. Examples of such techniques are database techniques such as those associated with relational database and/or SQL systems.

Figure 32:
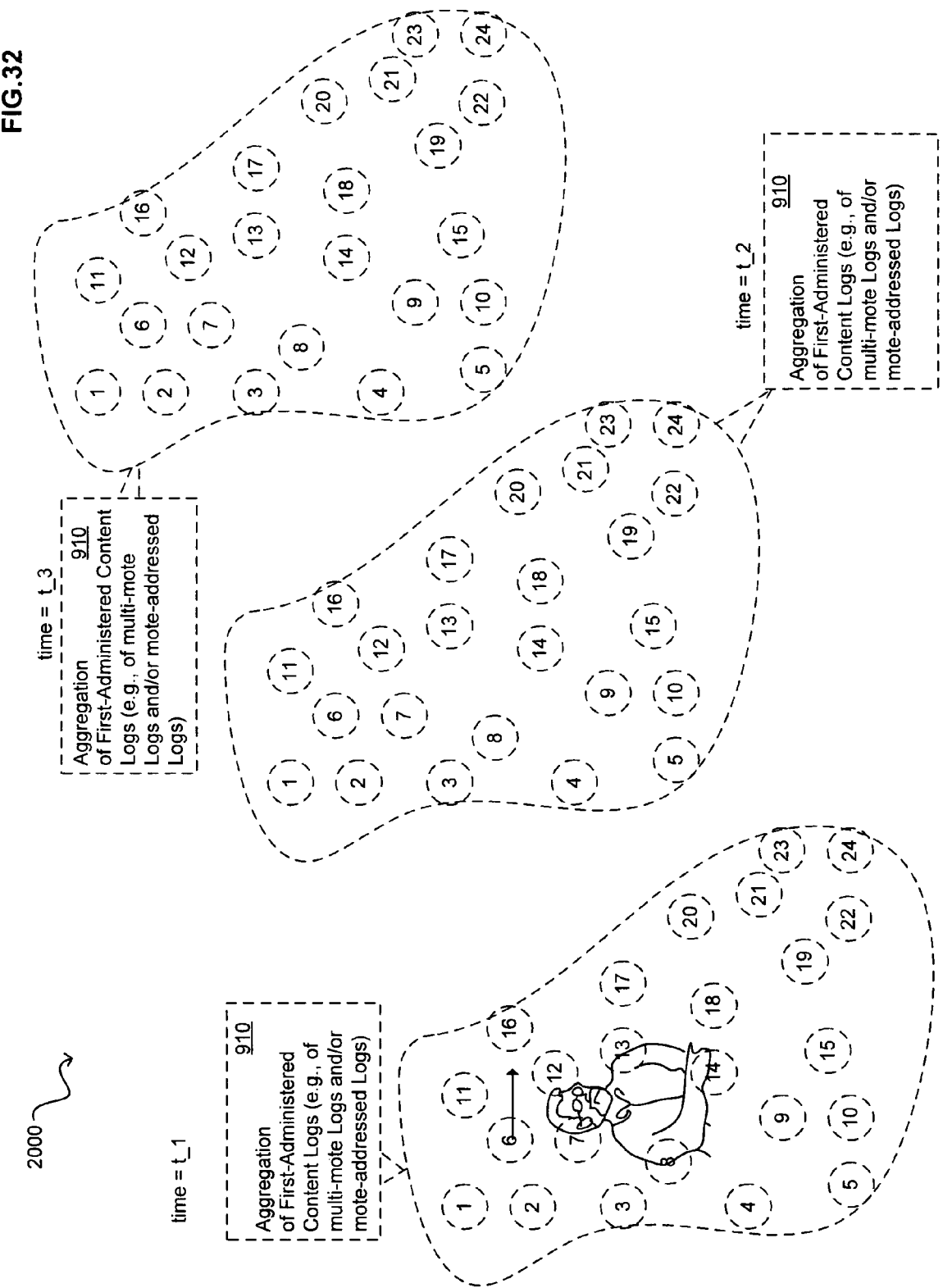
FIG. 32 shows time-stamped versions of aggregation 910 of first-administered content logs associated with the state of first-administered set 1000 of motes.

Referring now to FIG. 32 shown are time-stamped versions of aggregation 910 of first-administered content logs associated with the state of first-administered set 1000 of motes. The left-lower portion of FIG. 32 depicts aggregation 910 of first-administered content logs at time=t_1 and how the person transiting hall 1400 "appears" in aggregation of content logs 910 at time=t_1. The middle-most portion FIG. 32 illustrates aggregation 910 of first-administered content logs at time=t_2 and how the person transiting hall 1400 "appears" in aggregation 910 of first-administered content logs at time=t_2. The upper right portion of FIG. 32 shows aggregation 910 of first-administered content logs at time=t_3 and how the person transiting hall 1400 "appears" in aggregation 910 of first-administered content logs at time=t_3. Those having skill in the art will appreciate that in practice aggregation 910 of first-administered content logs will generally be in the form of nested data structures and that the pictographic representations of how the person would "appear" in FIG. 32 are used herein for sake of clarity.

Figure 33:
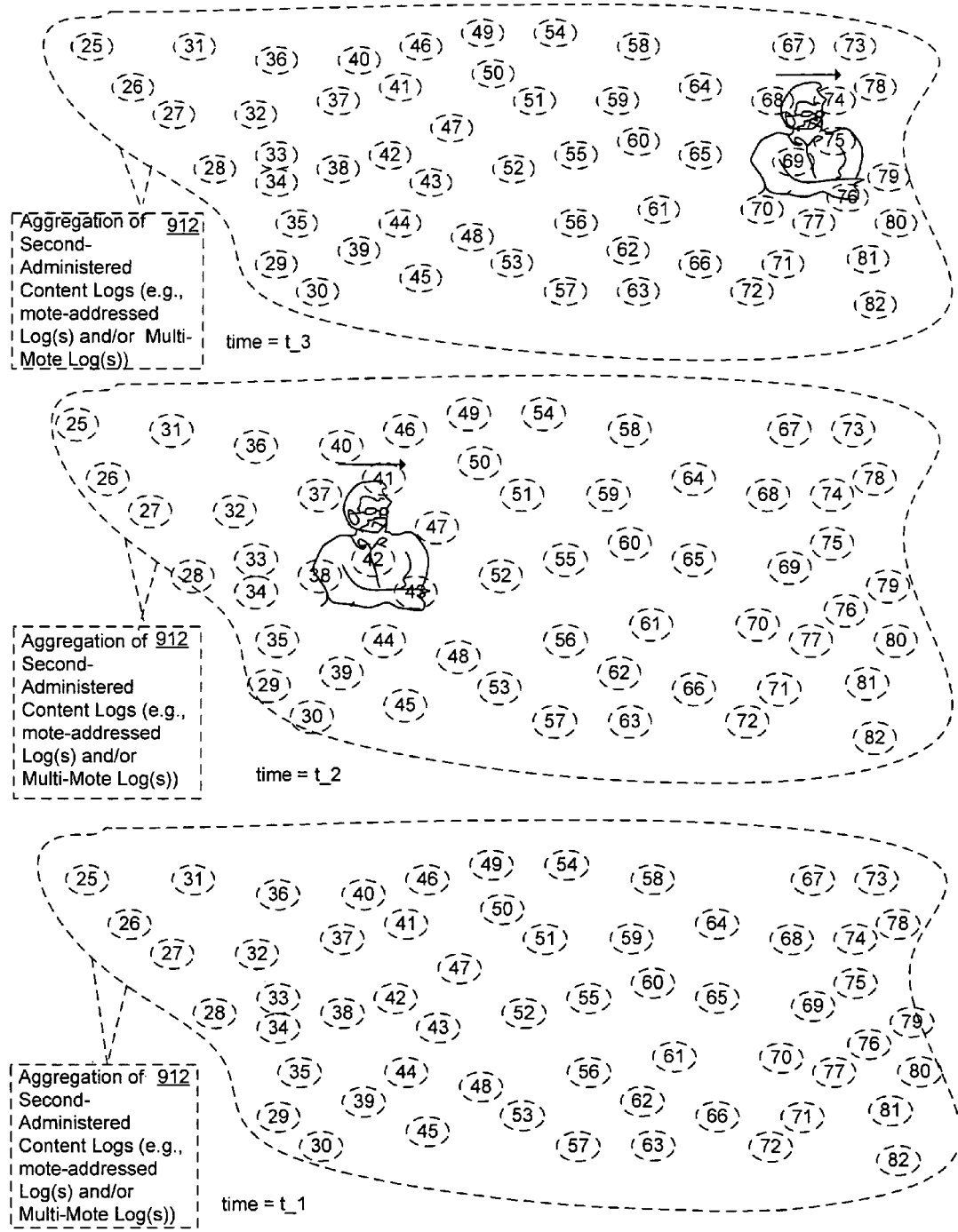
FIG. 33 depicts time-stamped versions of aggregation 912 associated with the state of second-administered set 1002 of motes.

With reference now to FIG. 33, depicted are time-stamped versions of aggregation of content logs 912 associated with the state of second-administered set 1002 of motes. The lower portion of FIG. 33 depicts aggregation 912 of second-administered content logs at time=t_1 and how the person transiting hall 1400 "appears" in aggregation 912 of second-administered content logs at time=t_1. The middle-most portion FIG. 33 illustrates aggregation 912 of second-administered content logs at time=t_2 and how the person transiting hall 1400 "appears" in aggregation 912 of second-administered content logs at time=t_2. The upper portion of FIG. 32 shows aggregation 912 of second-administered content logs at time=t_3 and how the person transiting hall 1400 "appears" in a aggregation 912 of second-administered content logs at time=t_3. Those having skill in the art will appreciate that in practice aggregation 912 of second-administered content logs will generally be in the form of nested data structures and that the pictographic representations of how the person would "appear" in FIG. 33 are used herein for sake of clarity.

Referring now to FIG. 32 and FIG. 33, note that when the person is within the bounds of first-administered set 1000 of motes at time=t_1 the person does not "appear" in the content logs representing second-administered set 1002 of motes (e.g., logs of aggregation 912 of second-administered content logs). Note also that when the person is within the bounds of second-administered set 1002 of motes at times t_2 and t_3, the person does not "appear" in the content logs representing first-administered set 1000 of motes (e.g., logs of aggregation 910 of first-administered content logs). Those having skill in the art will appreciate that this is indicative of reduced power and/or other reduced resource consumption. More specifically, in some implementations such as those described, since each separately administered network need not react to traffic of any networks of which each separately administered network is not a part, a separate administration scheme paired with the federation schemes as described herein allows use of mote networks to track large and/or dense subject matter domains with less resource utilization (e.g., less power consumption such as that associated with either or both less transmission, and/or less reception).

Figure 34:
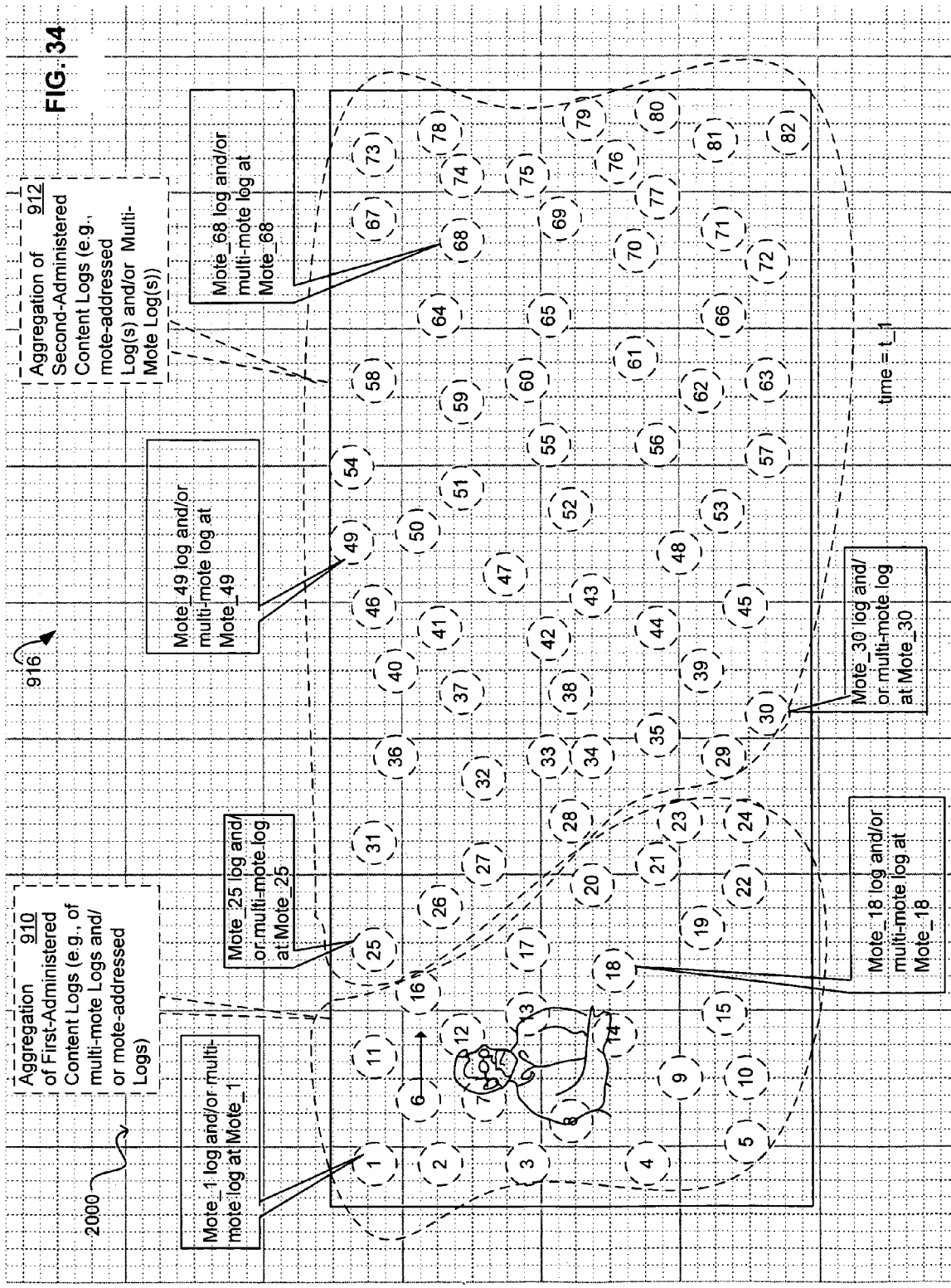
FIGS. 34, 35, and 36, illustrate different versions of federated content log 916.
Figure 35:
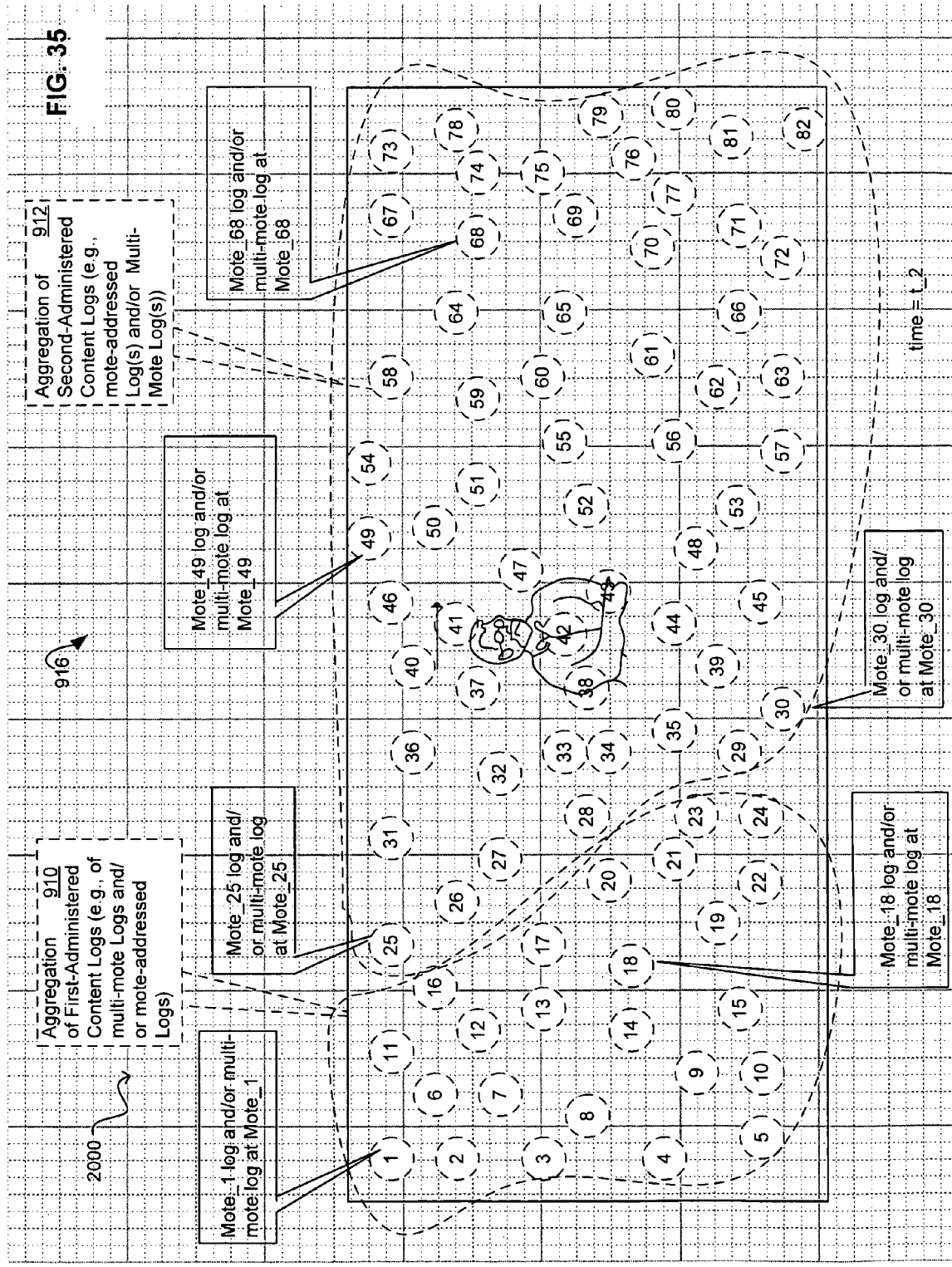
Figure 36:
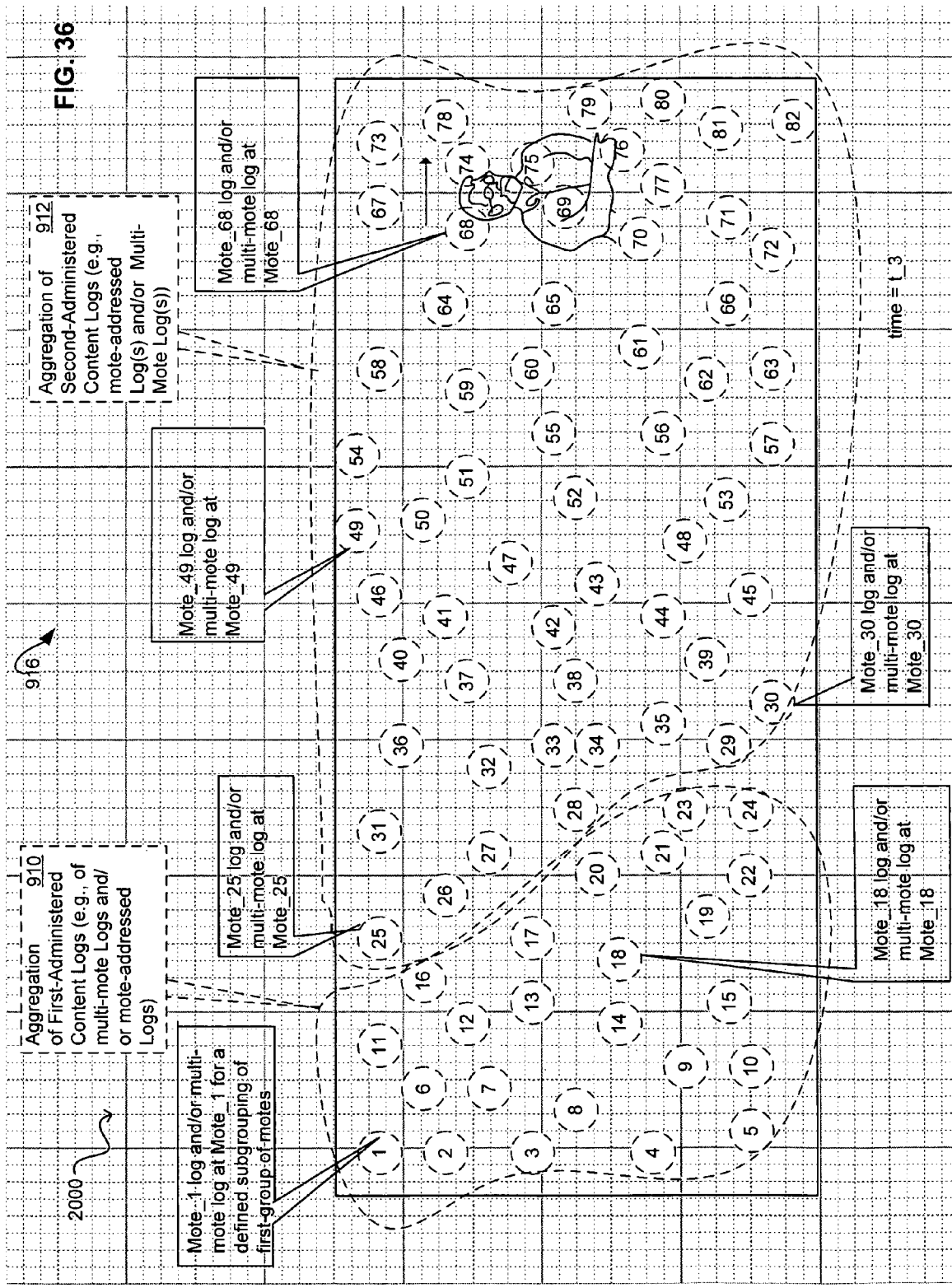

With reference now to FIGS. 34, 35, and 36, illustrated are different versions of federated content log 916. With reference now to FIG. 34, depicted is federated content log 916 at time=t_1 that shows how the person transiting hall 1400 "appears" in the context of the entire hall 1400 at time=t_1. Federated content log 916 at time=t_1 is shown composed of aggregation 910 of first-administered content logs at time=t_1 (FIG. 32) and aggregation 912 of second-administered content logs at time=t_1 (FIG. 33). Referring now to FIG. 35, depicted is federated content log 916 at time at time=t_2 that shows how the person transiting hall 1400 "appears" in the context of the entire hall 1400 at time=t_2. Federated content log 916 at time=t_2 is shown composed of aggregation 910 of first-administered content logs at time=t_2 (FIG. 32) and aggregation 912 of second-administered content logs at time=t_2 (FIG. 33). Referring now to FIG. 36, depicted is federated content log 916 at time at time=t_3 that shows how the person transiting hall 1400 "appears" in the context of the entire hall 1400 at time_t2. Federated content log 916 at time=t_3 is shown composed of aggregation 910 of first-administered content logs at time=t_3 (FIG. 32) and aggregation 912 of second-administered content logs at time_t3 (FIG. 33). Those having skill in the art will appreciate that in practice federated content log 916 will generally be in the form of nested data structures and that the pictographic representations of how the person would "appear" in FIGS. 34, 35, and 36 are used herein for sake of clarity.

As described elsewhere herein, motes can include any number of devices whose information can be captured in content logs (e.g., federated content log 916). Accordingly, federated content log 916 allows flexible and powerful searching techniques, a few of which will now be described.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either substeps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 37:
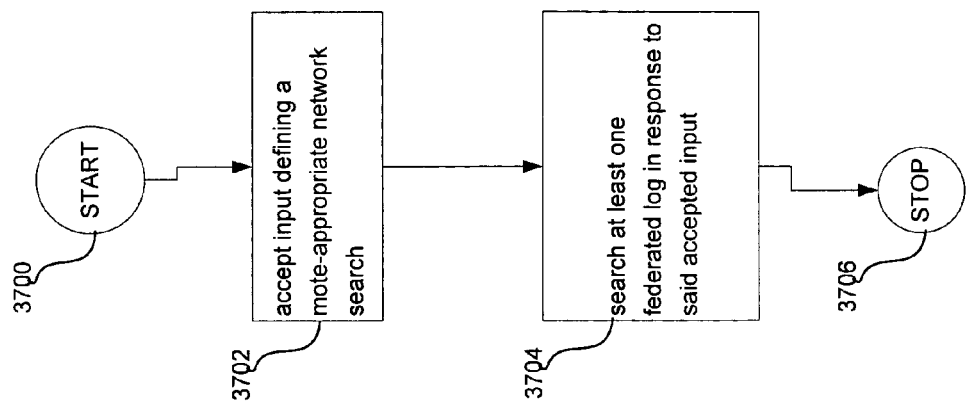
FIG. 37 depicts a high-level logic flowchart of a process.

Referring now to FIG. 37, depicted is a high-level logic flowchart of a process. Method step 3700 shows the start of the process. Method step 3702 depicts accepting input defining a mote-appropriate network search. Method step 3704 searching at least one federated log in response to said accepted input. Method step 3706 shows the end of the process.

Figure 38:
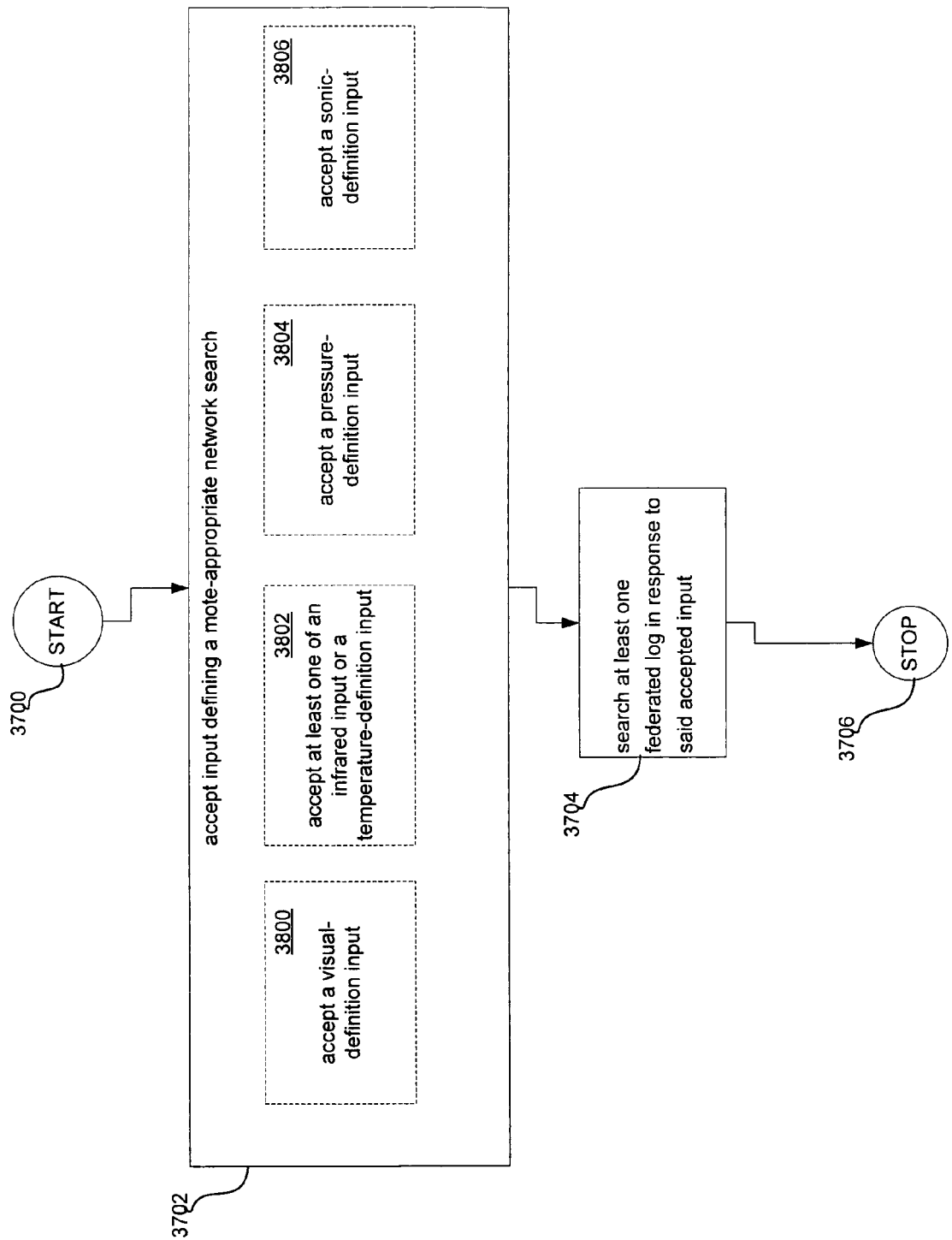
FIG. 38 illustrates a high-level logic flowchart depicting several alternate implementations of the high-level logic flowchart of FIG. 37.

With reference now to FIG. 38, illustrated is a high-level logic flowchart depicting several alternate implementations of the high-level logic flowchart of FIG. 37. Depicted is that in one alternate implementation, method step 3702 includes method step 3800. Method step 3800 shows accepting a visual-definition input. In various exemplary implementations, electrical circuitry accepts the visual-definition input. In some specific implementations such as those used in security, electrical circuitry (e.g., electrical circuitry configured to provide a graphical user interface (GUI)) accepts a command to search for a particular image (e.g., a digital photograph of a person's face). In some implementations such as those used in nursing homes, electrical circuitry (e.g., electrical circuitry configured to provide a graphical user interface (GUI)) accepts a request to search for a particular shape (e.g., a line drawing of a prone person, such as might appear if a person were to fall onto the motes of floor 1402 of FIG. 14). In other implementations, the visual-definition input may be more abstract, such as, for example, a request may be in the form of spatial frequency content, spectral components, or other aspects of a searched for object, event or set of objects.

Continuing to refer to FIG. 38, illustrated is a high-level logic flowchart depicting several alternate implementations of the high-level logic flowchart of FIG. 37. Depicted is that in one alternate implementation, method step 3702 includes method step 3802. Method step 3802 shows accepting at least one of an infrared-definition input or a temperature-definition input. In various exemplary implementations, electrical circuitry accepts the at least one of an infrared-definition input or a temperature-definition input. In some specific implementations such as those used in fire detection, electrical circuitry (e.g., electrical circuitry configured to provide a graphical user interface (GUI)) accepts a command to search for a particular infra-red signature or temperature (e.g., an infrared signature or temperature in closet of a building indicate of a potential spontaneous combustion). In some implementations such as those used in agriculture, electrical circuitry (e.g., a touch screen of a computer system showing motes superimposed over particular plants or plant groupings) accepts a request to monitor various plants or groups of plants for either or both a particular infrared signature or temperature profile (e.g., a defined range of temperatures for optimal growing, such as might be controlled in a greenhouse environment).

With reference now again to FIG. 38, illustrated is a high-level logic flowchart depicting several alternate implementations of the high-level logic flowchart of FIG. 37. Depicted is that in one alternate implementation, method step 3702 includes method step 3804. Method step 3804 shows accepting a pressure-definition input. In various exemplary implementations, electrical circuitry accepts the pressure-definition input. In some specific implementations such as those used in medicine, electrical circuitry (e.g., electrical circuitry configured to provide a graphical user interface (GUI)) accepts a command to sound an alert if a specified pressure at any one or more motes is exceeded (e.g., a pressure sensed by one or more motes interior to a cast indicates a potential for ischemic necrosis or neural impairment). In some implementations such as those used in fluid systems management, electrical circuitry (e.g., an input panel exterior to a piping system) accepts a request that the system give an alert when motes interior to the piping system indicates that the pressure(s) either exceed or fall below one or more defined pressures (e.g., a lowest acceptable pressure in hydraulic lifting system in industrial equipment).

With reference now again to FIG. 38, illustrated is a high-level logic flowchart depicting several alternate implementations of the high-level logic flowchart of FIG. 37. Depicted is that in one alternate implementation, method step 3702 includes method step 3806. Method step 3806 shows accepting a sonic-definition input. In various exemplary implementations, electrical circuitry accepts the sonic-definition input. In some specific implementations such as those used in administration, electrical circuitry (e.g., electrical circuitry configured to convert microphone input to a digital audio file and/or configured to accept digital audio directly) accepts a request that a system determine whether a particular voice has been heard in a room during some defined interval of time (e.g., have you heard "this voice" during the last 24 hours where "this voice" could either be a sample captured in real time or a stored sample of voice). In some implementations such as those used in data processing, electrical circuitry (e.g., electrical circuitry configured to accept digital audio directly) accepts a request that the system perform an action when a certain sound pattern over time is detected (e.g., if the sonic-definition input where a time series of audio that indicated that a hard disk failure was imminent, request would be that the system order a new hard disk and perform a disk swap at some time before the predicted imminent failure).

Figure 39:
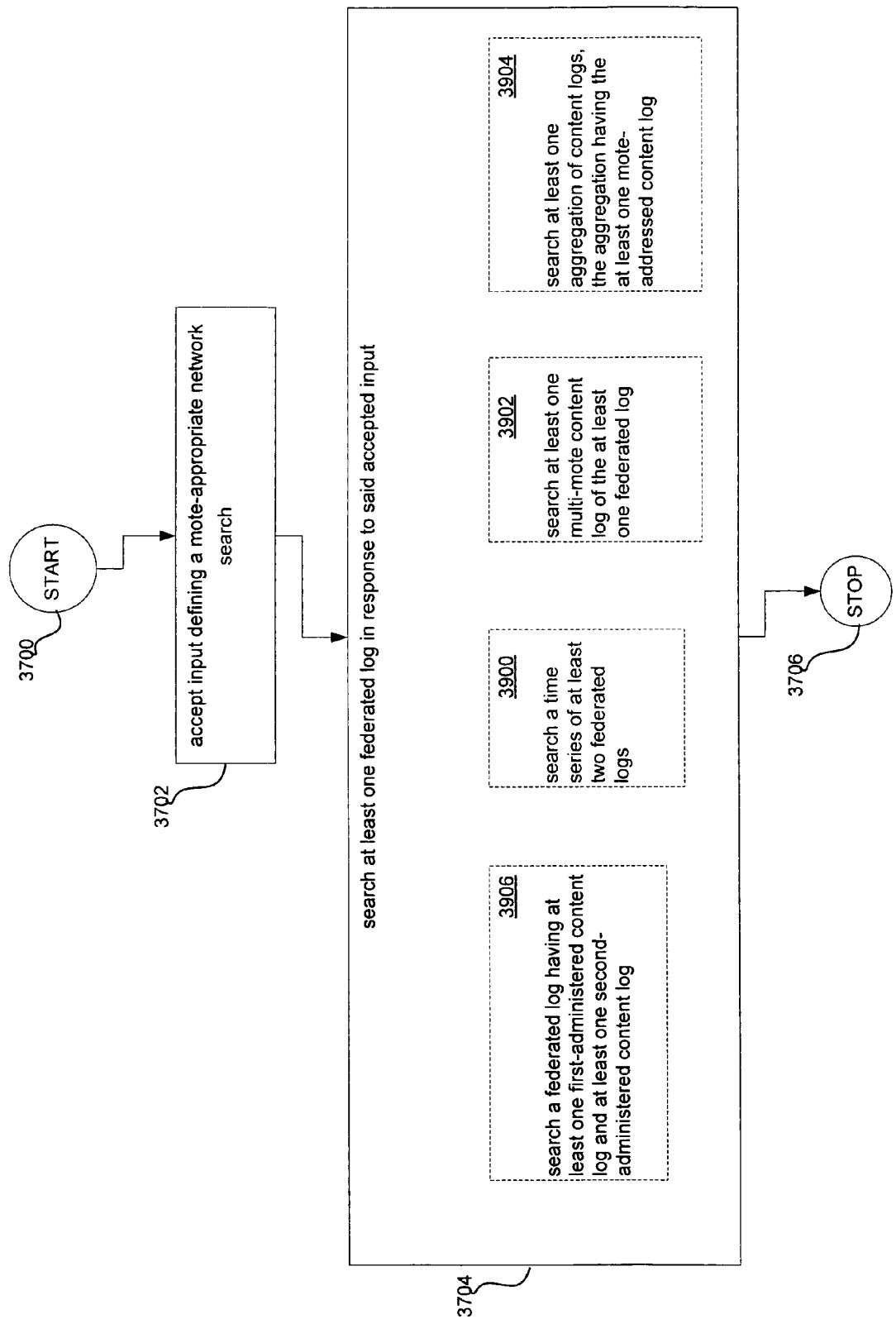
FIG. 39 illustrates a high-level logic flowchart depicting several alternate implementations of the high-level logic flowchart of FIG. 37.

Referring now to FIG. 39, illustrated is a high-level logic flowchart depicting several alternate implementations of the high-level logic flowchart of FIG. 37. Depicted is that in one alternate implementation, method step 3704 includes method step 3906. Method step 3906 shows searching a federated log having at least one first-administered content log and at least one second-administered content log. In various exemplary implementations, electrical circuitry successively searches the at least one first-administered content log and at least one second-administered content log for various defined types of information. In some specific implementations such as those used in security, electrical circuitry (e.g., electrical circuitry forming a processor configured by program to perform various tasks) searches for a particular image in motion (e.g., searching one or more content logs of federated content log 916 at time=t_1 (FIG. 34), at time=t_2 (FIG. 35), and at time=t_3 (FIG. 36) in order to track a person's progress through the hallway such as shown and/or described in relation to FIGS. 15, 16, and 17). In some implementations such as those used in criminal investigations, electrical circuitry accepts a request to search for a particular pattern of sound over time (e.g., the pattern of sound a gunshot would make in federated content log 916 at time=t_1 (FIG. 34), at time=t_2 (FIG. 35), and at time=t_3 (FIG. 36) if a gun were to be fired in the hallway of FIG. 14). Those skilled in the art will appreciate that many other searches may be performed, dependent upon the accepted input defining the mote appropriate search of method step 3702.

Figure 40:
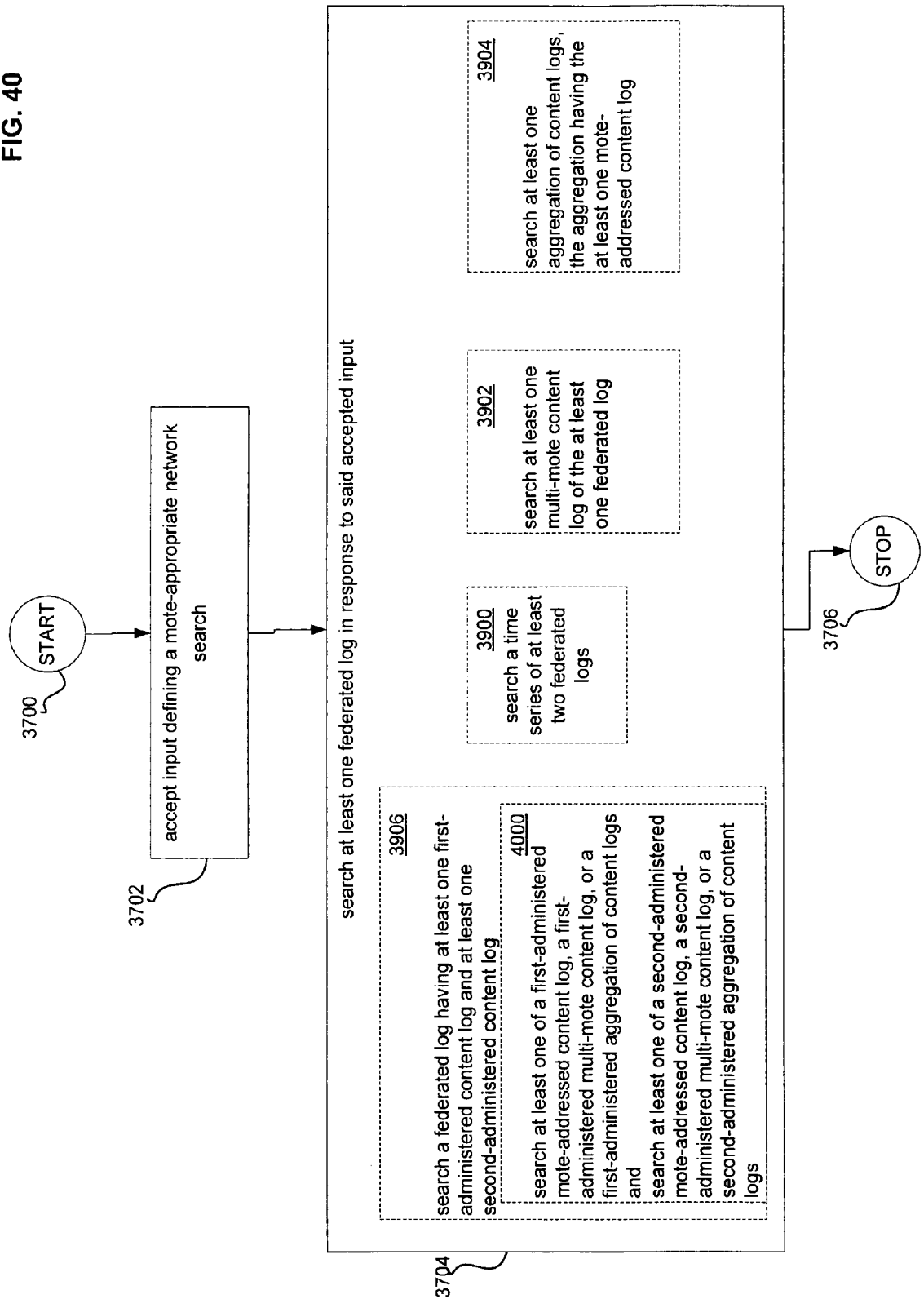
FIG. 40 shows a high-level logic flowchart depicting several alternate implementations of the high-level logic flowchart of FIG. 39.

With reference now to FIG. 40, shown is a high-level logic flowchart depicting several alternate implementations of the high-level logic flowchart of FIG. 39. Depicted is that in one alternate implementation, method step 3906 includes method step 4000. Method step 4000 illustrates searching at least one of a first-administered mote-addressed content log, a first-administered multi-mote content log, or a first-administered aggregation of content logs and searching at least one of a second-administered mote-addressed content log, a second-administered multi-mote content log, or a second-administered aggregation of content logs. In various exemplary implementations, electrical circuitry searches the at least one of a first-administered mote-addressed content log, a first-administered multi-mote content log, or a first-administered aggregation of content logs and at least one of a second-administered mote-addressed content log, a second-administered multi-mote content log, or a second-administered aggregation of content logs for various defined types of information. Those skilled in the art will appreciate that many other searches may be performed, dependent upon the accepted input defining the mote appropriate search of method step 3702.

Continuing to refer to FIG. 39, depicted is a high-level logic flowchart illustrating several alternate implementations of the high-level logic flowchart of FIG. 37. Depicted is that in one alternate implementation, method step 3704 includes method step 3900. Method step 3900 shows searching a time series of at least two federated logs. In various exemplary implementations, electrical circuitry successively searches a time series of federated logs for various defined types of information. In some specific implementations such as those used in security, electrical circuitry (e.g., electrical circuitry forming a processor configured by program to perform various tasks) searches for a particular image in motion (e.g., searching one or more content logs of federated content log 916 at time=t_1 (FIG. 34), at time=t_2 (FIG. 35), and at time=t_3 (FIG. 36) in order to track a person's progress through the hallway such as shown and/or described in relation to FIGS. 15, 16, and 17). In some implementations such as those used in criminal investigations, electrical circuitry searches for a particular pattern or characteristic of sound over time (e.g., searching one or more content logs of federated content log 916 for a pattern of sound or acoustic signature a gunshot would make in federated content log 916 at time=t_1 (FIG. 34), at time=t_2 (FIG. 35), and at time=t_3 (FIG. 36) if a gun were to be fired in the hallway of FIG. 14). Those skilled in the art will appreciate that many other searches may be performed, dependent upon the accepted input defining the mote appropriate search of method step 3702.

Continuing to refer to FIG. 39, illustrated is that in one alternate implementation method step 3704 includes method step 3902. Method step 3902 shows searching at least one multi-mote content log of the at least one federated log. In various exemplary implementations, electrical circuitry searches at least one multi-mote content log of the at least one federated log. In some specific implementations such as those used in security, electrical circuitry searches one or more multi-mote content logs, over time, in response to a defined search (e.g., electrical circuitry searching one or more multi-mote content logs for motes distributed proximate to a patient's heart for sounds indicative of arrhythmia, in response to a search requesting that the logs be so searched). In some implementations such as those used in aviation maintenance, electrical circuitry searches one or more multi-mote content logs, over time, in response to a defined search (e.g., electrical circuitry searching one or more multi-mote content logs for motes in a defined area of aviation equipment, such as a jet engine, for sounds indicative of motor failure, in response to a search requesting that the logs be so searched). Those skilled in the art will appreciate that many other searches may be performed, dependent upon the accepted input defining the mote appropriate search of method step 3702.

Figure 41:
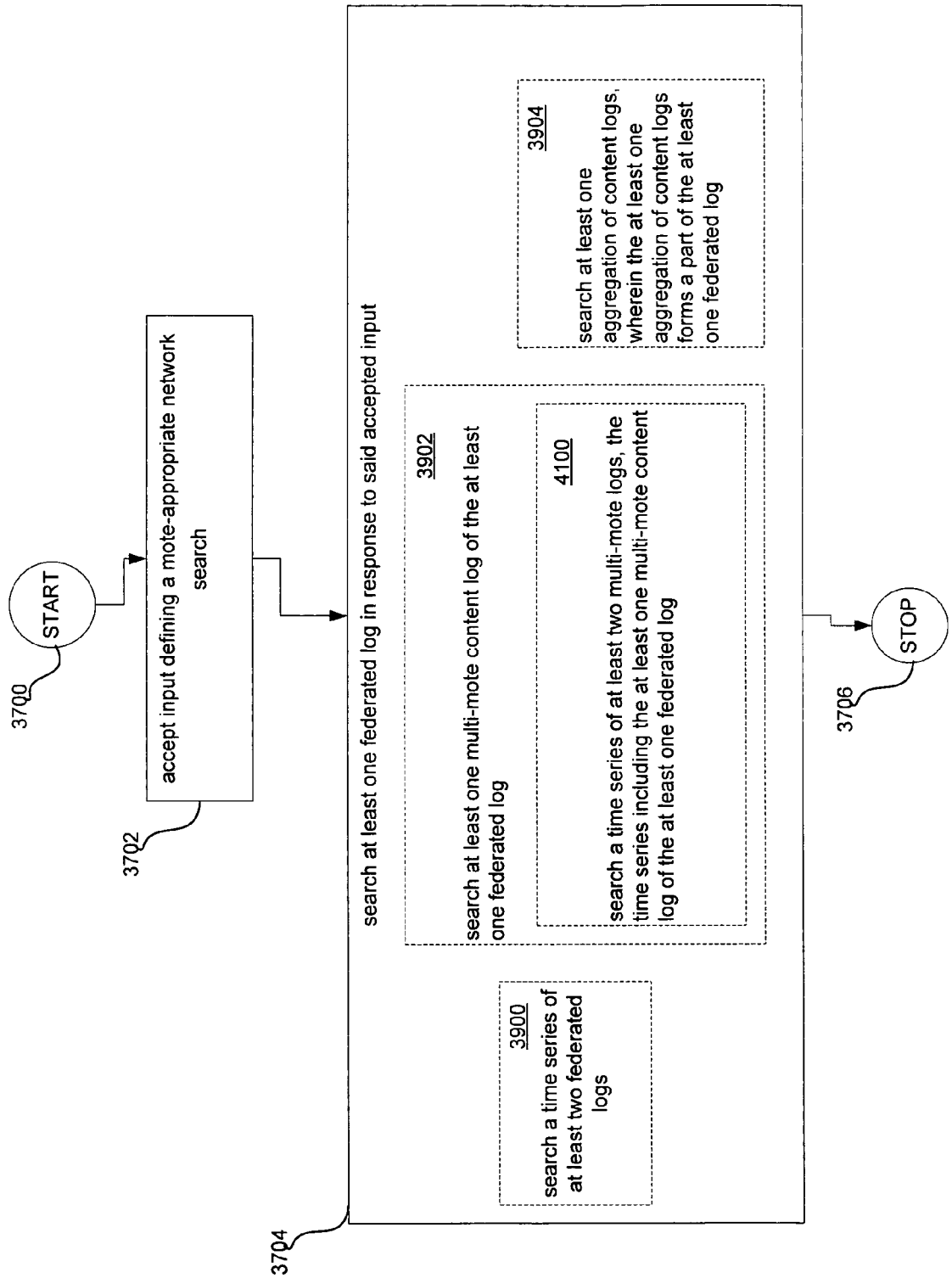

With reference now to FIG. 41, shown is a high-level logic flowchart depicting several alternate implementations of the high-level logic flowchart of FIG. 39. Depicted is that in one alternate implementation, method step 3902 includes method step 4100. Method step 4100 shows searching a time series of at least two multi-mote logs, the time series including the at least one multi-mote content log of the at least one federated log. In various exemplary implementations, electrical circuitry successively searches a time series of content logs for various defined types of information. In some specific implementations such as those used in security, electrical circuitry (e.g., electrical circuitry forming a processor configured by program to perform various tasks) searches for a particular image in motion (e.g., searching one or more content logs of federated content log 916 at time=t_1 (FIG. 34), at time=t_2 (FIG. 35), and at time=t_3 (FIG. 36) in order to track a person's progress through the hallway such as shown and/or described in relation to FIGS. 15, 16, and 17). In some implementations such as those used in criminal investigations, electrical circuitry accepts a request to search for a particular pattern or characteristic of sound over time (e.g., the pattern of sound or acoustic signature a gunshot would make in federated content log 916 at time=t_1 (FIG. 34), at time=t_2 (FIG. 35), and at time=t_3 (FIG. 36) if a gun were to be fired in the hallway of FIG. 14). Those skilled in the art will appreciate that many other searches may be performed, dependent upon the accepted input defining the mote appropriate search of method step 3702.

Referring now again to FIG. 39, depicted is that in one alternate implementation method step 3704 includes method step 3904. Method step 3904 shows searching at least one aggregation of content logs, wherein the at least one aggregation of content logs forms a part of the at least one federated log. In various exemplary implementations, electrical circuitry searches the at least one aggregation of content logs, wherein the at least one aggregation of content logs forms a part of the at least one federated log. In some specific implementations such as those used in security, electrical circuitry (e.g., electrical circuitry forming a processor configured by program to perform various tasks) searches for a particular image in motion (e.g., searching federated content log 916 of content logs at time=t_1 (FIG. 34) in order to determine if a person was in front of wall 1400 at some time=t_1 as shown and/or described in relation to FIG. 15). In some implementations such as those used in criminal investigations, electrical circuitry accepts a request to search for a particular sound at a particular time (e.g., a certain sound present in federated content log 916 at time=t_1 (FIG. 34). Those skilled in the art will appreciate that many other searches may be performed, dependent upon the accepted input defining the mote appropriate search of method 3702.

With reference now to FIG. 42, shown is a high-level logic flowchart depicting several alternate implementations of the high-level logic flowchart of FIG. 39. Depicted is that in one alternate implementation, method step 3904 includes method step 4200. Method step 4200 illustrates searching a time series of at least two aggregations of content logs, the time series including the at least one aggregation of content logs, wherein the at least one aggregation of content logs forms a part of the at least one federated log. In various exemplary implementations, electrical circuitry searches the at least two aggregations of content logs, the time series including the at least one aggregation of content logs, wherein the at least one aggregation of content logs forms a part of the at least one federated log. In some specific implementations such as those used in security, electrical circuitry (e.g., electrical circuitry forming a processor configured by program to perform various tasks) searches for a particular image in motion (e.g., searching one or more content logs of federated content log 916 at time=t_1 (FIG. 34), at time=t_2 (FIG. 35), and at time=t_3 (FIG. 36) in order to track a person's progress through the hallway such as shown and/or described in relation to FIGS. 15, 16, and 17). In some implementations such as those used in criminal investigations, electrical circuitry accepts a request to search for a particular pattern of sound over time (e.g., the pattern of sound a gunshot would make in federated content log 916 at time=t_1 (FIG. 34), at time=t_2 (FIG. 35), and at time=t_3 (FIG. 36) if a gun were to be fired in the hallway of FIG. 14). Those skilled in the art will appreciate that many other searches may be performed, dependent upon the accepted input defining the mote appropriate search of method step 3702.

Continuing to refer to FIG. 42, depicted is that in one alternate implementation, method step 3904 includes method step 4202. Method step 4202 illustrates searching at least one mote-addressed content log of the at least one aggregation of content logs, wherein the at least one aggregation of content logs forms a part of the at least one federated log. In various exemplary implementations, electrical circuitry is used to effect the searching at least one mote-addressed content log of the at least one aggregation of content logs, wherein the at least one aggregation of content logs forms a part of the at least one federated log. Those skilled in the art will appreciate that many other searches may be performed, dependent upon the accepted input defining the mote appropriate search of method step 3702.

Continuing to refer to FIG. 42, depicted is that in one alternate implementation, method step 3904 includes method step 4204. Method step 4204 illustrates searching at least one multi-mote content log of the at least one aggregation of content logs, wherein the at least one aggregation of content logs forms a part of the at least one federated log. In various exemplary implementations, electrical circuitry is used to effect the searching at least one multi-mote content log of the at least one aggregation of content logs. Those skilled in the art will appreciate that many other searches may be performed, dependent upon the accepted input defining the mote appropriate search of method step 3702.

Those skilled in the art will appreciate that in some implementations, the searching described in relation to various processes herein (e.g., such as those shown/described in relation to FIGS. 37-42) is performed on mote-addressed content logs, multi-mote content logs, and/or aggregations of content logs loaded to computer systems external to a mote-appropriate network. For example, as shown/described in relation to gateway 704, which can include, for example, one or more of a notebook computer system, minicomputer system, server computer system, and/or a mainframe computer system. Those skilled in the art will also appreciate that in other implementations the searching described in relation to various processes herein (e.g., such as those shown/described in relation to FIGS. 37-42) is performed in whole or in part on motes of a mote-appropriate network. Those skilled in the art will also recognize that the approaches described herein are not limited to accepting an input of a single kind and that the searching may be refined using a combination of inputs, such as a visual definition input combined with a sonic definition input. When combined, the searching logic may correlate the processes temporally or the searches may be combined independently of relative time references. Those skilled in the art will also appreciate that in other implementations the searching described in relation to various processes herein (e.g., such as those shown/described in relation to FIGS. 37-42) is performed in other computer systems consistent with the teachings herein.

VIII. Frequency-Reuse in Mote-Appropriate Networks

The federation-related aspects of content logs and/or indexes as described herein give rise to various benefits. One such benefit is the ability to differently administer mote-appropriate networks at a much lower power cost than in the related art, such as by employing frequency reuse techniques in mote-appropriate networks.

Referring now to again FIG. 29, illustrated is that the motes of wall 1400 may be partitioned into first-administered set 1000 of motes and second-administered set 1002 of motes analogous to first-administered set 1000 of motes and second-administered set 1002 of motes shown/described elsewhere herein (e.g., in relation to FIGS. 10-13). Antenna 2900 is shown proximate to first-administered set 1000 of motes and shown feeding gateway 704 onto WAN 714. Multi-mote log creation agent 716 is depicted as executing on the more powerful computational system(s) of gateway 704 (e.g., a mini and/or a mainframe computer system) to create aggregation 910 of first-administered content logs. First-administered reporting entity 902 is illustrated as executing on gateway 704. Gateway 704, multi-mote log creation agent 716, aggregation 910 of first-administered content logs, and first-administered reporting entity 902 function and/or are structured in fashions analogous to those described here and/or elsewhere herein.

Antenna 2902 is shown proximate to second-administered set 1002 of motes and feeding gateway 706 onto WAN 714. Multi-mote log creation agent 718 is depicted as executing on the more powerful computational system(s) of gateway 706 (e.g., a mini and/or a mainframe computer system) to create aggregation 912 of second-administered content logs. Second-administered reporting entity 904 is illustrated as executing on gateway 706. Gateway 706, multi-mote log creation agent 718, aggregation 912 of second-administered content logs, and second-administered reporting entity 904 function and/or are structured in fashions analogous to those described here and/or elsewhere herein.

In some implementations, frequency re-use techniques are utilized across first-administered set 1000 of motes and second-administered set 1002 of motes. For instance, first-administered set 1000 of motes operating on or around a first carrier frequency and second-administered set 1002 of motes operating on or around a second carrier frequency. Accordingly, in some implementations antenna 2900 is tuned to a carrier frequency of first-administered set 1000 of motes and antenna 2902 is tuned to a carrier frequency of second-administered set 1002 of motes, where either or both the first carrier frequency and the second carrier frequency are reused frequencies. Those skilled in the art will appreciate that although the frequency re-use techniques have been described in the context of first-administered set 1000 of motes and second-administered set 1002 of motes, in many implementations three or more differently administered sets of motes will be employed using reuse techniques. For example, with first-administered set 1000 of motes forming a "buffer zone" between second-administered set 1002 of motes and an other-administered set of motes (not shown, but which can be conceived of as being located to the left of first-administered set 1000 of motes as viewed in the figures herein) wherein the second carrier frequency is utilized. That is, where second-administered set 1002 of motes is able to "reuse" the second carrier frequency used in the foregoing-described other-administered set of motes, since first-administered set 1000 of motes forms a "buffer zone" such that the communications of the other-administered set of motes and second-administered set 1002 of motes do not significantly interfere with each other. A similar scheme could itself exist for first-administered set 1000 of motes (e.g., the first-carrier frequency could itself be a reused frequency). Those skilled in the art will also appreciate other frequency reuse techniques in light of the disclosures herein. In other implementations, frequency reuse techniques are not used across first-administered set 1000 of motes and second-administered 1002 set of motes (e.g., the differently administered networks use different addressing spaces and/or proximities to provide for the separate network administrations).

Further shown in FIG. 29 are federated log creation agent 914 and federated content log 916 resident within mainframe computer system 990 (other type computer systems may be substituted). Federated log creation agent 914, federated content log 916, and mainframe computer system 990 function and/or are structured in fashions analogous to those described here and/or elsewhere herein.

Those skilled in the art will appreciate that most of the first-administered set 1000 of motes and second-administered set 1002 of motes teachings herein may be modified in accord with the frequency-reuse concepts shown/described herein (e.g., in relation to FIG. 29). For instance, when the federation-related teachings herein, such as those under text/drawings of Roman Number Section V. FEDERATING MOTE-ASSOCIATED LOG DATA of the present application are viewed in light of the present teachings, those having skill in the art will appreciate that in some implementations the federating teachings employ frequency-reuse related concepts. For instance, in some implementations substantially all of the federating texts and/or figures can be rewritten and/or redrawn such that first administered set 1000 of motes employs a first carrier frequency and such that second-administered set 1002 of motes employs a second carrier frequency, and other-administered sets of motes reuse frequencies of either or both the first-administered set 1000 of motes and the second-administered set 1002. However, insofar as such text and/or figure revisions are within the skill of one in the art in light of the teachings herein (especially as such teachings are set forth in the as-filed claims and other text of the applications), such revisions are not expressly set forth herein for sake of clarity. The same is also true for substantially any teaching herein where groups of motes are shown and/or described, and again such text and/or figure revisions are not expressly set forth herein since such revisions are within the skill of those in the art in light of the teachings herein. The inventors point out that the frequency-reuse techniques described are not limited to use with the federation-related aspects of content logs and/or indexes, but may instead be used to good benefit in substantially any mote-appropriate network.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote-appropriate computing/communication systems, combined with standard engineering practices. Specific examples of such components include commercially described components such as Intel Corporation's mote components and supporting hardware, software, and firmware.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

The invention claimed is:

1. A system comprising:
a first-administered set of motes having a first defined carrier frequency;
a second-administered set of motes having a second defined carrier frequency, said second-administered set of motes proximate to said first-administered set of motes; and
a processor configured to receive one or more content logs from said first-administered set of motes and one or more content logs from said second-administered set of motes, and to combine at least part of the one or more content logs from said first-administered set of motes and at least part of the one or more content logs from said second-administered set of motes to form a federated content log in association with said first-administered set of motes having the first defined carrier frequency and said second-administered set of motes having the second defined carrier frequency.

2. The system of claim 1, wherein at least one of the one or more content logs from said first-administered and second-administered sets of motes comprises:
a sensing/control log that includes a query command format.

3. The system of claim 2, wherein said sensing/control log that includes a query command format further comprises:
a sensing/control log that includes a query command format that indicates one or more control functions associated with one or more devices available on one or more motes of the first-administered or second-administered sets of motes.

4. The system of claim 1, wherein at least one of said first defined carrier frequency and said second-defined carrier frequency comprises: a reused frequency.

5. The system of claim 1, wherein at least one of the first-administered set of motes and the second-administered set of motes includes an aggregating mote having a multi-mote log creation agent configured to:
receive a first content log from a first mote;
receive a second content log from a second mote; and
combine at least part of the first content log and at least part of the second content log into a multi-mote content log.

6. The system of claim 5, wherein said multi-mote content log comprises a first aggregation of content logs in association with said first-administered set of motes having the first-administered set of motes, said first aggregation of content logs resident within electrical circuitry.

7. The system of claim 6, wherein said first aggregation of content logs in association with said first-administered set of motes having the first-administered set of motes further comprises:
a first antenna operably tuned to the first defined carrier frequency operably coupled with said first aggregation of content logs.

8. The system of claim 5, wherein said first content log includes a first time stamp, and said second content log includes a second time stamp corresponding to a different time than the first time stamp.

9. A method comprising:
acquiring at least a part of one or more content logs from a first-administered set of motes having a first defined carrier frequency;
acquiring at least a part of one or more content logs from a second-administered set of motes having a second defined carrier frequency; and
at an aggregating mote of at least one of the first-administered set of motes and the second-administered set of motes, combining at least part of two or more content logs into a multi-mote content log.

10. The method of claim 9, wherein said acquiring at least a part of one or more content logs from a first-administered set of motes having a first defined carrier frequency further comprises:
receiving at least a part of one or more multi-mote content logs of the first-administered set of motes having the first defined carrier frequency.

11. The method of claim 10, wherein said receiving at least a part of one or more multi-mote content logs of the first-administered set of motes having the first defined carrier frequency further comprises:
receiving at least a part of at least one of a mote-addressed sensing/control log from at least one aggregation of one or more logs.

12. The method of claim 10, wherein said receiving at least a part of one or more multi-mote content logs of the first-administered set of motes having the first defined carrier frequency further comprises:
receiving at least a part of a mote-addressed routing/spatial log from at least one aggregation of one or more logs.

13. The method of claim 10, wherein said receiving at least a part of one or more multi-mote content logs of the first-administered set of motes having the first defined carrier frequency further comprises:
receiving at least a part of at least one of a mote-addressed sensing/control log from a multi-mote reporting entity at a mote of the first-administered set of motes having the first defined carrier frequency.

14. The method of claim 10, wherein said receiving at least a part of one or more multi-mote content logs of the first-administered set of motes having the first defined carrier frequency further comprises:
receiving at least a part of a mote-addressed routing/spatial log from a multi-mote reporting entity at a mote of the first-administered set of motes having the first defined carrier frequency.

15. The method of claim 9, wherein said acquiring at least a part of one or more content logs from a first-administered set of motes having a first defined carrier frequency further comprises:
receiving at least a part of at least one of a mote-addressed sensing/control log from a reporting entity at a mote of the first-administered set of motes having the first defined carrier frequency.

16. The method of claim 9, wherein said acquiring at least a part of one or more content logs from a first-administered set of motes having a first defined carrier frequency further comprises:
receiving at least a part of a mote-addressed routing/spatial log from a reporting entity at a mote of the first-administered set of motes having the first defined carrier frequency.

17. The method of claim 9, wherein said acquiring at least a part of one or more content logs from a second-administered set of motes having a second defined carrier frequency further comprises:
receiving at least a part of one or more multi-mote content logs of the second-administered set of motes having the second defined carrier frequency.

18. The method of claim 17, wherein said receiving at least a part of one or more multi-mote content logs of the second-administered set of motes having the second defined carrier frequency further comprises:
receiving at least a part of at least one of a mote-addressed sensing/control log from at least one aggregation of one or more logs.

19. The method of claim 9, wherein said combining at least part of two or more content logs into a multi-mote content log includes combining at least part of a first content log having a first time stamp and at least part of a second content log having a second time stamp corresponding to a different time than the first time stamp.

20. The method of claim 9, wherein said combining at least part of two or more content logs into a multi-mote content log includes combining at least part of two or more content logs from a single mote corresponding to two or more different times.

21. The method of claim 9, wherein said combining at least part of two or more content logs into a multi-mote content log includes combining at least part of two or more content logs using a multi-mote log creation agent, the method further comprising transmitting the multi-mote content log on the first defined carrier frequency using the multi-mote log creation agent.

22. The method of claim 9, wherein said acquiring at least a part of one or more content logs from a second-administered set of motes having a second defined carrier frequency further comprises:
receiving at least a part of at least one of a mote-addressed sensing/control log from a reporting entity at a mote of the second-administered set of motes having the second defined carrier frequency.

23. The method of claim 9, wherein said acquiring at least a part of one or more content logs from a second-administered set of motes having a second defined carrier frequency further comprises:
receiving at least a part of a mote-addressed routing/spatial log from a reporting entity at a mote of the second-administered set of motes having the second defined carrier frequency.

24. The method of claim 9, further comprising:
creating a federated log having the at least a part of one or more content logs from the first-administered set of motes having the first defined carrier frequency and the at least a part of one or more content logs from the second-administered set of motes having the second defined carrier frequency.

25. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
creating the federated log from at least a part of one or more multi-mote content logs of the first-administered set of motes having the first defined carrier frequency.

26. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
creating the federated log from at least a part of at least one of a mote-addressed sensing/control log or a mote-addressed routing/spatial log of the first-administered set of motes having the first defined carrier frequency.

27. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
creating the federated log from at least a part of one or more multi-mote content logs of the second-administered set of motes having the second defined carrier frequency.

28. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
creating the federated log from at least a part of at least one of a mote-addressed sensing/control log or a mote-addressed routing/spatial log of the second-administered set of motes having the second defined carrier frequency.

29. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
generating the federated log to have one or more entries noting one or more respective administrative domains of one or more content log entries.

30. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
generating the federated log to have access information to one or more content logs for an administered content log.

31. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
generating the federated log to have information pertaining to a currency of at least one entry of an administered content log.

32. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
generating the federated log to have information pertaining to an expiration of at least one entry of an administered content log.

33. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
generating the federated log to have metadata pertaining to an administrative domain, wherein the metadata includes at least one of an ownership indicator, an access fight indicator, a log refresh indicator, or a predefined policy indicator.

34. The method of claim 24, wherein said creating a federated log having the at least a part of one or more content logs from the first-administered set of motes having the first defined carrier frequency and the at least a part of one or more content logs from the second-administered set of motes having the second defined carrier frequency further comprises:
generating the federated log to have an administrative domain-specific query string generated for or supplied by an administrative domain to produce an updated content log for that domain.

35. The method of claim 9, wherein at least one of the first defined carrier frequency or the second defined carrier frequency further comprises:
a reused frequency.

36. A system comprising:
means for acquiring at least a part of one or more content logs from a first-administered set of motes having a first defined carrier frequency;
means for acquiring at least a part of one or more content logs from a second-administered set of motes having a second defined carrier frequency; and multi-mote log creation means for combining at least part of a first content log and at least part of a second content log to form a multi-mote content log.

37. The system of claim 36, wherein said means for acquiring at least a part of one or more content logs from a first-administered set of motes having a first defined carrier frequency further comprises:

means for receiving at least a part of one or more multi-mote content logs of the first-administered set of motes having the first defined carrier frequency.

38. The system of claim 37, wherein said means for receiving at least a part of one or more multi-mote content logs of the first-administered set of motes having the first defined carrier frequency further comprises:

means for receiving at least a part of at least one of a mote-addressed sensing/control log from at least one aggregation of one or more logs.

39. The system of claim 37, wherein said means for receiving at least a part of one or more multi-mote content logs of the first-administered set of motes having the first defined carrier frequency further comprises:

means for receiving at least a part of a mote-addressed routing/spatial log from at least one aggregation of one or more logs.

40. The system of claim 37, wherein said means for receiving at least a part of one or more multi-mote content logs of the first-administered set of motes having the first defined carrier frequency further comprises:

means for receiving at least a part of at least one of a mote-addressed sensing/control log from a multi-mote reporting entity at a mote of the first-administered set of motes having the first defined carrier frequency.

41. The system of claim 37, wherein said means for receiving at least a part of one or more multi-mote content logs of the first-administered set of motes having the first defined carrier frequency further comprises:

means for receiving at least a part of a mote-addressed routing/spatial log from a multi-mote reporting entity at a mote of the first-administered set of motes having the first defined carrier frequency.

42. The system of claim 36, wherein said means for acquiring at least a part of one or more content logs from a first-administered set of motes having a first defined carrier frequency further comprises:

means for receiving at least a part of at least one of a mote-addressed sensing/control log from a reporting entity at a mote of the first-administered set of motes having the first defined carrier frequency.

43. The system of claim 36, wherein said means for acquiring at least a part of one or more content logs from a first-administered set of motes having a first defined carrier frequency further comprises:

means for receiving at least a part of a mote-addressed routing/spatial log from a reporting entity at a mote of the first-administered set of motes having the first defined carrier frequency.

44. The system of claim 36, wherein said means for acquiring at least a part of one or more content logs from a second-administered set of motes having a second defined carrier frequency further comprises:

means for receiving at least a part of one or more multi-mote content logs of the second-administered set of motes having the second defined carrier frequency.

45. The system of claim 36, wherein said multi-mote log creation means comprises means for combining at least part of the first content log having a first time stamp and at least part of the second content log having a second time stamp corresponding to a different time than the first time stamp.

46. The system of claim 36, wherein said multi-mote log creation means comprises means for combining at least part of two or more content logs into a multi-mote content log includes combining at least part of two or more content logs from a single mote corresponding to two or more different times.

47. The system of claim 36, wherein said multi-mote log creation means comprises an aggregating mote of at least one of the first-administered set of motes and the second-administered set of motes.

48. The system of claim 47, wherein said aggregating mote is further configured to transmit said multi-mote log on at least one of the first and second defined carrier frequencies.

49. The system of claim 36, wherein said means for acquiring at least a part of one or more content logs from a second-administered set of motes having a second defined carrier frequency further comprises:

means for receiving at least a part of at least one of a mote-addressed sensing/control log from a reporting entity at a mote of the second-administered set of motes having the second defined carrier frequency.

50. The system of claim 36, wherein said means for acquiring at least a part of one or more content logs from a second-administered set of motes having a second defined carrier frequency further comprises:

means for receiving at least a part of a mote-addressed routing/spatial log from a reporting entity at a mote of the second-administered set of motes having the second defined carrier frequency.

51. The system of claim 36, further comprising:

means for creating a federated log having the at least a part of one or more content logs from the first-administered set of motes having the first defined carrier frequency and the at least a part of one or more content logs from the second-administered set of motes having the second defined carrier frequency.

52. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for creating the federated log from at least a part of one or more multi-mote content logs of the first-administered set of motes having the first defined carrier frequency.

53. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for creating the federated log from at least a part of at least one of a mote-addressed sensing/control log or a mote-addressed routing/spatial log of the first-administered set of motes having the first defined carrier frequency.

54. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for creating the federated log from at least a part of one or more multi-mote content logs of the second-administered set of motes having the second defined carrier frequency.

55. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for creating the federated log from at least a part of at least one of a mote-addressed sensing/control log or a mote-addressed routing/spatial log of the second-administered set of motes having the second defined carrier frequency.

56. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for generating the federated log to have one or more entries noting one or more respective administrative domains of one or more content log entries.

57. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for generating the federated log to have access information to one or more content logs for an administered content log.

58. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for generating the federated log to have information pertaining to a currency of at least one entry of an administered content log.

59. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for generating the federated log to have information pertaining to an expiration of at least one entry of an administered content log.

60. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for generating the federated log to have metadata pertaining to an administrative domain, wherein the metadata includes at least one of an ownership indicator, an access right indicator, a log refresh indicator, or a predefined policy indicator.

61. The system of claim 51, wherein said means for creating a federated log having the at least a part of one or more content logs from the first-administered set of motes having the first defined carrier frequency and the at least a part of one or more content logs from the second-administered set of motes having the second defined carrier frequency further comprises:

means for generating the federated log to have an administrative domain-specific query string generated for or supplied by an administrative domain to produce an updated content log for that domain.

62. The system of claim 36, wherein at least one of the first defined carrier frequency or the second defined carrier frequency further comprises:

a reused frequency.

* * * * *

UNITED STATES PATENT AND TRADEMARK OFFICE
CERTIFICATE OF CORRECTION

| | | |
|---|---|---|
| PATENT NO. | : 7,599,696 B2 | Page 1 of 1 |
| APPLICATION NO. | : 10/877099 | |
| DATED | : October 6, 2009 | |
| INVENTOR(S) | : Edward K. Y. Jung | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this

Fifth Day of October, 2010

David J. Kappos
*Director of the United States Patent and Trademark Office*